US007146694B2

(12) United States Patent
Colson et al.

(10) Patent No.: US 7,146,694 B2
(45) Date of Patent: Dec. 12, 2006

(54) FABRICATION APPARATUS FOR AN ASSEMBLY OF VANES FOR AN ARCHITECTURAL COVERING

(75) Inventors: Wendell B. Colson, Weston, MA (US); Daniel M. Fogarty, Framingham, MA (US); Todd B. Jaramillo, Broomfield, CO (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 16 days.

(21) Appl. No.: 10/402,223

(22) Filed: Mar. 26, 2003

(65) Prior Publication Data

US 2003/0217449 A1 Nov. 27, 2003

Related U.S. Application Data

(60) Provisional application No. 60/369,355, filed on Apr. 1, 2002.

(51) Int. Cl.
*B23P 19/04* (2006.01)
*E06B 9/382* (2006.01)

(52) U.S. Cl. .......................... 29/24.5; 29/783; 29/791; 156/65; 160/178.3

(58) Field of Classification Search ................. 29/24.5, 29/703, 711, 783, 791
See application file for complete search history.

(56) References Cited

U.S. PATENT DOCUMENTS

| | | | | |
|---|---|---|---|---|
| 2,317,660 | A | | 4/1943 | Williams |
| 2,532,617 | A | | 12/1950 | Hauser et al. |
| 2,591,750 | A | | 4/1952 | Walker |
| 2,796,927 | A | | 6/1957 | Evans |
| 5,349,730 | A | * | 9/1994 | Anderson et al. ............ 29/24.5 |
| 5,553,653 | A | | 9/1996 | Rozon ........................ 160/173 |
| 5,797,442 | A | * | 8/1998 | Colson et al. .............. 160/236 |
| 5,826,317 | A | * | 10/1998 | van Oostrom et al. ....... 29/24.5 |
| 6,029,553 | A | * | 2/2000 | Berntsson et al. ........... 83/76.1 |
| 6,296,037 | B1 | * | 10/2001 | Ruggles ............... 160/168.1 V |
| 2002/0079066 | A1 | * | 6/2002 | Colson ................ 160/176.1 R |
| 2003/0015300 | A1 | | 1/2003 | Colson et al. ........ 160/168.1 R |

FOREIGN PATENT DOCUMENTS

| | | |
|---|---|---|
| AU | 243263 | 8/1960 |
| WO | WO 02/06619 A1 | 1/2002 |
| WO | WO 03/008751 A1 | 1/2003 |

* cited by examiner

*Primary Examiner*—Marc Jimenez
(74) *Attorney, Agent, or Firm*—Dorsey & Whitney LLP

(57) ABSTRACT

An apparatus for fabricating tubular vanes and adhering the vanes to a plurality of associated ladder tapes for use in a blind assembly for an architectural opening is described. The apparatus includes a first section for unrolling resin impregnated fabric tape, folding the tape, and cutting the tape to a predetermined length. In a second section of the apparatus, the cut and folded tape is bonded to together along its longitudinal edges to form a tubular vane. In the third and final section, the completed vane is positioned between the vertical cords of a plurality of associated ladder tapes and the vane is adhesively bonded to a cross rung of each. After the vane has been bonded to the cross rungs, the ladder tapes are advanced and prepared for receipt of the next vane. The resulting subassembly of vanes is used to fabricate blind assemblies through the addition of headrails and bottom rails.

20 Claims, 49 Drawing Sheets

FABRICATION APPARATUS FOR AN ASSEMBLY OF VANES FOR AN ARCHITECTURAL COVERING

CROSS REFERENCE TO RELATED APPLICATIONS

This application claims priority to U.S. Provisional Application No. 60/369,355, filed 01 Apr. 2002 which is hereby incorporated by reference as if fully disclosed herein.

BACKGROUND OF THE INVENTION

1. Field of the Invention

The invention relates generally to apparatus and methods for fabricating coverings for architectural openings, and more specifically to an apparatus and method for continuously fabricating tubular vanes from a fabric material and arranging the tubular vanes in associated ladder tapes.

2. Background Description

Venetian style blinds and plantation style shutters are two styles of window coverings commonly used in residential and commercial applications.

Conventional Venetian blind assemblies typically comprise a head rail, a bottom rail and a plurality of horizontal slats disposed therebetween. Lift cords extend from a catch mechanism in the head rail to the bottom rail. By releasing the catch and by pulling on or guiding the portions of the lift cords that extend from the head rail and the catch, the vertical distribution of the slats can be moved up or down between retracted and extended positions across an opening. Furthermore, each of the plurality of slats is typically supported by a ladder tape (or cord). The ladder tape is typically attached to a tilt mechanism in the headrail to facilitate pivotal movement of the slats about the slats' longitudinal axes, whereby rotating a rod or pulling cords that extend from the mechanism, the plurality of slats can be opened or closed depending on how much light a user wants to pass through the opening.

Generally speaking, Venetian blinds are thinner and lighter than plantation shutters and do not have the peripheral frame required in plantation shutters. Furthermore, the exposed and dangling lift cords found in a Venetian blind can be unruly especially when the blind is in its retracted position, wherein the ends of the cord may gather unattractively on the sill of the window. On the other hand, when the blind is extended, the ends of the cords may be too high for someone of short stature to easily reach. Additionally, the head rail of a Venetian blind assembly that typically contains the mechanisms necessary to control the operation of the blind assembly is often not very architecturally pleasing, and may even be unsightly. It is common for an architectural opening having a Venetian blind assembly to make use of a valance or other interior design element to hide the headrail.

Plantation shutters typically comprise a plurality of horizontal slats like the Venetian blinds, yet they tend to be more massive in appearance. The plurality of slats are typically enclosed in a peripheral framework that surrounds the architectural opening. Because the slats are connected directly to the framework they cannot be moved up and down. They can, however, be pivoted between open and closed positions usually by the operation of an actuator rod that is loosely attached to the slats, wherein movement upwardly or downwardly of the actuator rod pivots the slats between the open and closed positions.

Although many consider that plantation shutters tend to be more attractive than Venetian blinds, there are some drawbacks that discourage purchases. Perhaps, the biggest drawback is that plantation shutters cannot be easily removed from a window, leaving the user with the limited choice of having the slats in the open position or the closed position, but no ability to have a clear unobstructed view through the window, such as is provided when a Venetian blind is retracted. Furthermore, because shutters are typically very deep, and because the framework often extends beyond the surface of the interior wall, it is only on deeply inset windows that plantation shutter type blinds can be installed flush with the wall surface.

No prior art covering product is known that combines the operational advantages of the Venetian blind with the aesthetics of the plantation shutter. The thick (typically wooded) slats that are part of the visual appeal of plantation blinds do not translate well to Venetian blinds. The weight and thickness of plantation blind slats are not well suited to being retracted and extended. For instance, if the slats of a plantation shutter could be incorporated into a Venetian style blind, the stack height of a plurality of the slats would be very substantial, covering a substantial portion of the window even when the blind is retracted.

A variety of apparatuses and machines are utilized to produce coverings for architectural openings, such as Venetian blinds. Generally, one or more machines are utilized to produce the slats of the coverings. For instance, in the case of Venetian blinds with aluminum slats, the slats can be formed from rolls of aluminum stock. Another machine is typically utilized to insert and secure a plurality of the formed slats within a set of ladder tapes to form a subassembly to which the headrail and footrail are subsequently attached to form a completed blind.

BRIEF SUMMARY OF THE INVENTION

A vane fabrication apparatus and method of using the apparatus is described. A preferred embodiment of the apparatus includes: (1) a forming and sizing section to form a piece of fabric tape into a tubular vane and cut it to length; (2) a bonding section to join one edge of the formed tape to another along the tape's length to complete the tubular vane; and (3) a subassembly fabrication section to position the completed vanes in between the vertical cords of associated ladder tapes and to couple the vanes to the cross rungs of the ladder tapes to create a blind subassembly. The subassembly may be utilized to fabricate a completed window blind assembly by adding a headrail and a footrail to it.

Other aspects, features and details of the present invention will be more completely understood by reference to the following detailed description of a preferred embodiment.

DETAILED DESCRIPTION OF THE INVENTION

Figure 1A:
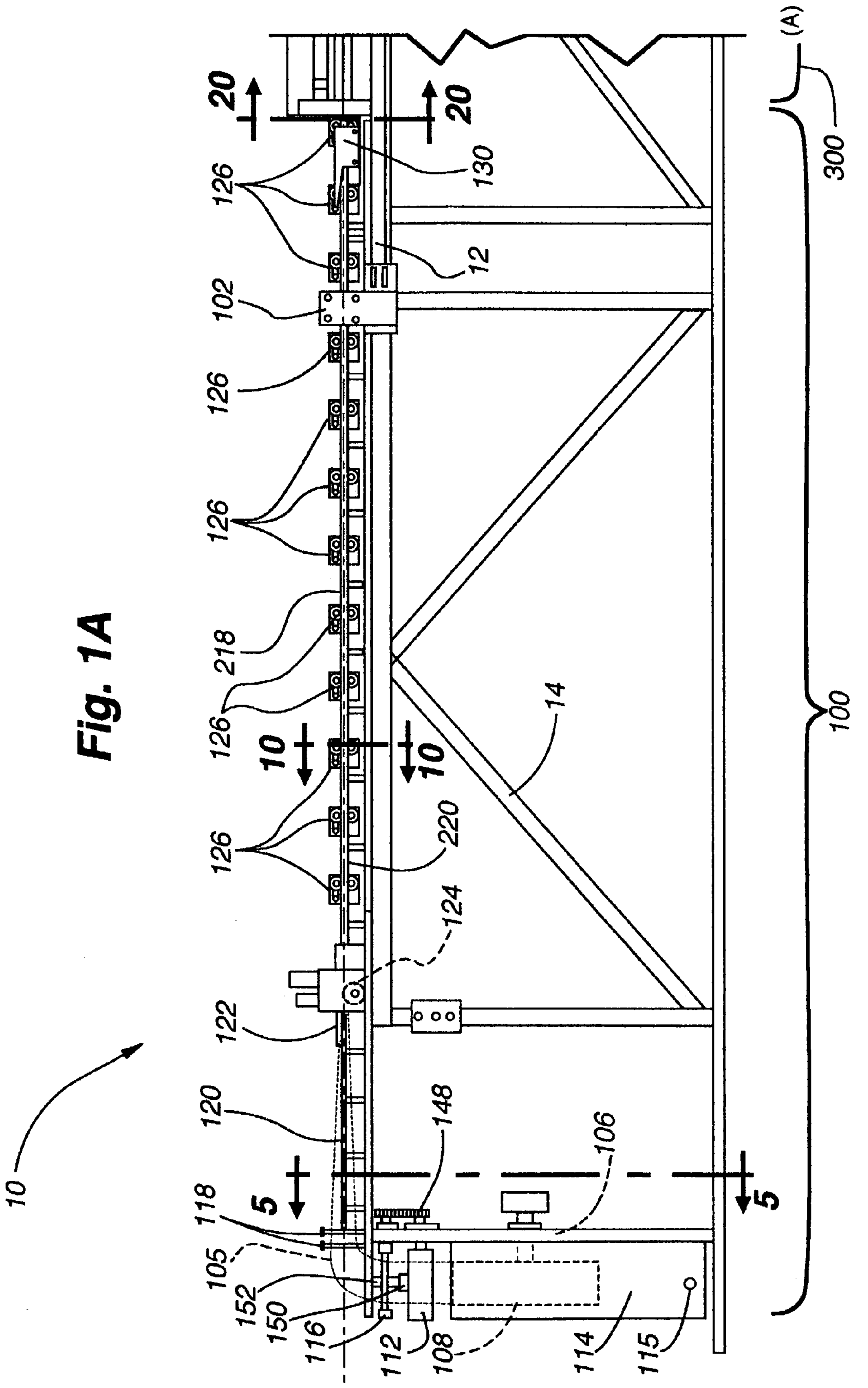
FIGS. 1A and B are front elevational views, each of a portion of the entire vane fabrication apparatus.

An apparatus for continuously fabricating collapsible tubular vanes (or slats) and securing the vanes into ladder tapes in a spaced relationship to one another is described. The vane and ladder tape subassembly is utilized in the fabrication of horizontally orientated Venetian style blind assemblies.

The tubular vanes are typically fabricated from a roll of resin impregnated non-woven longitudinally pre-creased fabric tape that has a curvilinear set across its width. In other embodiments, the curvilinear set non-woven fabric tape is creased as necessary as it is pulled against a creasing blade after the tape is unwound from a roll by the apparatus. As will be described in greater detail below, the fabric tape is folded onto itself about its approximate lateral creased midpoint and the two lateral edges are adhesively joined such that a tubular vane with top and bottom convex sides is formed. Because of the semi-rigid construction of the resin impregnated non-woven fabric tape and the tubular configuration, the resulting vane has the necessary stiffness to resist sagging when horizontally disposed. Furthermore, the flexible nature of the fabric tape permits the convex sides to be collapsed onto one another, facilitating a more compact stack of vanes on an associated horizontal blind assembly when the assembly is in a retracted position. The tubular vanes are described in greater detail in U.S. patent application Ser. No. 10/332,411, filed 07 Jan. 2003, which is a national phase filing from the PCT application No. PCT/US/0122336, filed 16 Jul. 2001, which claims priority to U.S. provisional application 60/219,039, filed on 18 Jul. 2001, which is owned by the assignee of the present invention and is incorporated by reference in its entirety herein.

When the vanes are utilized as slats in horizontal Venetian blind assemblies, each slat is cradled in corresponding rungs of two or more ladder tapes. Movement of the cross rungs of the ladder tapes from a near horizontal orientation when the slats of the blinds are open to a nearly vertical position when the slats are in their closed position is facilitated by raising or lowering vertical cords of the ladder tape that intersect with the ends of each cross rung. In one embodiment of a horizontal blind assembly incorporating the tubular vanes, each vane is secured to its corresponding cross rungs by resin beads. The application of the resin bead to the vane to secure the cross rung thereto is performed by a preferred embodiment of the vane fabrication apparatus as is described in greater detail below. The resin beads facilitate complete closure of the blind assembly by encouraging the vanes into a more vertical position, wherein they rest directly against similarly orientated adjacent vanes to more effectively block unwanted light. The use of resin to secure the slats of horizontal blind assemblies to the cross rungs of a ladder tape are described in greater detail in U.S. patent application Ser. No. 10/003,097, filed on 06 Dec. 2001, which claims priority to U.S. provisional application 60/305,996 filed on 16 Jul. 2001, which is owned by the assignee of the present invention and is incorporated by reference in its entirety herein.

Horizontal blind subassemblies comprising a plurality of tubular vanes that are (1) arranged in two or more ladder tapes and (2) secured to the cross rungs of the ladder tapes with an resin can be utilized to fabricate a variety of styles of horizontal blind assemblies. One particular type of blind assembly utilizes pivotal vane-shaped headrails and bottom rails in conjunction with the subassembly and a plantation shutter style tilt rod, creating a blind assembly that when in its extended position resembles plantation shutters. This type of horizontal blind assembly is described in greater detail in the PCT application PCT/US02/22577, filed 16 Jul. 2002, which claims priority to U.S. provisional patent application 60/305,947, filed on 16 Jul. 2001 and U.S. patent application Ser. No. 10/197,674, filed 16 Jul. 2002 which claims priority to U.S. provisional application 60/306,049, filed on 16 Jul. 2001, which are owned by the assignee of the present invention and are incorporated by reference in their entirety herein.

General Overview

The vane fabrication apparatus 10 is illustrated in its entirety in FIGS. 1A, 1B, 2A and 2B. In a vane forming and sizing section 100, semi-rigid non-woven fibrous composite material configured for use in making tubular vanes is unwound from a roll, creased longitudinally as necessary if the material is not pre-creased, and folded about a longitudinal crease proximate the material's lateral center to form the general shape of a tubular vane. Next, the formed vane material is cut to a predetermined length, and finally in this section, a flap along the longitudinal edge of the vane's top side that has a thermoplastic resin adhered to its surface is partially folded over in preparation for the bonding operation.

In a bonding section 300 of the vane fabrication apparatus, the hot melt resin on the flap is heated to above its melting point and the flap is folded onto the vane's bottom side. Pressure is applied, and the glue is allowed to cool.

In a final subassembly fabrication section 400, the finished vane is slid between the vertical cords of corresponding ladder tapes. Next, the bottom side of the vane is secured to corresponding cross rungs of the ladder tapes, through the application of a resin bead. Finally the vane is lowered via the ladder tapes and the adjacent set of the ladder tapes' cross rungs are positioned for receipt of the next vane.

Figure 1B:
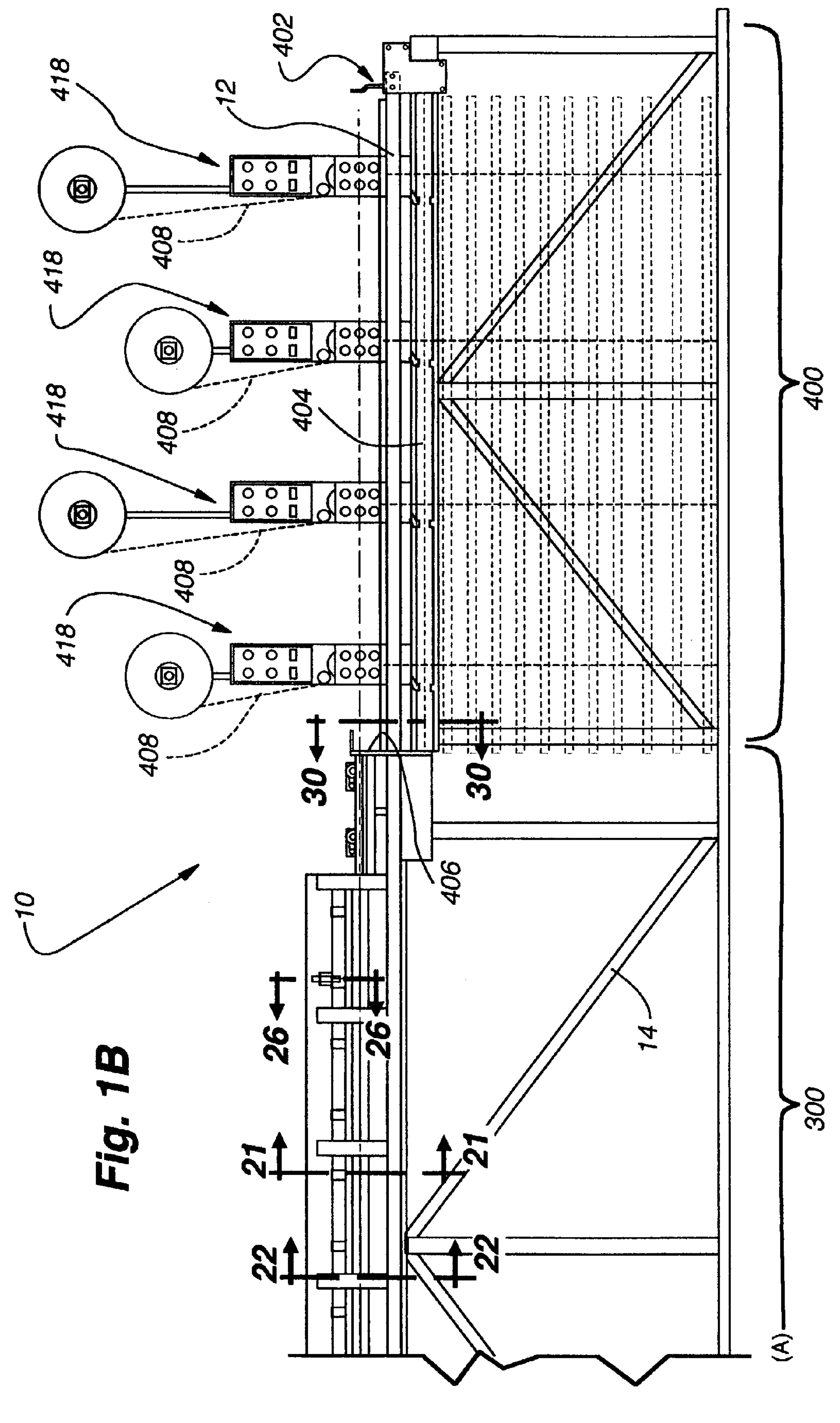
Figure 2A:
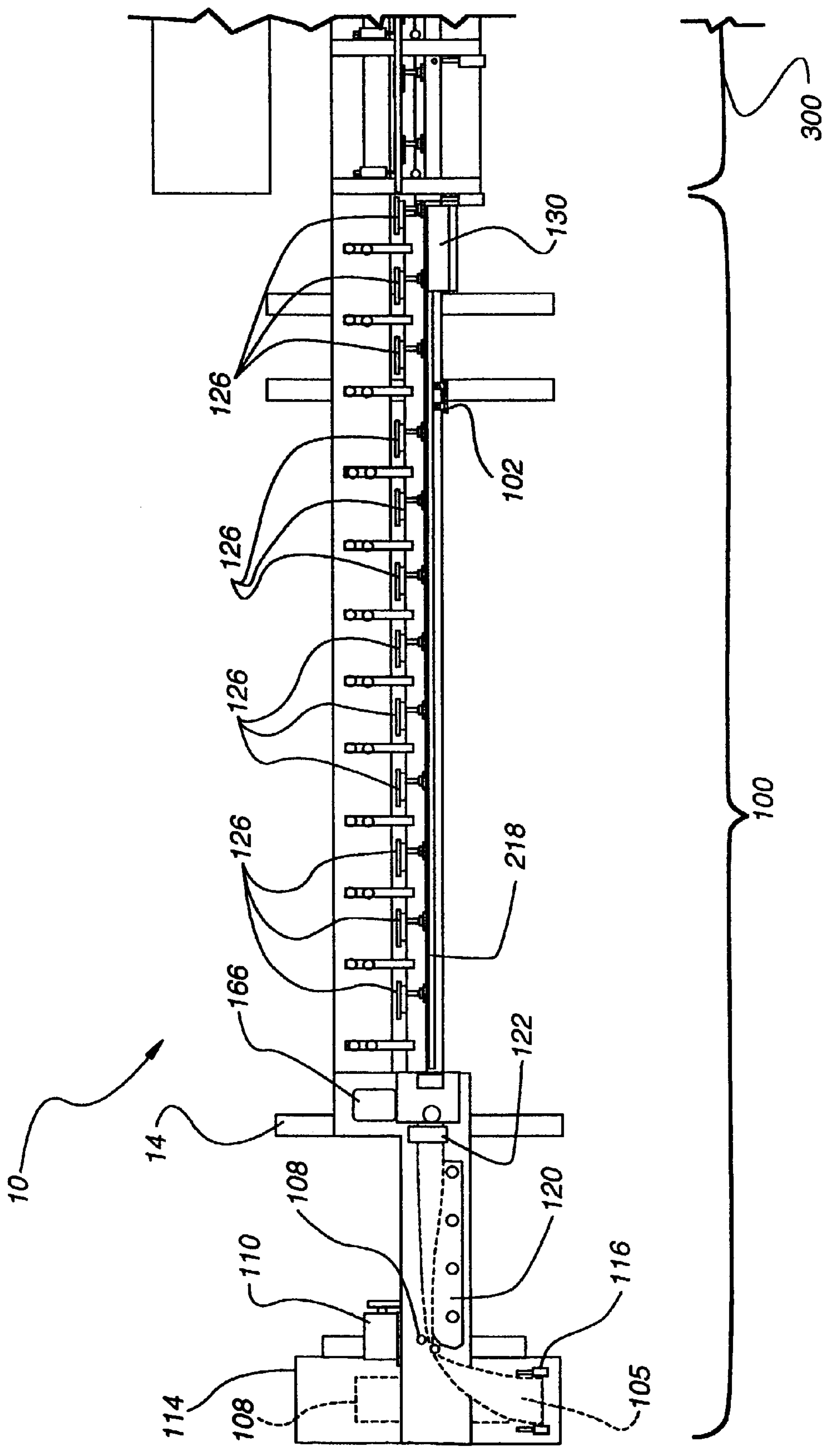
FIGS. 2A and B are top plan views, each of a portion of the entire vane fabrication apparatus.
Figure 2B:
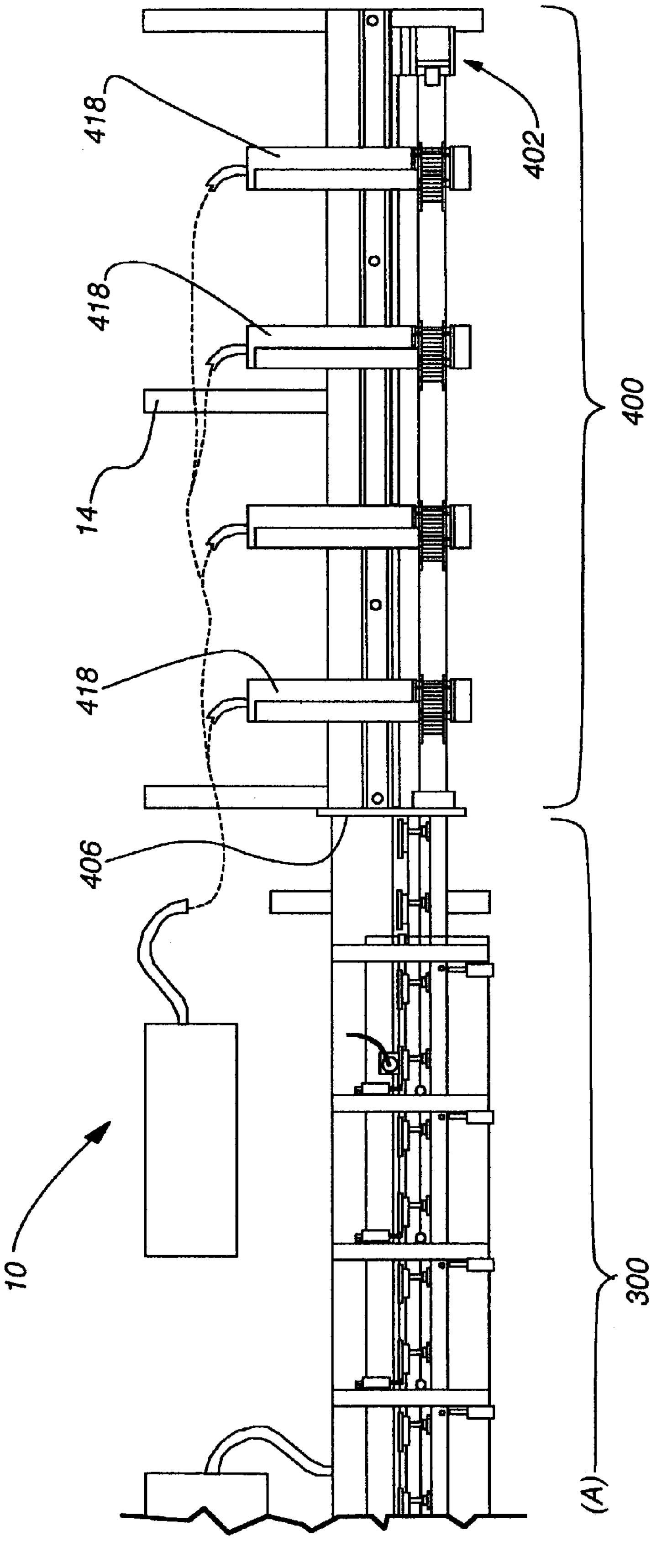

A preferred embodiment of the apparatus 10 is adjustable to facilitate the fabrication of vanes and subassemblies for a wide variety of blind assembly widths from 1 foot to 8 feet. Referring to FIGS. 1A and 1B, by moving a catch mechanism assembly 302 in the subassembly fabrication section 400 that helps position the vanes within the ladder tapes to the left or right, the size of the vane and subassembly produced by the apparatus can be varied. The catch mechanism assembly 302 is secured to one end of an elongated bar 12. The opposite end of the elongated bar is secured to a sensor array 102 of the vane forming and sizing section 100. A template 304 is placed in between the catch mechanism assembly 302 and a surface of a vertical plate 306 located along the left edge of subassembly fabrication section 400. The catch mechanism assembly 302 is moved leftwardly until it abuts the right edge of the template 304 and is secured in this location. The sensor array 102 moves simultaneously with the catch mechanism via the elongated bar 12. The distance between the sensor array 102 and a guillotine shear 104 determines the length of the vane material that is subsequently fabricated into a vane. In alternative embodiments other mechanisms may be utilized to set the length of the vanes. For instance, the rod can be replaced by a wire, or the sensor array could be coupled to a catch mechanism assembly electronically such that movement of the catch mechanism is signaled to the sensor array and the sensor array moves correspondingly. The operation of the various components and the adjustment of the vane fabrication apparatus is described in greater detail below in the descriptions of the various sections of the apparatus.

The Forming and Sizing Section

The forming and sizing section 100 of the vane fabrication apparatus 10 is illustrated in FIGS. 4–10 and 13–19. The primary function of this section is to orientate and form the vane tape 105 supplied from a roll into a tubular vane shape and cut the tape into predetermined vane lengths. The forming and sizing section 100 includes: (1) a spindle 106 attached to the apparatus framework 14 for holding a roll 108 of vane tape; (2) a motor 110 attached to a drive wheel 112 for unwinding the roll of vane tape (3) a bin 114 made of a translucent plastic in the preferred embodiment to hold the unwound vane material; (4) a sensor pair 115 for controlling the operation of the motor based on the amount of unrolled vane tape in the bin; (5) guides 116 and 118 to change the orientation and direction of the vane material from longitudinally vertical and laterally horizontal to longitudinally horizontal and laterally vertical; (6) a forming plate 120 that encourages the vane tape to fold along a crease proximate the middle of the tape; (7) a forming guide 122 that folds the vane material about the crease; (8) a motor-driven drum 124 for pulling the vane material through the forming guide; (9) the sensor array 102 for controlling the drum and associated feed motor assemblies 126 based on the desired length of a vane; (10) a guillotine 104 for cutting the tape at the desired vane length; and (11) a guide 130 for folding a flap 132 that extends beyond the longitudinal edge of the top side 134 of the formed vane vertically downwardly.

Figure 3:
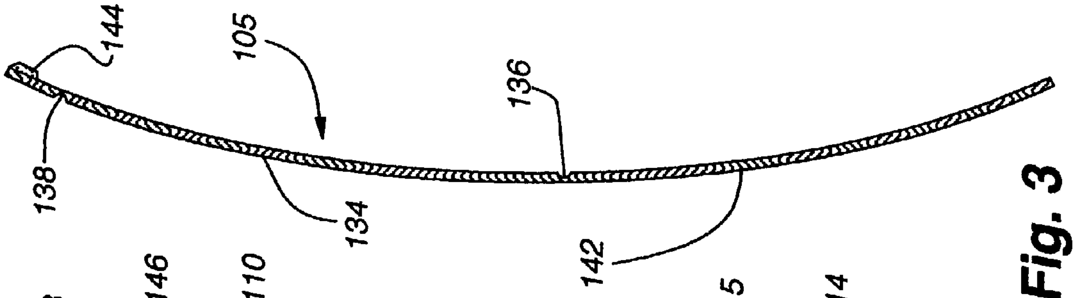
FIG. 3 is a cross sectional view of the vane tape taken along line 3—3 of FIG. 4.

Referring to FIG. 3, the vane tape 105 utilized to make the tubular vanes is illustrated. Typically, the vane tape 105 is comprised of a non-woven fiberglass mat that has been partially impregnated with a thermoset resin. The thermoset resin is cured against a curvilinear mandrel to give the fiberglass mat a measure of rigidity and a lateral curvilinear set as is shown in FIG. 3. The vane tape 105 may also include a second layer of patterned fabric (not shown) laminated to the fiberglass mat to provide the vanes fabricated from it with a desired surface appearance.

The vane tape 105 also includes two longitudinally extending pre-formed creases 136 and 138 indicating where the tape is to be bent during the formation of a vane. The first crease 136 is located proximate the lateral center of the vane material, such that folding the vane tape along the first crease forms top and bottom convex sides 134 and 142 of substantially equal width. The second crease 138 defines the longitudinal edge of the top convex side 134 with a flap 132 extending laterally from it. The flap 132 includes a thermoplastic resin layer 144 that has been applied to its inside surface. It is to be appreciated that by folding the flap over the bottom side 142 of the vane tape 105 and adhesively bonding it against the bottom side with the thermoplastic resin layer 144, a tubular vane is formed.

Once the creases have been made in and the thermoplastic resin has been applied to the vane tape, the vane tape is wound onto a cylindrical core for use by the vane fabrication apparatus 10 as is described in detail herein. The compressive force applied as the tape is wound into a roll 108 causes the tape to flatten and temporarily lose its curvilinear profile. It is to be appreciated that the tape has memory and snaps back into the curvilinear profile once unwound from the roll 108.

Figure 4:
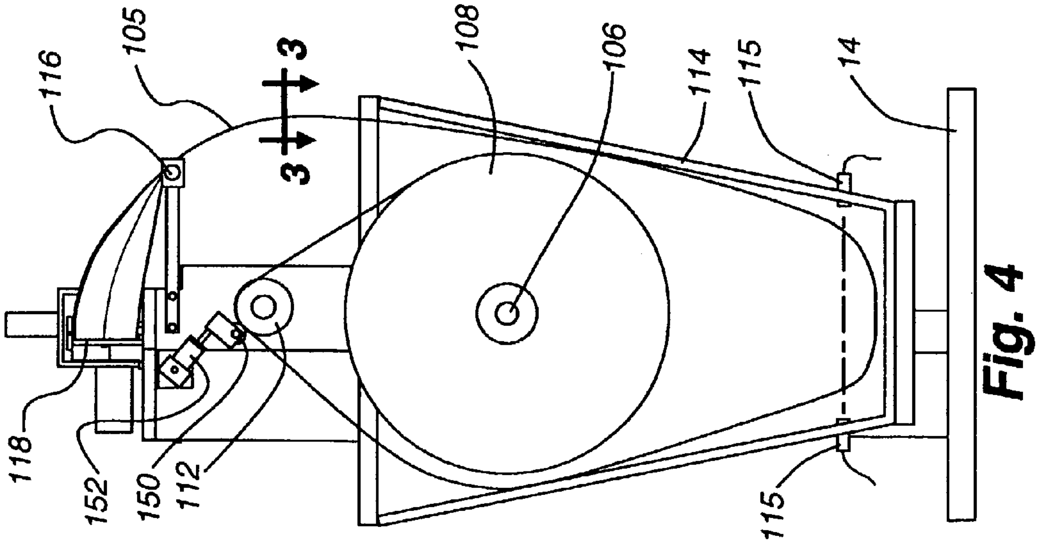
FIG. 4 is an end elevation of the left end of the vane fabrication apparatus illustrating the roll of vane material and the bin in which the unrolled material is held.

Referring to FIG. 4, the roll 108 of vane tape 105 is placed on a horizontal spindle 106 that extends from the apparatus framework 14 at the left end of the apparatus 10 for free rotational movement about the spindle. The vane tape is threaded over a drive wheel 112 located vertically above the spindle. The wheel 112 is coupled with an electric motor 10 by way of gears 146 and a drive chain 148 as can best be seen in FIG. 5. Further, a roller 150 is biased against the drive wheel 112 by an air cylinder 152, wherein the vane tape 105 passes between the surface of the roller and the drive wheel. Operationally, actuation of the motor 110 causes the drive wheel 112 to rotate counterclockwise (as viewed from FIG. 4) in turn pulling the vane tape 105 off of the roll 108, and into the downwardly tapered bin 114. In an alternative embodiment, one or more creasing blades (not shown) can be incorporated into the drive wheel 112 and/or the roller 150 to crease the vane tape if vane tape that is not pre-creased is utilized.

The sensor pair 115 create a horizontal beam across the bin 114 proximate the bin's bottom. The sensor pair is electronically coupled to the motor 110, acting to switch the motor off when the beam is broken by a strip of the unwound vane tape 105. It is to be appreciated that once the tape is unwound from the roll 108 it is not longitudinally tensioned permitting it to hang freely in the bin 114.

Figure 5:
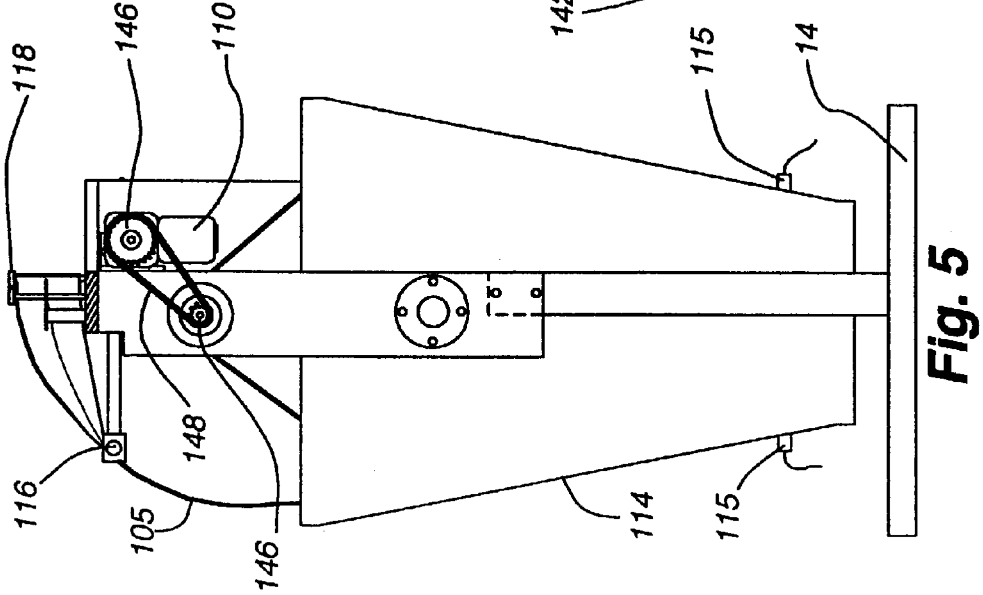
FIG. 5 is a vertical section taken along line 5—5 of FIG. 1A.
Figures 6, 7:
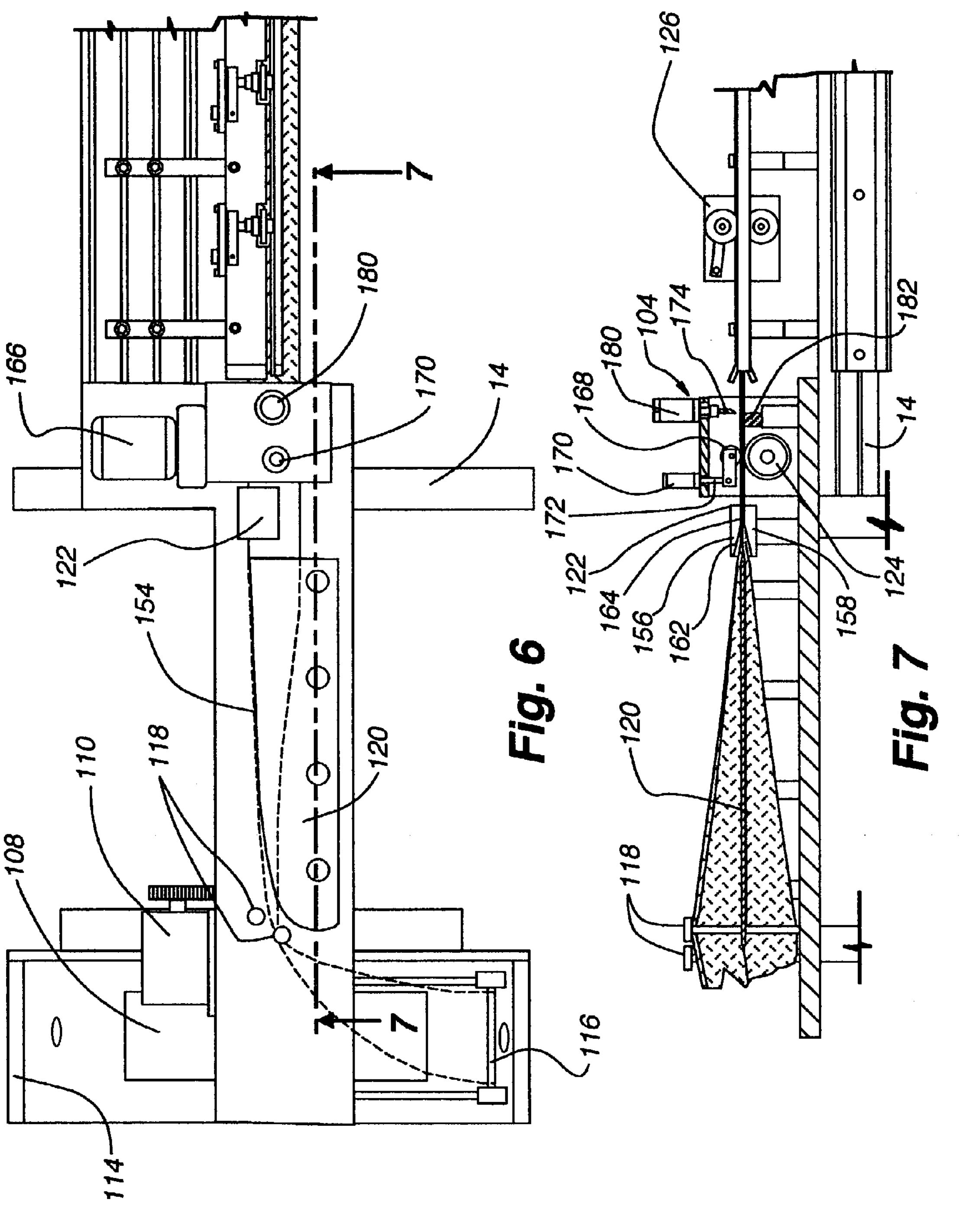
FIG. 6 is a fragmentary top plan view of a portion of the forming and sizing section of the vane fabrication apparatus.
FIG. 7 is a fragmentary side elevational view of a portion of the forming and sizing section of the vane fabrication apparatus taken along line 7—7 of FIG. 6.

From its nadir, the vane tape 105 loops upwardly passing over and resting on a horizontally orientated support rod guide 116 located above the plexiglass bin. From the support rod 116, the vane tape is encouraged from a generally longitudinally vertical orientation to a generally longitudinally horizontal position, wherein the tape is also vertically orientated in its lateral direction as best seen in FIGS. 4, 5, and 6. The vane tape is held in its laterally vertical orientation by two closely spaced vertical guide rods 118 that extend upwardly from the top surface of the apparatus 10.

Referring to FIGS. 6 and 7, the horizontally disposed forming plate 120 is supported above the top surface of the apparatus at a distance generally equal to the lateral distance from one edge of the vane tape to the longitudinal crease 136 proximate the tape's centerline, such that the rear edge 154 of the plate 120 (as viewed in FIG. 6) is coplanar with the vertically oriented vane tape's longitudinal crease 136 as it is pulled to the right past the two vertical guide rods 118. The plate's rear edge 154 is curvilinearly tapered rearwardly as it extends toward the right. It is of particular note that the rightmost portion of the rear edge 154 is located to the rear of the vertical guide rods 118. Accordingly, as the vane tape is pulled to the right by the motor driven drum 124 (as described below), the crease 136 of the vane tape is pulled up against the rear edge 154 of the plate 120, causing the vane tape 105 to begin to fold both over and under the plate.

Next, the partially folded vane tape 105 is pulled through the forming guide 122, which completes the fold along the cease 136, causing a top side 134 of the vane tape to fold over a bottom side 142 of the vane tape. Referring to FIG. 7, the forming guide 122 comprises upper and lower plates 156 and 158 that form a C-shaped slot with a horizontal center that is generally coplanar with the plate 120 and the crease 136 of the vane tape 105. A left portion 162 of the slot tapers from the left to the right with the right end of the plate 120 extending between the left portion 162 of the slot. The right portion 164 of the slot includes spaced parallel top and bottom surfaces. The backside of the slot is generally aligned with the folded edge of the vane tape.

As mentioned above, the tape 105 is pulled up from the base of the bin 114, through the guides 116 and 118, across the plate 120, and through the forming guide 122 by a rotating drum 124 attached to an electric drive motor 166. The drum 124 is located to the right of and adjacent to the forming guide 122. The motor 166 is electrically coupled with the control system (not shown) of the apparatus 10 for precise operational control. Typically, the drum 124 is switched off once the front edge of the folded vane tape passes through the sensor array 102, located to the right of the drum that is utilized to set the length of each vane as will be described in greater detail below. The drive drum assembly further includes a roller 168 that is biased against the drum 124 by an air cylinder 170, wherein the vane tape passes between the surface of the roller 168 and the drum 124. The substantially vertical shaft 172 extending from the air cylinder 170 with which the roller 168 is attached is free to pivot about its longitudinal axis. Accordingly, the drive drum assembly operates only to pull the tape 105 from the bin 114 and push the folded vane tape 105 towards the sensor array 102, and not to control the front to rear tracking or positioning of the vane tape.

The guillotine 104 is positioned to the right of and adjacent to the drum 124. The guillotine comprises a blade 124 having a generally horizontal cutting edge disposed above the folded vane tape, wherein the blade 124 is perpendicular to the longitudinal axis of the vane tape as best seen in FIG. 7. The blade 124 is connected to a vertically orientated shaft of an air cylinder 180 that is pneumatically coupled with a control system actuatable air valve (not shown). A block 182 is also provided underneath the folded vane tape 105 that spans the width of the vane tape to support the tape just to the left of the blade 174 as the tape is being cut. It is appreciated that unlike the vane tape to the left of the drum 124, the folded vane tape 105 to the right is held in tension, such that it has sufficient tautness to facilitate a clean cut. The folded vane tape is held to the left of the guillotine 104 by the drum 124 which is stationary during the cutting operation and essentially acts to lightly clamp the tape between the drum and the biased roller 168. To the right of the guillotine 104, the vane tape 105 is held by one or more feeder motor assemblies 126 that are not in operation during the cutting operation and also act to lightly clamp the folded vane tape in place.

Figure 8:
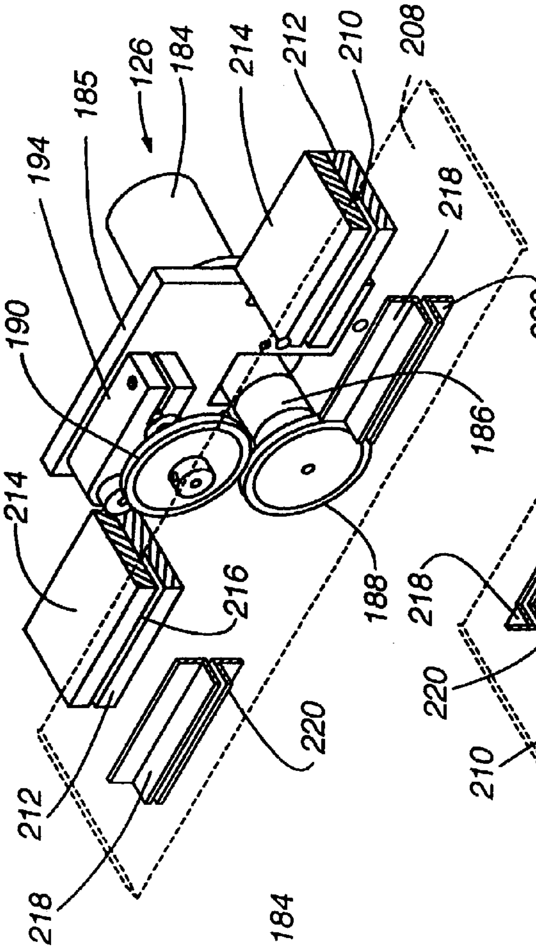
FIG. 8 is an isometric top plan view of a feeder motor assembly from the forming and sizing section of the vane fabrication apparatus.
Figure 9:
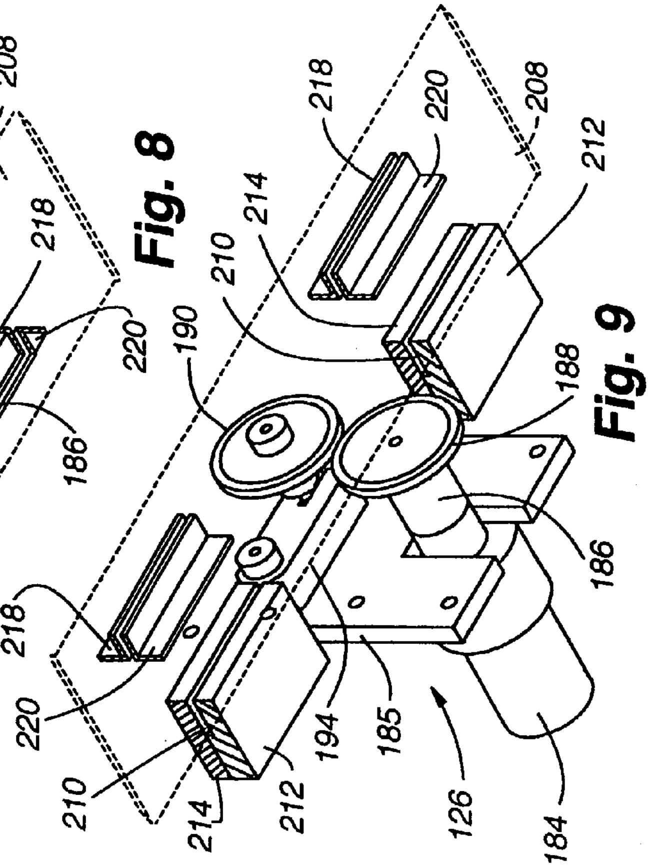
FIG. 9 is an isometric bottom plan view of a feeder motor assembly from the forming and sizing section of the vane fabrication apparatus.
Figure 10:
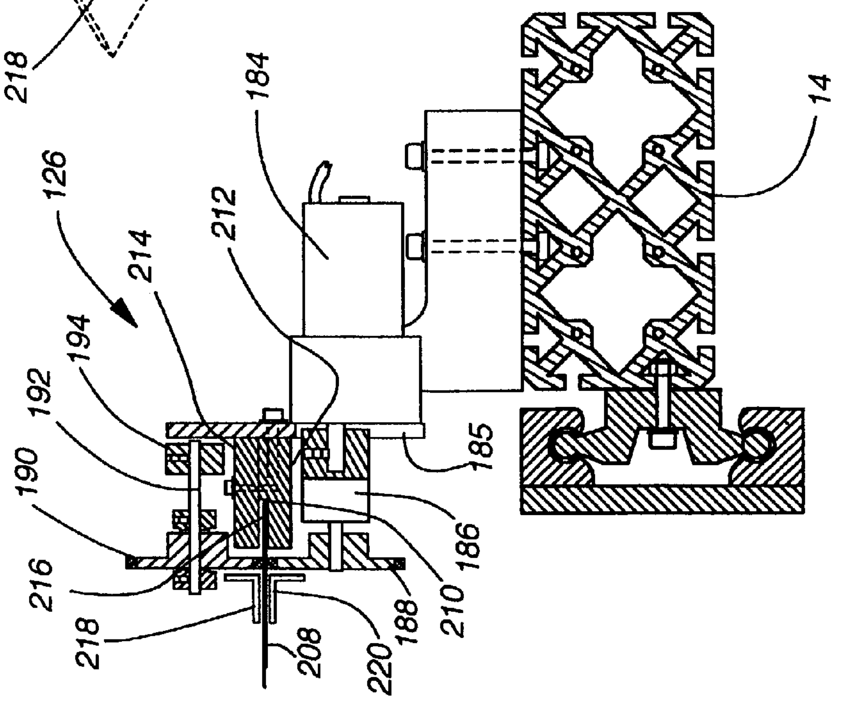
FIG. 10 is a cross sectional view of the feeder motor assembly taken along lines 10—10 of FIG. 1A.

As mentioned above, a number of feed motor assemblies 124 are utilized to advance the folded vane tape 105 through both the forming and sizing, and bonding sections 100 and 300 respectively of the apparatus 10. A typical feeder motor assembly is illustrated in FIGS. 8–10. The feeder motor assembly 124 includes: (i) a motor 184 that is affixed to a vertically extending mounting plate 185 attached to the top side of the apparatus framework 14; (ii) a torque control clutch 186 coupled with the shaft of the motor; and (iii) a drive wheel 188 coupled to the clutch. The feeder motor assembly 126 further includes an upper wheel 190 disposed directly above the drive wheel. The upper wheel is rotatably coupled via a bearing and a shaft 192 to a distal end of a cantilevered arm 194. The proximal end of the cantilever is pivotally connected to the vertically extending mounting plate 185.

In operation, the drive wheel 188, which is typically located below the folded vane tape 105, is rotated clockwise as shown in FIGS. 8 and 9. The vane tape passes between the drive wheel 188 and the upper wheel 190 with the weight of the upper wheel acting through the cantilever 194 providing sufficient biasing force against the drive wheel to generate traction against the vane tape and propel it forward. The vane tape passes through the drive and upper wheels near the folded edge of the vane tape. As can be appreciated, in the vane forming and sizing section 100, the feed motor assemblies 126 operate in conjunction with the motor driven drum 124 when feeding folded vane tape between the guillotine 104 and the sensor array 102.

The clutch 186 provided between the motor 184 and the drive wheel 188 of each feeder motor assembly 126 helps ensure that all the drives wheels of associated feeder motor assemblies are operating at the same speed and applying the same level of torque to the vane tape, so that the vane tape moves uniformly through the apparatus 10 without buckling or bunching up between feeder assemblies. Essentially, the clutch 186 allows the drive wheel 188 to rotate free of the motor's drive shaft below a certain rpm level. Accordingly, when the motors 184 are switched off, the drive wheels 188 can still spin freely to allow the tension in the vane tape between each of the feeder motor assemblies 126 to equalize. In the preferred embodiment a Perma-Tork HC01-1 clutch assembly, manufactured by Magpower of Fenton, Mo., is utilized.

Figure 11:
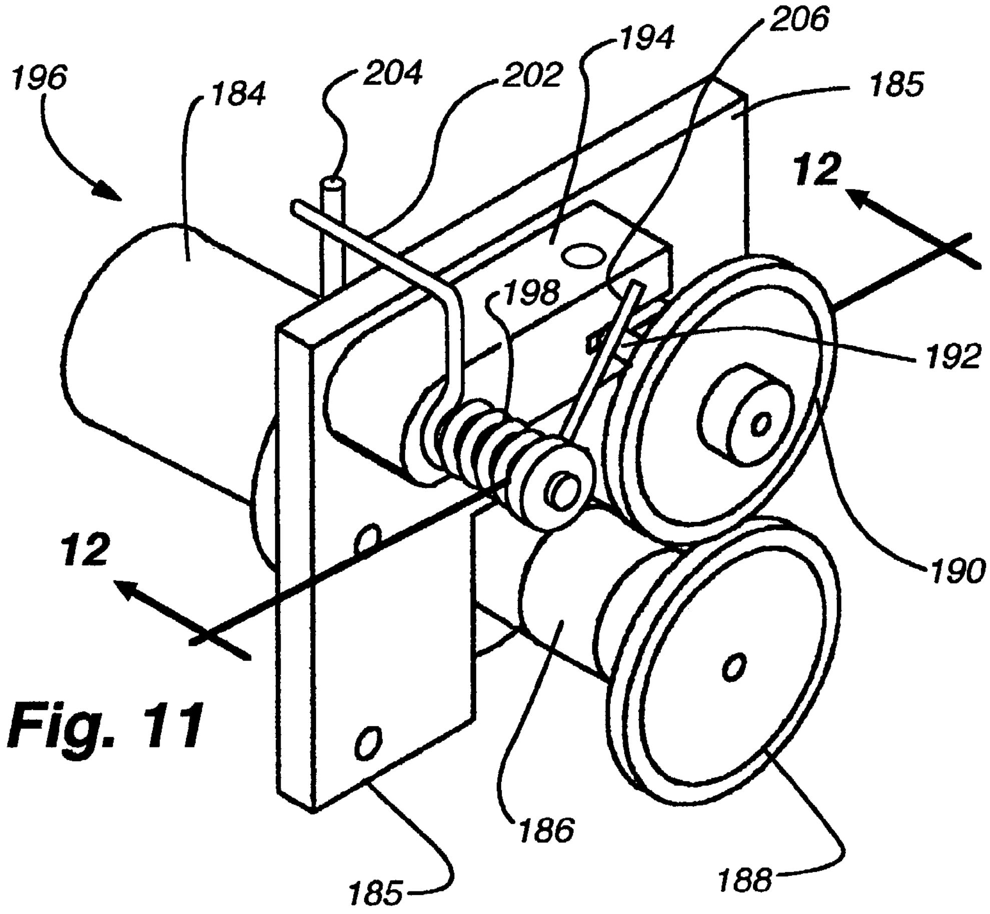
FIG. 11 is an isometric view of a second feeder motor assembly as utilized in the bonding and subassembly sections of the vane fabrication apparatus.
Figure 12:
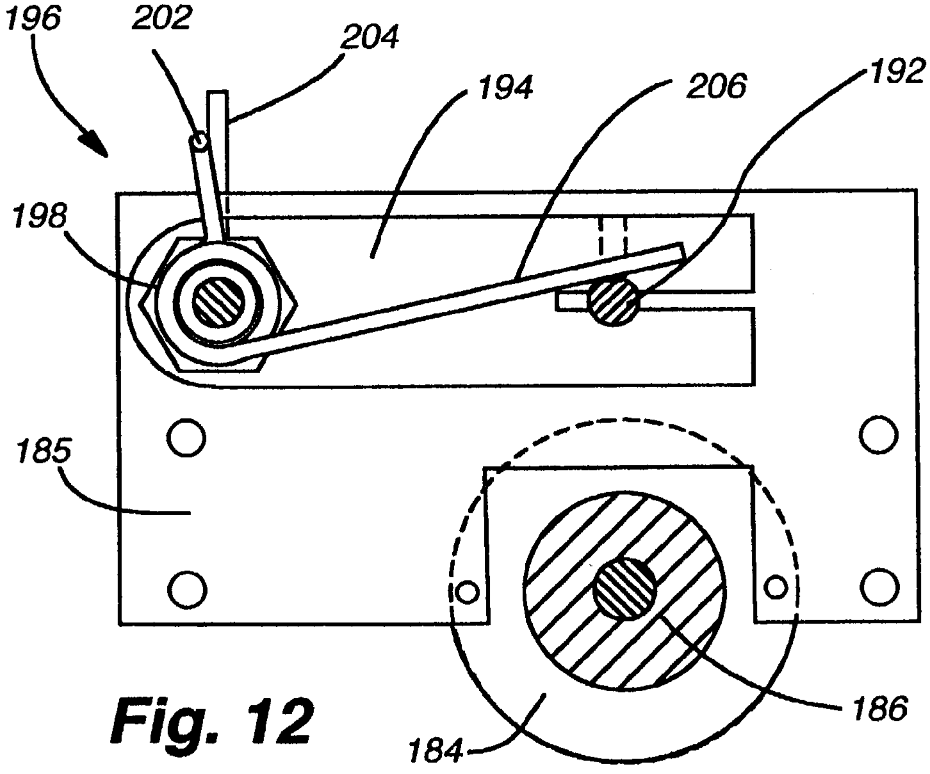
FIG. 12 is a cross sectional view of the second feeder motor assembly taken along line 12—12 of FIG. 11.

A second type of feeder motor assembly 196 is illustrated in FIGS. 11 and 12 for use when a more secure grip on the vane or vane tape is desired as the vane or vane tape is advanced through the various sections of the fabrication apparatus 10. The second type feeder motor assembly 196 is very similar to the previously described feeder motor assembly 126 except that a coil spring 198 is provided to apply a downward bias to the upper wheel 190. The shaft 192 to which the cantilevered arm 194 is pivotally attached extends outwardly beyond the surface of the cantilevered arm as best shown in FIG. 11. The coil spring 198 is received over the shaft 192. A first end 202 of the coiled spring extends vertically a short distance until it clears the cantilever arm and the vertically extending mounting plate 185, wherein it is bent 90 degrees and extends horizontally, bracing up against a vertical shaft 204 that is fixedly attached to the mounting plate 185. The other end 206 of the spring radiates from the coil and is biased against the shaft 192 of the upper wheel 190. In the illustrated embodiment, the second type feeder motor assembly 196 is utilized in the bonding and subassembly sections 300 and 400 of the fabrication apparatus 10. In other alternative embodiments, the second type feeder motor assemblies 196 incorporating a biasing spring are utilized throughout the fabrication apparatus in place of the first type of feeder motor assemblies 126 without a biasing spring.

Referring back to FIGS. 1A and 2A, the folded vane tape 105 is transported from the motor-driven drum 124 towards the sensor array 102. The distance between the sensor array and the guillotine 104 sets the length of the vanes 208 fabricated from the vane tape 105. The various feeder motor assemblies 126 assist the drum 124 in propelling the vane tape forward. As is shown in greater detail in FIGS. 8–10, guide members are provided between the feeder assemblies to ensure that the vane tape remains properly aligned and to ensure the vane tape remains folded and compressed. The folded longitudinal edge of the folded vane tape is butted up against a vertical fence 210, which defines the rearmost position of the folded vane material. The vertical fence 210 is formed from a lower plate 212 that has a thinner front portion and a thicker rear portion. The upwardly facing surface of the front portion provides a support for the bottom side of the folded vane tape. Periodically, along the length of the sizing portion of the form and sizing section 100, an upper plate 214 that overhangs the fence 210 and the downwardly facing surface of the upper plate is secured to the rear thicker portion of the lower plate 212 to form a slot 216 for containing the folded longitudinal edge of the vane tape. Additionally, a pair of opposing elongated L-brackets 218 and 220 extend along the length of the apparatus between the guillotine 104 and the sensor array 102 in front of the drive and upper wheels 188 and 190 of the feeder motor assemblies 126. A top L-bracket 218 has a downwardly facing horizontal bottom side, which prevents the vane material from flying out of the apparatus. The lower L-bracket 220 has an upwardly facing top side that is spaced from the bottom side a sufficient distance so that the folded vane tape can easily slide therethrough. Together, the L-brackets 218 and 220 keep the top and bottom sides 134 and 142 of the vane tape 105 located in front of the drive wheels 188 lightly compressed against each other.

As previously stated the drive and upper wheels 188 and 190 of the feeder motor assemblies 126 are generally longitudinally aligned with the longitudinal axis of the folded vane tape 105. Although in a preferred embodiment, the wheels 188 and 190 are canted slightly rearwardly a few degrees so that as the vane tape is moved to the right, the vane tape is also encouraged up against the vertical fence 210, helping to ensure that the tape is properly positioned for subsequent fabrication operations.

Figure 13:
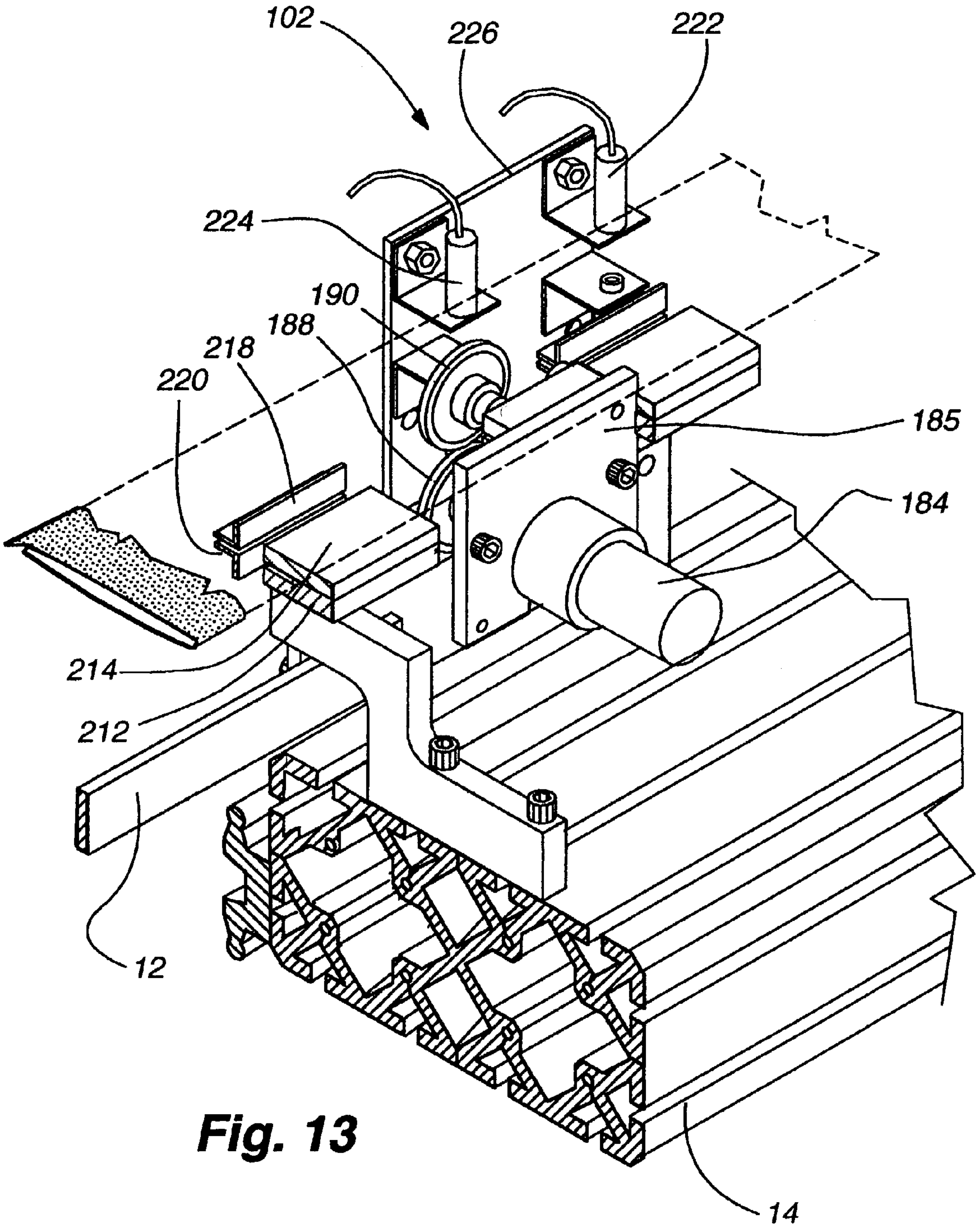
FIG. 13 is a fragmentary isometric view of the forming and sizing section showing a feeder motor assembly and the sensor array.
Figure 14:
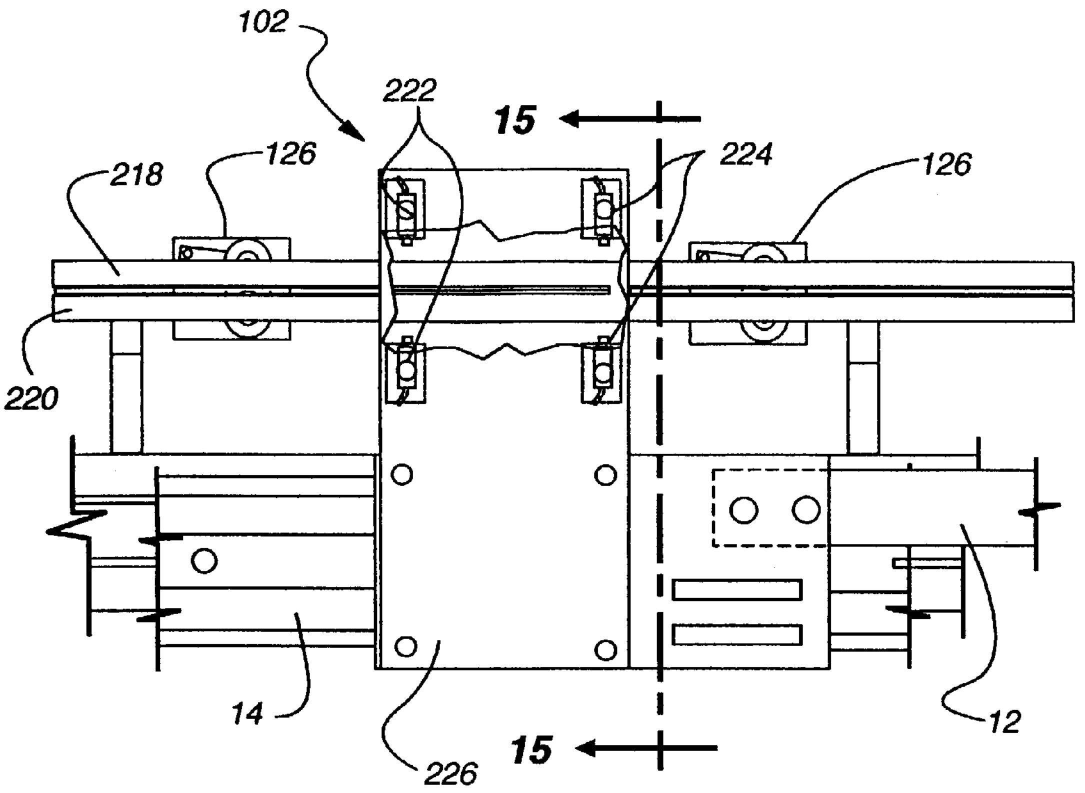
FIG. 14 is a fragmentary front elevational view of the forming and sizing section showing the sensor array, two feeder motor assemblies and the L-shaped guides.
Figure 15:
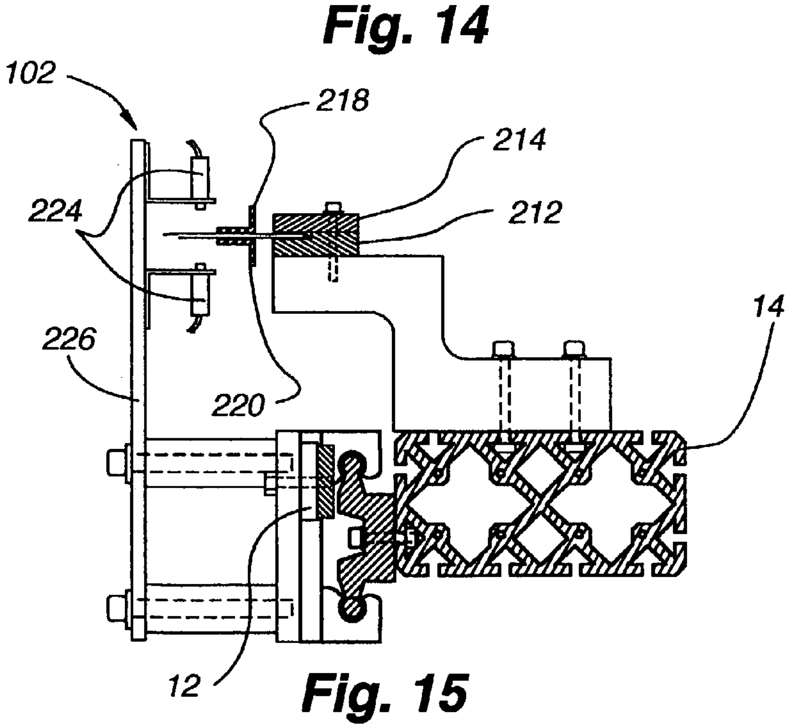
FIG. 15 is a cross sectional view of a portion of the forming and sizing section illustrating the sensor array and the vane guides as taken along line 15—15 of FIG. 14.
Figure 16:
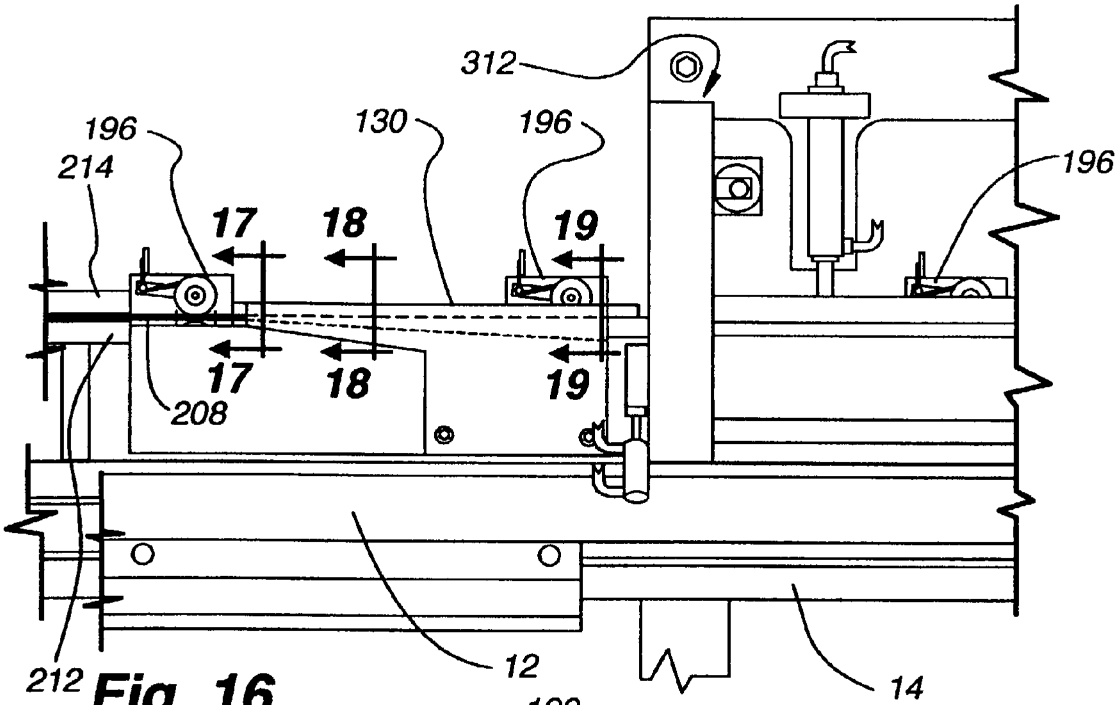
FIG. 16 is a fragmentary front elevational view of the end of the forming and sizing section and the beginning of the bonding section.

Referring to FIGS. 13–15, two pair of light beam sensors 222 and 224 of the sensor array 102 are disposed above and below the path of the front portion of the folded vane tape 105, and are horizontally spaced several inches from the other pair along the longitudinal length of the vane tape. A substantially vertical beam of light is emitted from a first sensor of each pair and is received by a second sensor that is aligned with the first sensor. The sensors are coupled to the control system which turns the drum motor 166 and the feeder assembly motors 126 off and on based on whether the beams of light have been obstructed.

As described earlier, it is the distance between the sensor array 102 and the guillotine 104 that determines the length of the vanes fabricated in the apparatus 10. The sensor support plate 226 to which the sensor pairs 222 and 224 are coupled is slidable along the framework 14 of the apparatus 10. The sensor support plate 226 s in turn coupled with the catch mechanism assembly 302 in the subassembly fabrication section 400. By releasing and moving the catch mechanism assembly, as is described below, the distance between the guillotine 104 and the sensor array 102 can be varied.

In operation, the front edge of the folded vane tape 105 moves to the right propelled by the motor-driven drum 124 and the feeder motor assemblies 126. As the front edge of the vane tape passes between the light beam of the first sensor pair 222, the control system prepares to shut off the feeder motor assemblies 126 and drum drive motor 166. Once the beam of the second sensor pair 224 is obstructed, the control system shuts off the motors 166 and 184. It is to be appreciated that because of the clutches 186 utilized in each of the feeder motor assemblies 126, turning off the feeder assembly motors 186 will not prevent the vane tape 105 from traveling further to the right. Therefore, it is the drum 124 with its positive coupling with its drive motor that effectively brakes and stops the forward movement of the vane tape 105. After the movement of the vane tape has been stopped, the guillotine 104 is activated and the folded vane material is cut, creating an in progress vane 208. By using a two-stage stopping mechanism, the length of the vanes 208 can be precisely controlled, wherein the variance from one vane to another is typically less than 1 millimeter.

Next, the feeder motor assemblies 126 are turned back on to move the in progress vane 208 into the bonding section 300 for fabrication into a completed tubular vane. Once the cut vane 208 has been moved to the next section, the drum motor 166 reactivates feeding a new front edge of the folded vane tape 105 towards the sensor array 102 so that another vane 208 can be cut.

Figure 17:
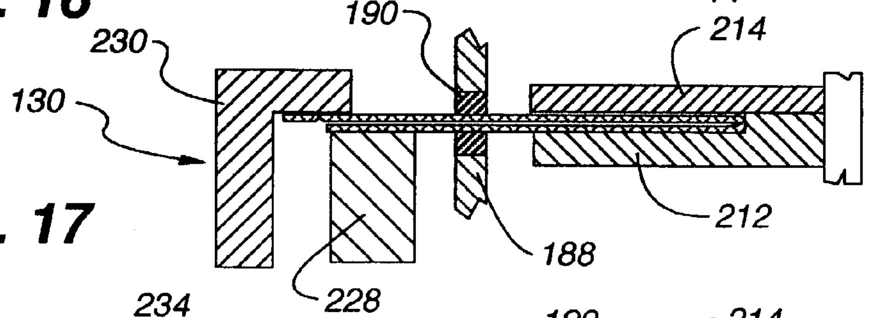
FIGS. 17, 18 and 19 are all cross sectional views of the flap folding guide taken along lines 17—17, 18—18 and 19—19 of FIG. 16 respectively.

As the in-progress vane 208 is fed from the forming and sizing section 110 into the bonding section 300, the vane's flap 132 extends generally horizontally outwardly from the top side 134 as can best be seen in FIG. 17. Referring to FIGS. 16–19, the folding guide 130 is provided to fold the flap 132 downwardly about the flap crease 138 to a generally vertical orientation as the vane 208 is fed into the bonding section 300. The folding guide 130 includes two pieces; a support piece 228 providing a horizontal surface to support the front portion of the vane 208 proximate the unbonded edges of the top and bottom sides 134 and 142, and forming piece 230 which has surfaces that taper and change orientation to move the flap 132 from the horizontal to a vertical position.

Figure 18:
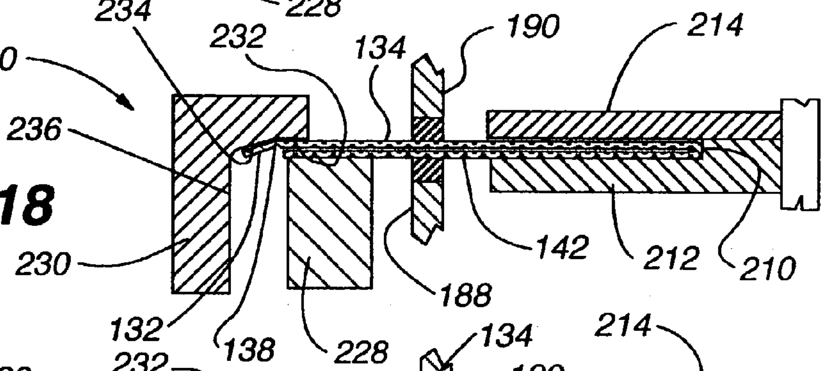
Figure 19:
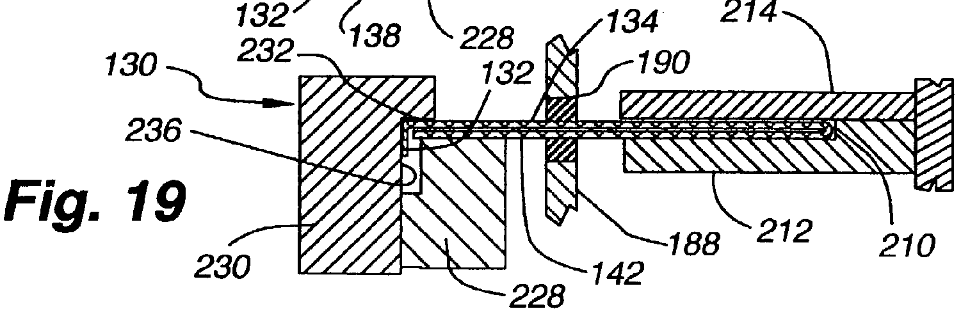
Figure 20:
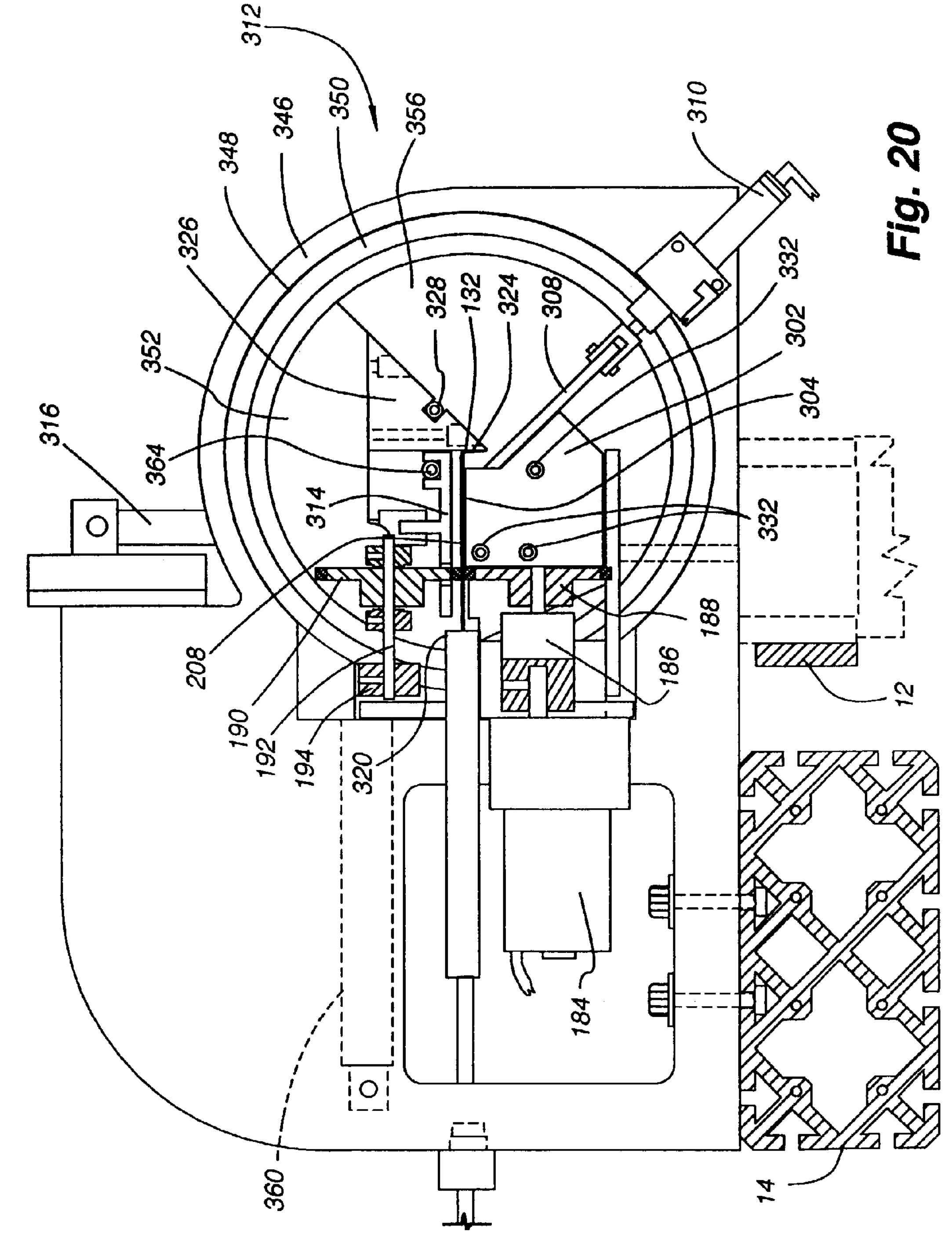
FIG. 20 is a cross sectional view of the left end of the bonding section taken along line 20—20 of FIG. 1A.

The elongated forming piece 230 includes several inside surfaces that vary as they extend from left to right. Proximate the leftmost edge of the forming piece, a cross section of the forming piece as illustrated in FIG. 17 reveals a downwardly facing horizontal surface 232 which over hangs the flap 132 and a small portion of top side 134. Moving to the right as seen in FIG. 18, the portion of the downwardly facing horizontal surface in front of the flap crease 138 cants downwardly from an axis adjacent the flap crease to form a rearwardly and downwardly facing canted surface 234. Furthermore, a rearwardly facing and tapering vertical surface 236 extends from the frontmost edge of the canted surface. From left to right (as viewed in FIG. 16), the angle of incidence between the remaining horizontal surface 232 and the canted surface 234 continues to increase until the canted surface 234 effectively merges with the vertical surface 236 as is shown in FIG. 19. Additionally, the vertical surface 236 tapers rearwardly (to the right as shown in FIG. 19) until it intersects directly with the edge of the remaining horizontal surface 232 at the axis adjacent the flap crease 138. As illustrated in FIGS. 17–19, the flap 132, which is butted up against the surfaces of the forming piece 230 is encouraged from a generally horizontal orientation to a downwardly extending vertical position as it travels through the folding guide 130.

The Bonding Section

The bonding section 300 of the vane fabrication apparatus 10 is illustrated in FIGS. 20–29. The primary function of the bonding section is to adhesively join the longitudinal edges of the in-progress vane 208 to create a completed tubular vane 208. The bonding section 300 includes: (1) an enclosed heater containment block 302 having a horizontal support surface 304 upon which the bottom side 142 of the in-progress vane 208 rests during the bonding operation; (2) an elongated heater 306 contained within the heater containment block beneath the support surface for heating the resin 144 disposed on the flap 132; (3) a heater cover plate 308 coupled with one or more air cylinders 310 for moving between (i) a closed position in between the flap and the heater, and (ii) an open position, wherein the resin is exposed to the heat radiation emanating from the heater; (4) a pivotal bond anvil assembly 312 for moving the flap with the melted resin from the vertical position to a horizontal position in contact with the bottom side 142 of the vane 208; and (5) an elongated clamp plate 314 attached to a plurality of air cylinders 316 for applying downwardly-directed pressure to the bondline.

Figures 22, 23, 24:
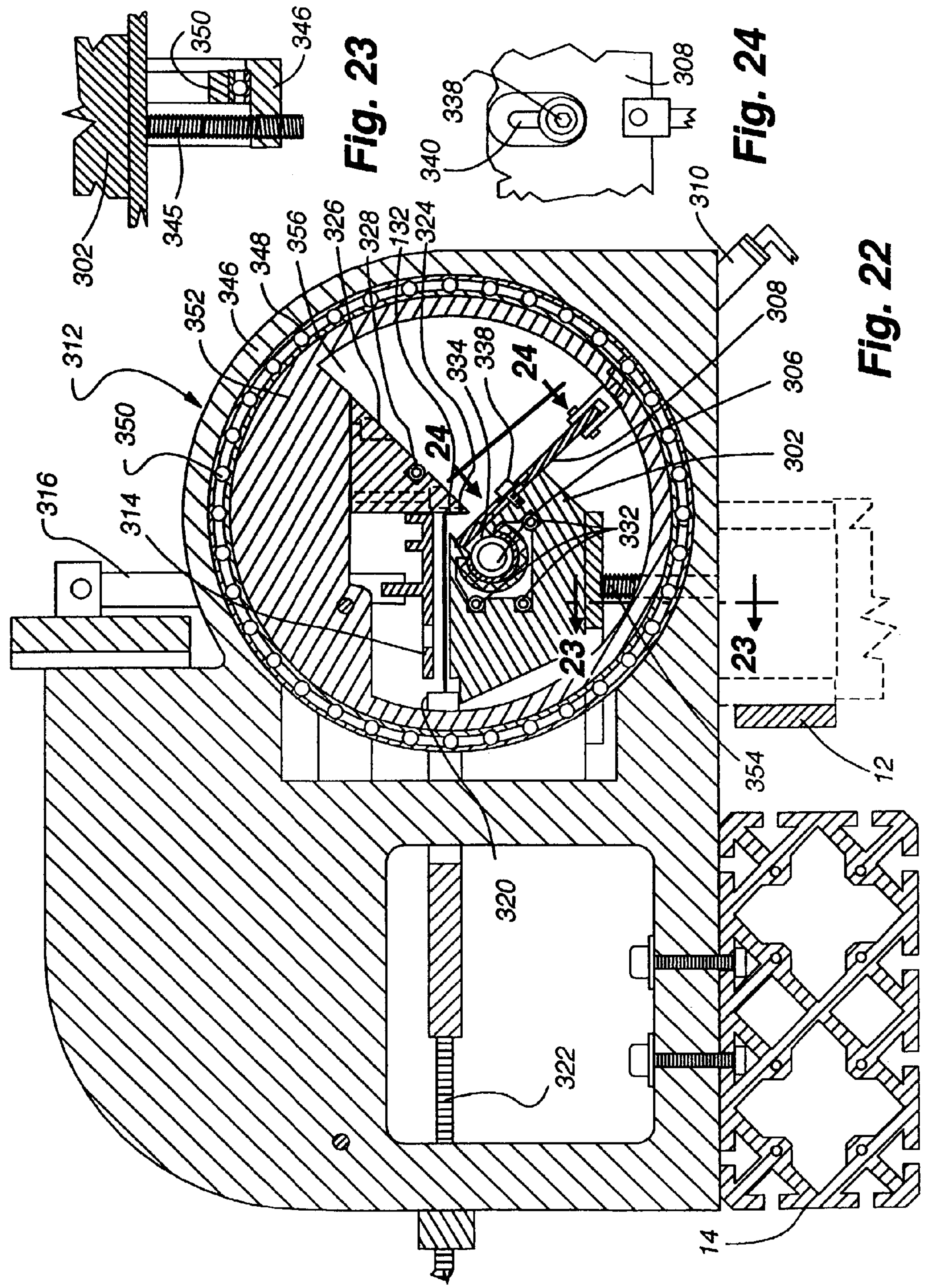
FIG. 22 is a cross sectional view of the bonding section taken along lines 22—22 of FIG. 1B.
FIG. 23 is a cross sectional view of a vertical adjustment screw for containment block taken along line 23—23 of FIG. 22.
FIG. 24 is a fragmentary cross sectional view of the heater cover plate taken along line 24—24 of FIG. 22.
Figure 25:
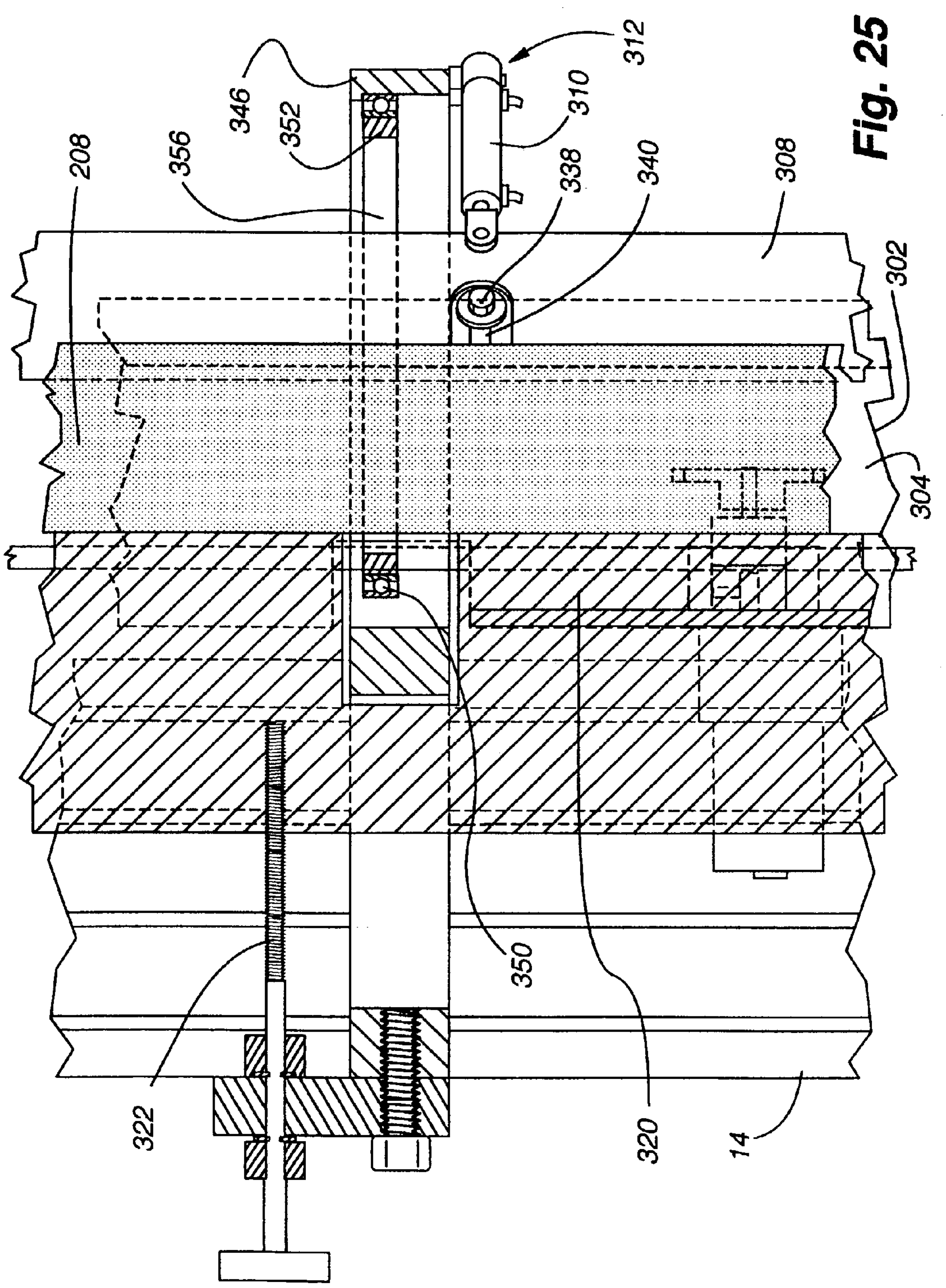
FIG. 25 is a fragmentary cross sectional top view of bonding section taken along line 25—25 of FIG. 20.

Referring to FIGS. 20–25, cutaways 318 are periodically provided near the rear longitudinal edge of the containment block 302 to provide space for feeder motor assemblies 196, such as those described in reference to FIGS. 11 and 12, that are utilized to move the vane 208 through the bonding section 300. As shown, the right side of the vane (as viewed in FIG. 20) proximate the unbonded edges overhangs the right edge of the support surface 304. It is this overhanging portion of the vane's bottom side 142 that is bonded to the inside surface of the flap 132 to form the completed vane 208. A fence 320 is provided along the folded edge of the vane 208, which can be adjusted laterally via long screws 322 (as shown in FIGS. 22 and 25) to ensure the proper alignment of the vane on the support surface 304 of the containment block 302.

The downwardly extending vertically orientated flap 132 of the in-progress vane is prevented from springing back to a substantially horizontal position by a vertically orientated bond side 324 of an elongated triangularly shaped bond anvil 326 of the pivoting bond anvil assembly 312. The bond anvil 326 includes one or more cooling hoses 328 passing through it to maintain the temperature of the anvil below the melting point of the vane flap's thermoplastic resin 144. As will be discussed in greater detail below, when activated the bond anvil assembly 312 pivots the anvil 326 approximately 90 degrees such that the bond side 324 moves to a horizontal orientation, wherein the flap is brought into contact with the bottom side 142 of the vane 208.

Figure 21:
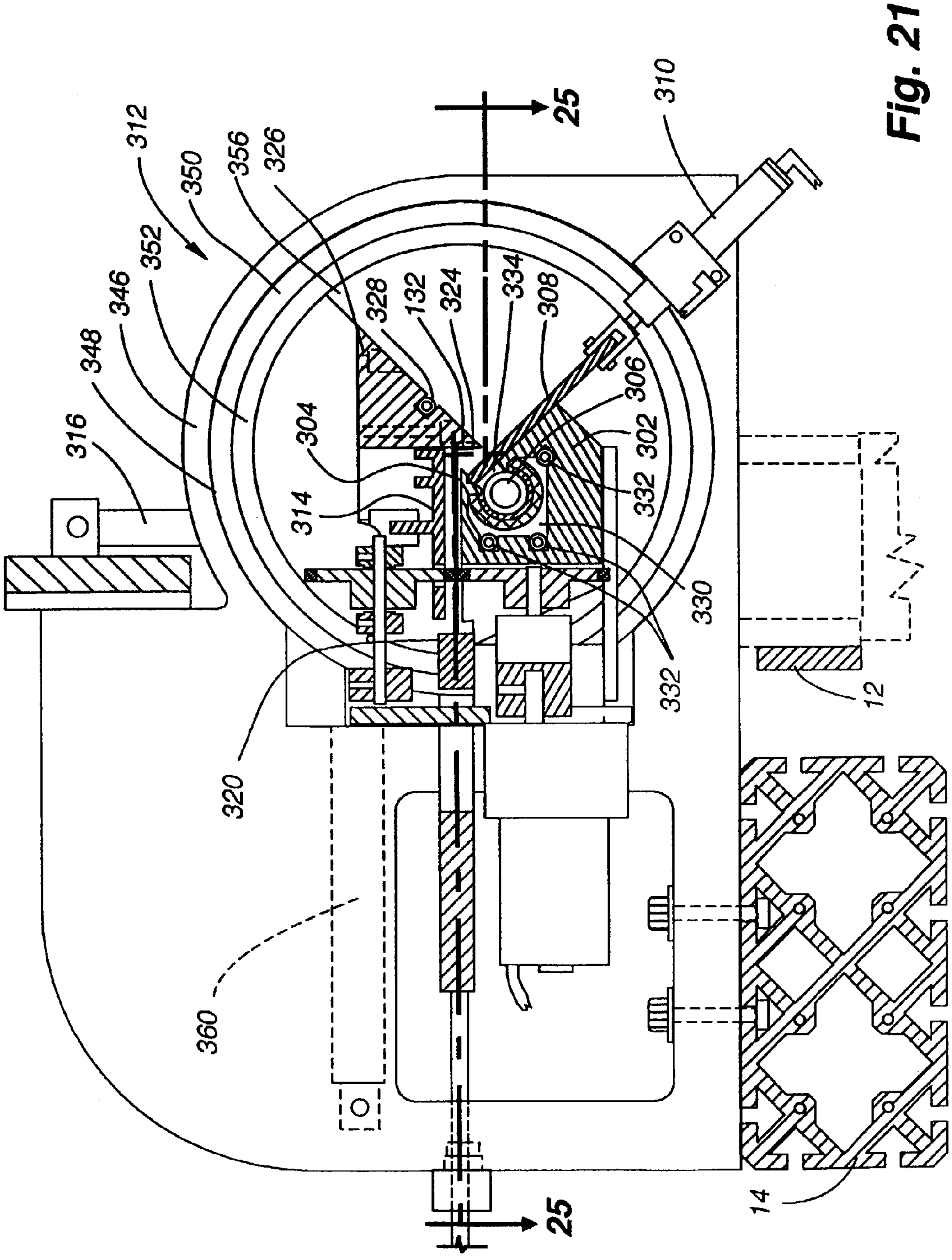
FIG. 21 is a cross sectional view of the bonding section taken along lines 21—21 of FIG. 1B.

The high temperature elongated rod heater 306 capable of heating to temperatures in excess of 1000 degrees Fahrenheit is mounted within a cavity 330 of the heater containment block 302 as can best be seen in FIGS. 21 and 22. As shown, the rod heater 306 is insulated around approximately 270 degrees of its surface to minimize heat transfer from the heater into the heater containment block 302. Further, a series of cooling pipes 332 extend longitudinally along heater containment block within the cavity 330. Cold water is circulated through the cooling pipes to minimize any increase in temperature of the containment block during the bonding operation. The uninsulated portion of the heater faces upwardly and rightwardly in the direction of the flap 132 through an elongated opening 334 in the heater containment block.

Normally, the elongated opening 334 in the containment block cavity 330 is covered by the heater cover plate 308 as shown in FIGS. 20–25. The heater cover plate rests against an upwardly and rightwardly facing surface of the containment block 302. The plate is held in place by a series of air cylinders 310 that have shafts coupled to a bottom longitudinal edge of the plate. The cylinders are actuatable to move the plate 308 between a normally closed position as illustrated and an open position, wherein the plate is retracted exposing the vane flap 132 to heat radiation emanating from the heater 306 through the elongated opening 334. The plate is also secured to the surface of the containment block 302 by a plurality of screws 338 riding in slots 340 in the plate as best shown in FIG. 24. The top longitudinal edge 342 of the plate is pointed and is received in a similarly shaped cavity 344 on the surface of the containment block when the plate is closed to minimize the release of heat from the heater.

As mentioned above, the bond anvil 326 is pivotable such that the vertical bond surface 324 against which the vane flap rests can be rotated 90 degrees to a horizontal orientation. The pivotal bond anvil assembly 312 includes a series of stationary vertical support plates 346 that are spaced along the length of the heater containment block 302, wherein each of the plates is fixedly secured to the framework 14 of the apparatus 10. Each of the plurality of support plates 346 have circular openings 348 passing through them, wherein the openings are all longitudinally aligned and have the containment block with the heater cover plate 308 passing within each of the openings. As shown, the air cylinder actuators 310 for moving the cover plate between its opened and closed positions are mounted to at least several of the support plates.

Circumscribing and mounted to an inside surface of each of the support plate openings 348 is a large diameter sealed bearing 350. In turn, a circular pivotal anvil plate 352 is mounted to the inside surface of the sealed bearing 350 for free rotational movement relative to the fixed support plate 346. As can be appreciated, a significant portion of each anvil plate 352 has been removed to form an opening 356 permitting the heater containment block and the cover plate to pass therethrough. As shown in FIGS. 22 and 23, the containment block is supported within each of the vertical support plates 346 by way of vertically disposed screws 354 that can be utilized to adjust the height of the containment block 302 as necessary. The bond anvil 326 also passes through the opening in each anvil plate 352 and is secured to the surface of each opening 356 for pivotal movement in concert with the anvil plates 352. It is of particular note that the center point of each circular anvil plate is located proximate the flap crease 138 of a properly indexed vane 208. On the preferred embodiment the vertical bond surface 324 of the bond anvil 326 is located 0.010 to 0.020" horizontally from the center point to accommodate for the thickness of the vane 208 and the bondline of the resin 144 when the edges are being joined as will become more apparent below. Accordingly, as the bond anvil is pivoted 90 degrees during the bonding operation, it does not push up against the vane and change its position. Rather, the anvil merely pivots the flap about a longitudinal axis formed by the flap crease.

Figure 26:
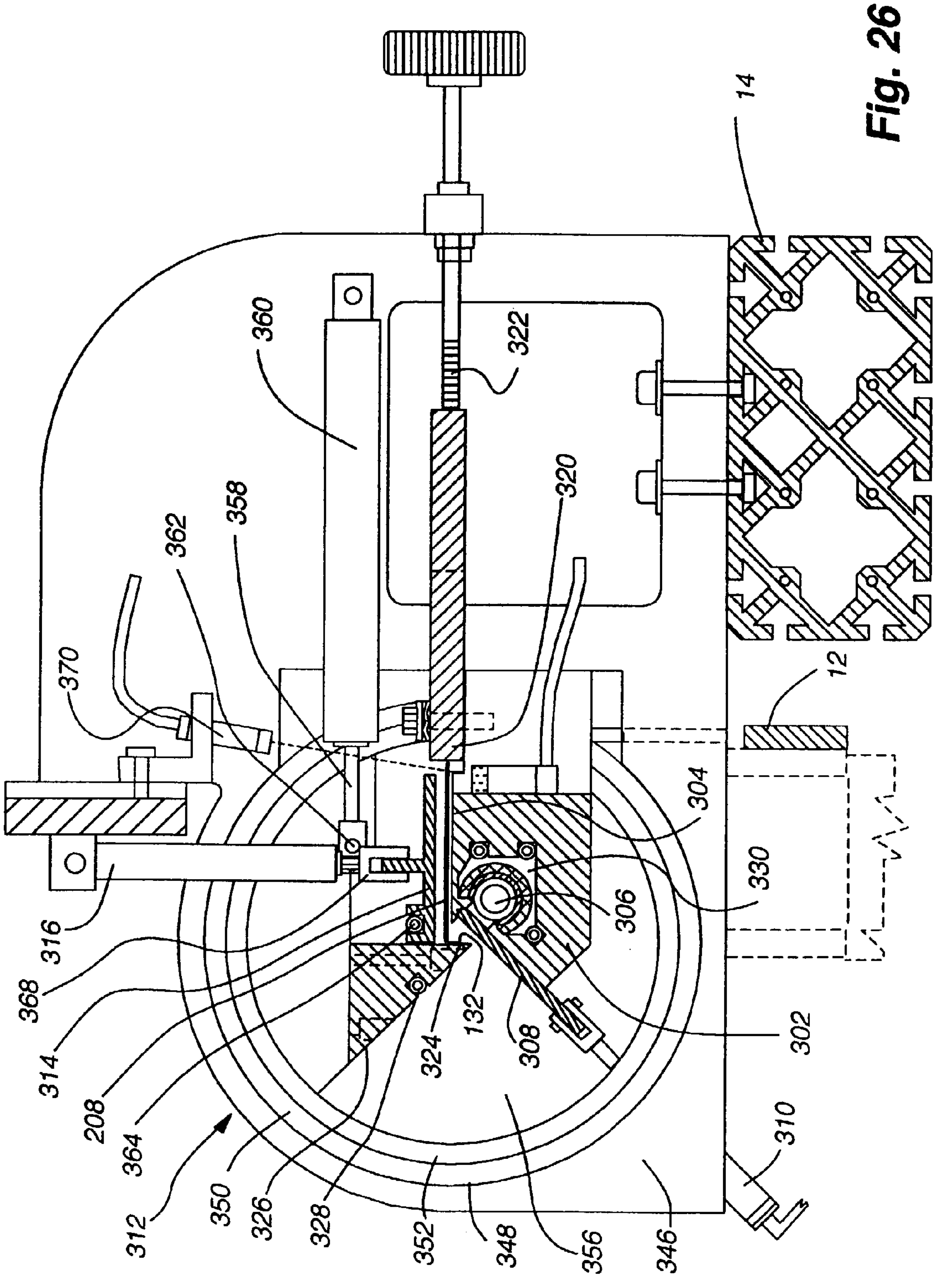
FIG. 26 is a cross sectional view of the bonding section taken along lines 26—26 of FIG. 1B.

To cause the pivotal movement of the bond anvil 326, the shafts 358 of one or more air cylinders 360 are pivotally coupled with one or more of the anvil plates 352 at connection points 362 located on the anvil plates above and to the right of the anvil plates' centerpoints as viewed in FIG. 26. The other end of each air cylinder 360 is pivotally coupled to an associated fixed support plate 346. Accordingly, when actuated, the shafts 358 move outwardly to the left (as shown in FIG. 26) and initially upwardly following the arc of the shaft's connection points 362 on the anvil plates 352 relative to the centerpoints until the connection points reach apexes directly above centerpoints, wherein the shafts 358 and connection points continue to move to the left as well as, downwardly. It is appreciated that once the connection points have moved to locations that are essentially coplanar with the locations of the connection points when they are in the retracted position, the anvil plate 352 will have rotated 90 degrees. Since it is desirable to have a substantially horizontal surface on which to bond the flap 132 to the bottom side 142 of the vane 208, it is necessary to prevent further counterclockwise rotation of the anvil plates 352 past 90 degrees. This may be accomplished in any one of a number of ways including (1) providing stops along the bottom of the air cylinders 360 that prevents them from pivoting downwardly or (2) limiting the maximum extension of the air cylinder's shafts 358.

Referring primarily to FIG. 26, the elongated clamp plate 314 with a downwardly facing horizontal surface is suspended above and is coextensive with the containment block's support surface 304. Further, the right side of the clamp plate 314 overhangs the right edge of the support surface 304 and is situated directly above the overhanging portion of the vane 208. Situated along the top side of the overhanging portion of the clamp plate is a cooling hose 364 through which water is circulated to maintain the clamp plate below the melting point of the vane's thermoplastic resin 144. The clamp plate 314 is suspended above the vane by the shafts of a plurality of air cylinders 316, each of which is attached to the clamp plate 314 through a clevis joint 368. In turn, the top end of each vertically orientated air cylinder 316 is pivotally connected to one of the fixed support plates 346. Operationally, the air cylinder 316 is actuatable to apply pressure to the bondline of the vane 208 when the bond anvil 326 has been rotated 90 degrees such that its bond surface 324 is situated horizontally beneath the clamp plate 314.

A sensor 370 is affixed to the framework 14 in the bonding section 300 to the left of the right end of the containment block 302 as shown in FIG. 26. The sensor 370 is situated such that when a vane 208 passes under the sensor, a signal is sent to the control system which shuts down the feeder motor assemblies 196 in the bonding section so that the entire in-progress vane is situated on the containment block's support surface 304.

Figure 27:
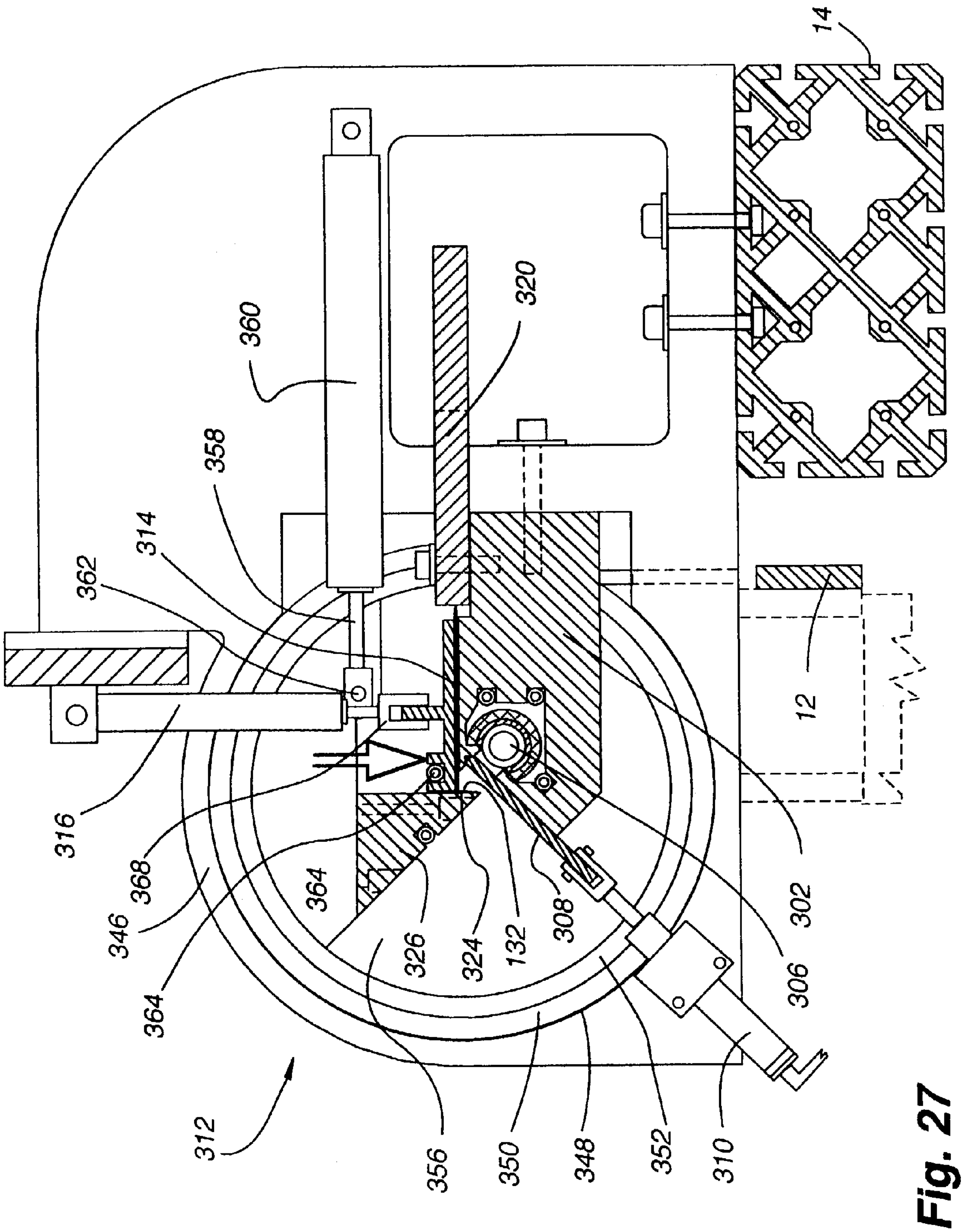
FIGS. 27–29 are cross sectional views taken along line 26—26 of FIG. 1B sequentially illustrating the operation of the bonding section.
Figure 28:
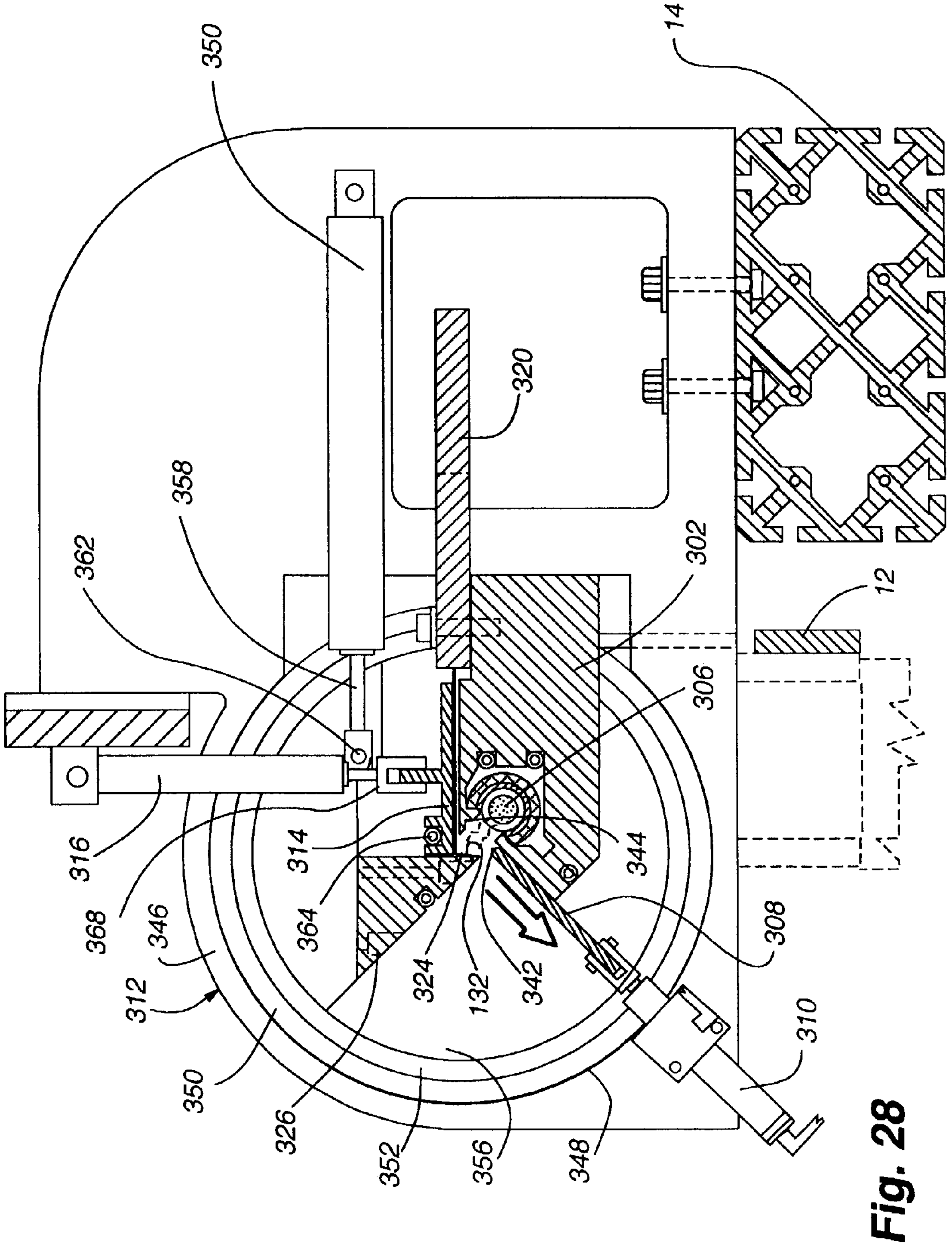
Figure 29:
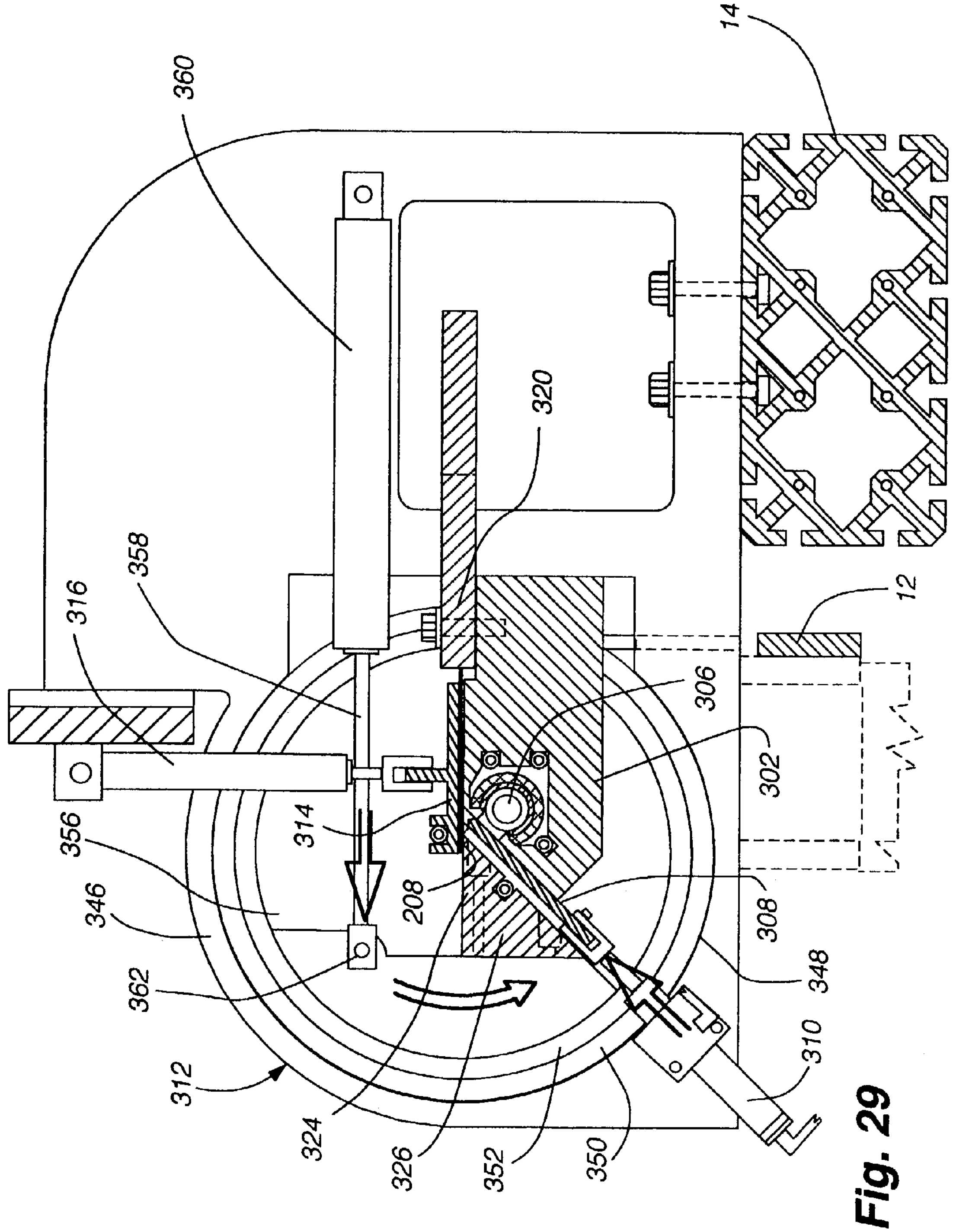

The operation of the bonding section 300 is illustrated in FIGS. 27–29. Initially, a cut in-progress vane 208 is transported by feeder motor assemblies 126 and 196 in both the preceding section and the bonding section until the vane is completely supported on the support surface 304 of the containment block 302 and the flap 132 is contained along its entire length in the vertical position by the bonding surface 324 of the bond anvil 326, then as best shown in FIG. 27, the clamp plate 314 is lowered against the top side 134 of the vane via the vertical air cylinders 316 clamping the vane in place against the support surface.

Next, as shown in FIG. 28, the cover plate 308 is retracted from its position over the heater 306, exposing the vertically orientated flap 132 and the thermoplastic resin 144 deposited on it to the radiative heat energy emanating from the heater. After a period of several seconds, the thermoplastic resin melts.

As shown in FIG. 29, the heater cover plate 308 is closed and the bond anvil 326 is rotated 90 degrees until the bond surface 324 is horizontal and the flap 132 with the melted resin 144 is brought into contact with the bottom side 142 of the vane 208. Because the bond surface of the anvil is located 0.010 to 0.020 inches from the centerpoint about which it is rotated, the anvil's bond surface 324 is located 0.010" to 0.020" below a horizontal plane passing through the centerpoint when it has been pivoted to horizontal. As described above, the centerpoint is generally co-extensive with the axis of the flap crease 138. The gap between the horizontal plane and the anvil's bond surface accounts for the thickness of the flap 132 and the desired thickness of the bond line. The amount of pressure applied to the bondline after the anvil 326 is pivoted decreases to zero as the resin 144 is squeezed into the bottom side 142 of the vane and the thickness of the top side 134, the bottom side 142, the flap 132, and the resin 144 is equal to the gap between the bond surface 324 of the anvil 326 and the bottom surface of the clamp plate 314. Accordingly, this prevents too much pressure from being applied to the bondline that could squeeze the resin from between the flap and bottom side resulting in a poor bond and aesthetically displeasing resin adhered to the outside of the vane 208.

After a second or so the resin 144 re-solidifies and the tubular vane is complete. The clamp plate 314 is retracted and the anvil 326 is rotated back to its normal position. The feeder motor assemblies 196 are turned on by the control system and the completed vane is transported to the right (as viewed in FIG. 1B) into the subassembly fabrication section 400.

Figure 78:
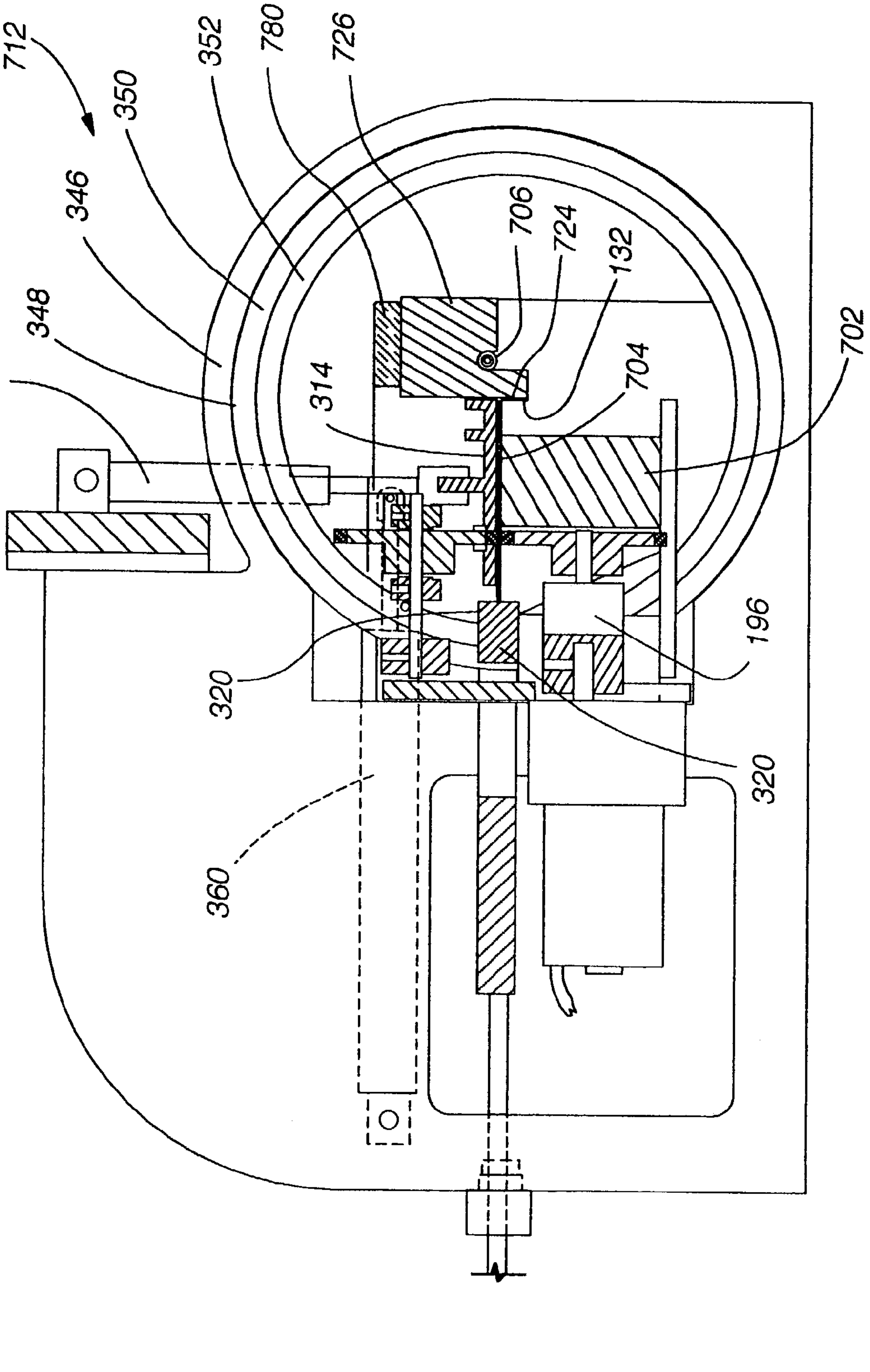
FIG. 78 is a cross sectional view of the alternative embodiment bonding section with the heated anvil in its initial position taken along lines 21—21 of FIG. 1B.
Figure 79:
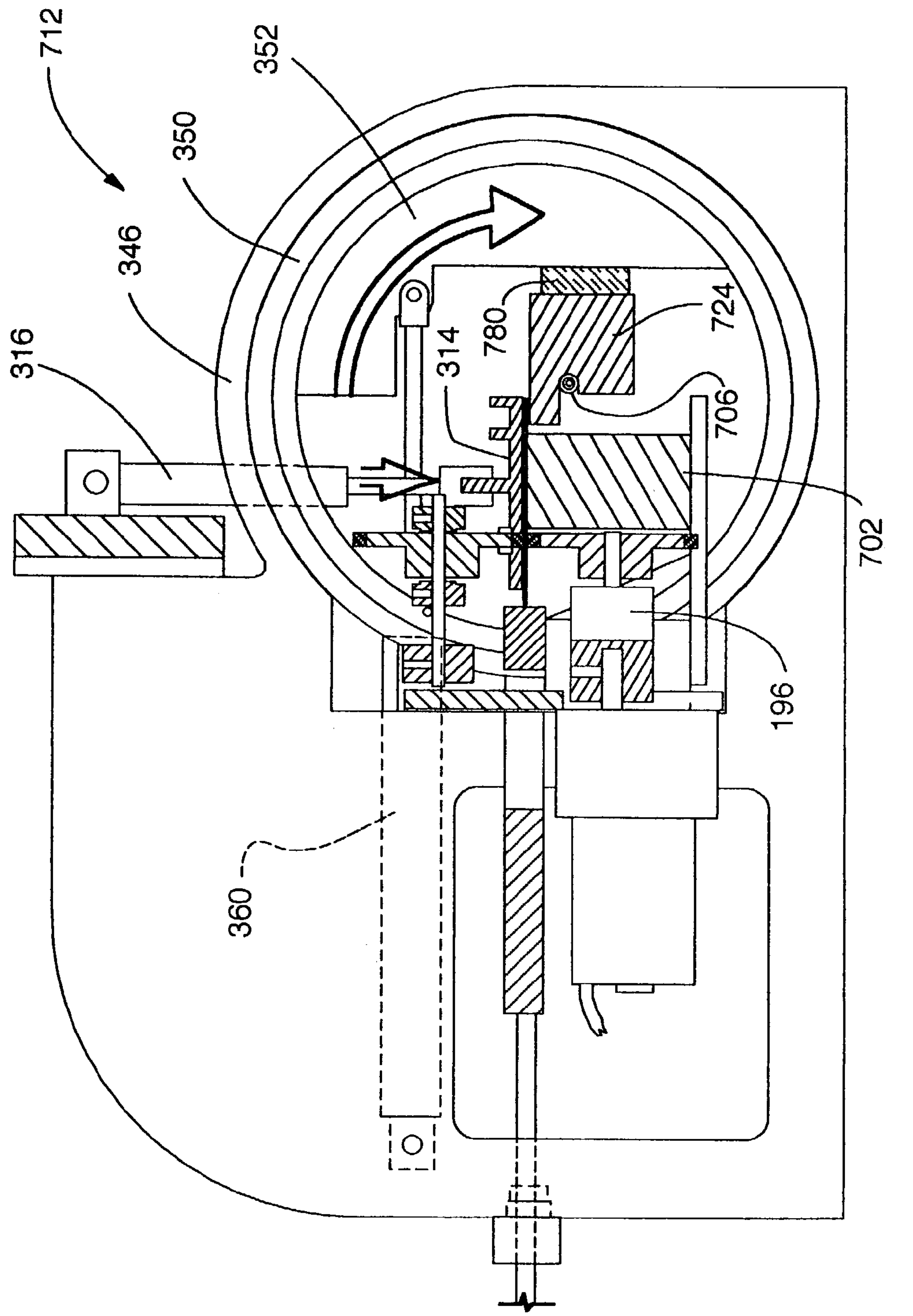
FIG. 79 is a cross sectional view of the alternative embodiment bonding section with the heated anvil in its rotated position taken along lines 21—21 of FIG. 1B.

An alternative embodiment bonding section is illustrated in FIGS. 78 and 79 that utilizes a heating element 706 contained within a heated bond anvil 726 in place of the radiative heater 306 and associated heater containment structure. In other respects, the alternative bonding section and its operation are similar to that of the preferred embodiment except as indicated herein. Where appropriate the same reference numbers are utilized in FIGS. 78 and 79 that are utilized in FIGS. 20–29 of the preferred embodiment bonding section to identify the same or similar elements and components.

The heater 706 is typically a single resistive rod heater contained within a cavity of the heated anvil 726, although more than one heater or heaters of different types can be utilized as would be obvious to one of ordinary skill in the art. During operation, the heater 706 maintains the heated anvil 726 at a temperature at or in excess of the melting temperature of the thermoplastic resin deposited on the flap 132 of vane material.

The heated anvil includes a bond side 724 that is typically in contact with the outside surface of the flap 132 of vane material and acts to heat the vane material and the thermoplastic resin on the other side of the flap. The heated anvil also extends substantially the entire length of the bonding section and is mounted to the pivotal anvil plates 352 of the pivotal bond anvil assemblies 712 through insulating blocks 780 disposed between the pivoting plates and the heated anvil to prevent the transfer of heat into the pivoting plates. The insulating blocks 780 are typically comprised of a material with poor heat conductivity, such as certain ceramics and certain fibrous composite materials including asbestos. It can be appreciated that if no insulating blocks were utilized the pivoting plates could heat up and expand, potentially binding the bearing assemblies 350 between the pivoting plates and the vertical support plates 346. Further without the insulating blocks, the pivoting plates and other associated metallic mass of the pivotal bond anvil assembly 712 would act as a heat sink, thereby significantly increasing the energy necessary to maintain the bond anvil at the required temperature.

The operation of the alternative bonding section is similar to that of the preferred embodiment, but will be briefly described herein with reference to FIGS. 78 and 79. Initially, a cut in-progress vane 208 is transported into the alternative bonding section by the feeder motor assemblies 126 and/or 196. Once the vane is in place the clamp plate 314 is lowered to clamp the vane in place against a horizontal support surface 704 that is defined at least partially by a support block 702 that replaces the heater containment block 302 of the preferred embodiment.

Since the bond side 724 of the heat anvil 726 is in direct contact with the outside surface of the vertically-orientated vane flap 132, the vane flap and the thermoplastic resin contained thereon are heated. After a short dwell period, the thermoplastic resin softens and melts. The time of the dwell period is at least partially dependant on the temperature of the heated anvil, wherein the greater the temperature of the anvil above the melting point of the thermoplastic resin, the lower the dwell time. As can be appreciated by someone of ordinary skill in the art, the maximum temperature of the anvil is limited by the degradation temperatures of the materials that comprise the vane. For instance, a thermoset resin is typically utilized as a binder in the non-woven vane material and the temperature of the heated anvil must typically be kept below the thermoset resin's degradation temperature.

Next as best shown in FIG. 79, the heated anvil is rotated 90 degrees until the bond side of the anvil is horizontal and the melted thermoplastic resin of the vane flap 132 is brought into contact with the bottom side 142 of the vane. The heated anvil also provides the necessary pressure to squeeze the melted thermoplastic resin into the bottom side of the vane to effectively join the flap to the bottom side. Next, the heated anvil is rotated back into its initial position, the clamp 314 is released, and the feeder motors are activated to transport the vane into the subassembly fabrication section 400. It is to be appreciated that the thermoplastic resin cools quickly once the heated anvil is removed from the vane flap and typically by the time the vane is received in the subassembly fabrication section, the thermoplastic resin has substantially resolidified.

As can be appreciated, other types of bonding sections are contemplated to join vane material to create a finished vane. For instance, other heater configurations are possible. In other variations, the rotating anvil may be replaced with a linear actuated clamp to join the flap to a side of the vane. In yet other variations, a thermoset resin may be applied to the flap as the in progress vane enters the bond section and the thermoset resin may be cured by heat, photo-activation or some other suitable method.

The Subassembly Fabrication Section

The subassembly fabrication section 400 of the vane fabrication apparatus 10 is illustrated in FIGS. 30–34, 38–64 and 68–76. In this section, each completed vane 208 is aligned within two or more associated ladder tapes 408, and is secured to the cross rungs 410 of the ladder tapes by an resin bead 412. After the cross rungs are bonded to the vane, the portions of the ladder tapes to which the vane is adhered are lowered and the next vertically adjacent portions of the ladder tapes are prepared to receive the next completed vane. The subassembly fabrication section includes: (1) a vane sizing assembly to set the length of the subassembly and the vanes using a blind assembly headrail; (2) a pair of feeder motor assemblies 196 that rapidly expel (or shoot) the completed vane 208 from the bonding section 300 into a position between the vertical cords 414 of two or more ladder tapes 408 (3) the levered catch mechanism assembly 402 that (i) decelerates the expelled vane after it has been shot through the plurality of ladder tapes, and (ii) in conjunction with an associated sensor pair 416 aligns the vane for the subsequent cross rung bonding operation; and (4) two or more ladder tape supply stations 418 for both preparing ladder tapes for receipt of a completed vane, and joining the cross rung of each ladder tape to the bottom side 142 of an overlying completed vane by applying a resin bead 412 thereto.

Figure 31:
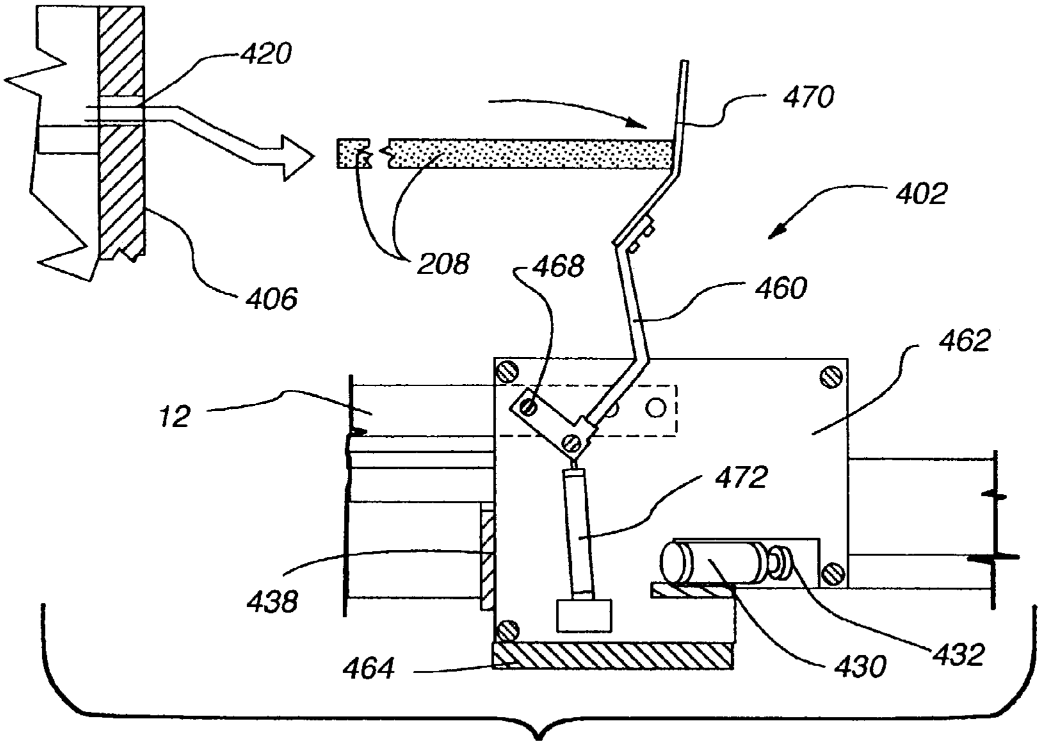
FIGS. 31 and 32 are front views of the catch mechanism assembly taken along lines 31—31 and 32—32 of FIG. 33 respectively.

As shown in FIG. 1B, two feeder motor assemblies 196 are located to the right of the end of the containment block 302. These two assemblies accelerate the vane 208 out of the bonding section 300, shooting the vane through a slot 420 (as best seen in FIG. 31) and between the vertical cords 414 of two or more ladder tapes 408 in the subassembly fabrication section 400.

Figure 30:
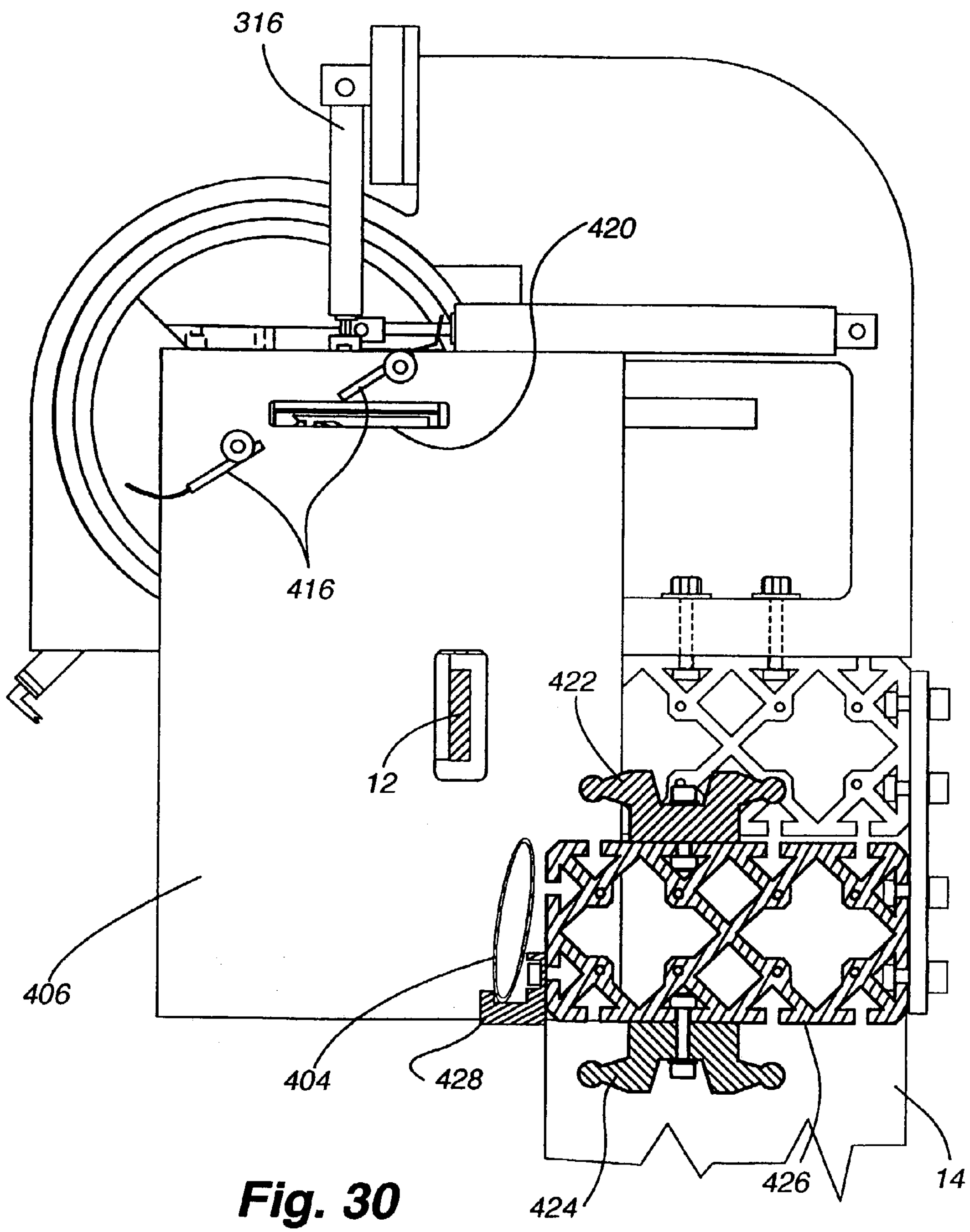
FIG. 30 is a right end view of the bonding section taken along lines 30—30 of FIG. 1B.

As discussed above, the vane fabrication apparatus 10 can be adjusted to fabricate vanes and blind subassemblies that are 1 foot to 8 feet wide. As is illustrated in the cross sectional view of FIG. 30, a pair of top rails 422 and a pair of bottom rails 424 extend across the entire length of the subassembly fabrication section 400, the top rails 422 being bolted to a top surface of a beam 426 of the apparatus framework 14 and the bottom rails 424 being bolted to the bottom surface of the beam. Further, an elongated shelf member 428 that extends substantially the entire length of the beam is affixed to the front surface of the beam as best shown in FIGS. 18 and 30.

Figure 33:
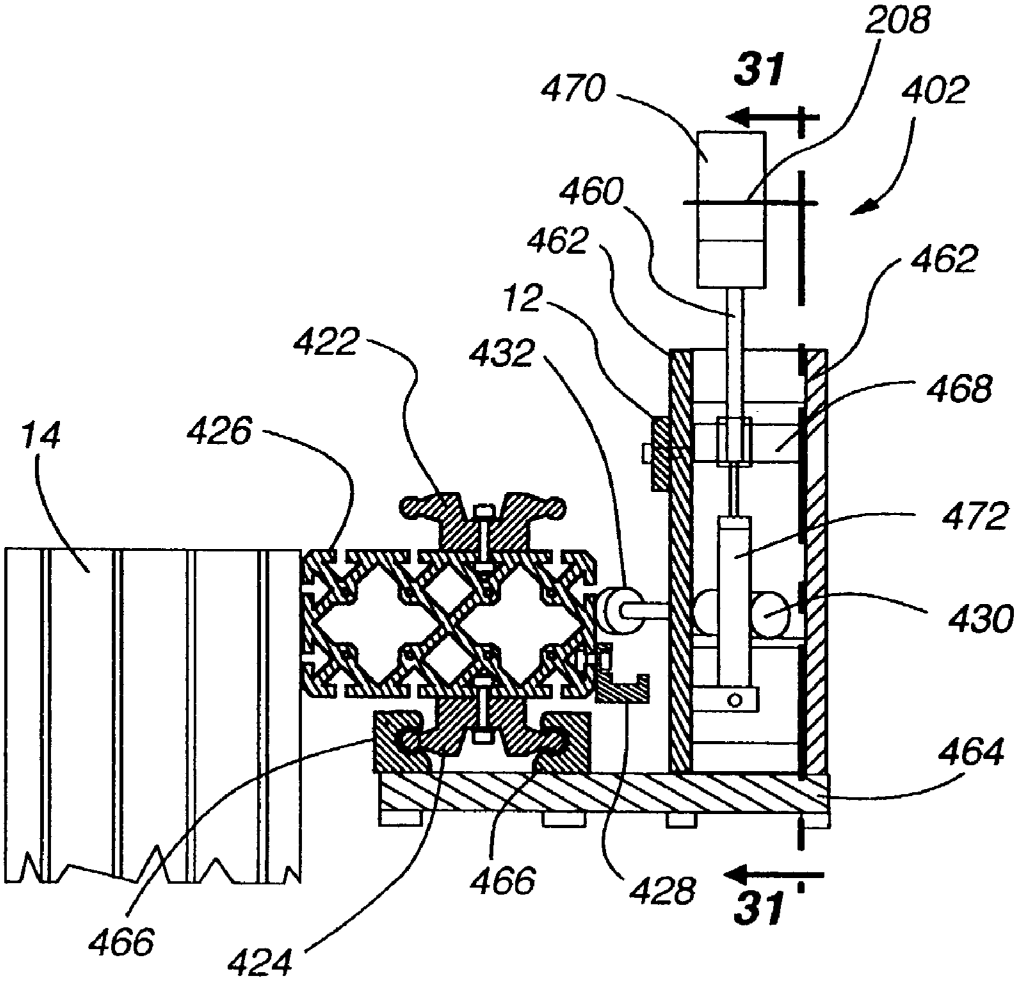
FIG. 33 is a cross sectional view of the rails and rail guides as taken along line 33—33 of FIG. 43.
Figure 34:
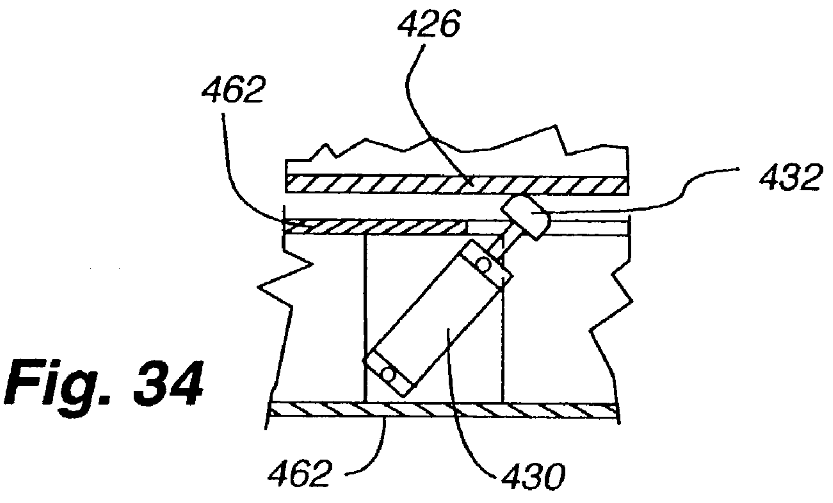
FIG. 34 is a cross sectional view taken along line 34—34 of FIG. 32 showing the stopper air cylinder of the catch mechanism assembly.
Figure 38:
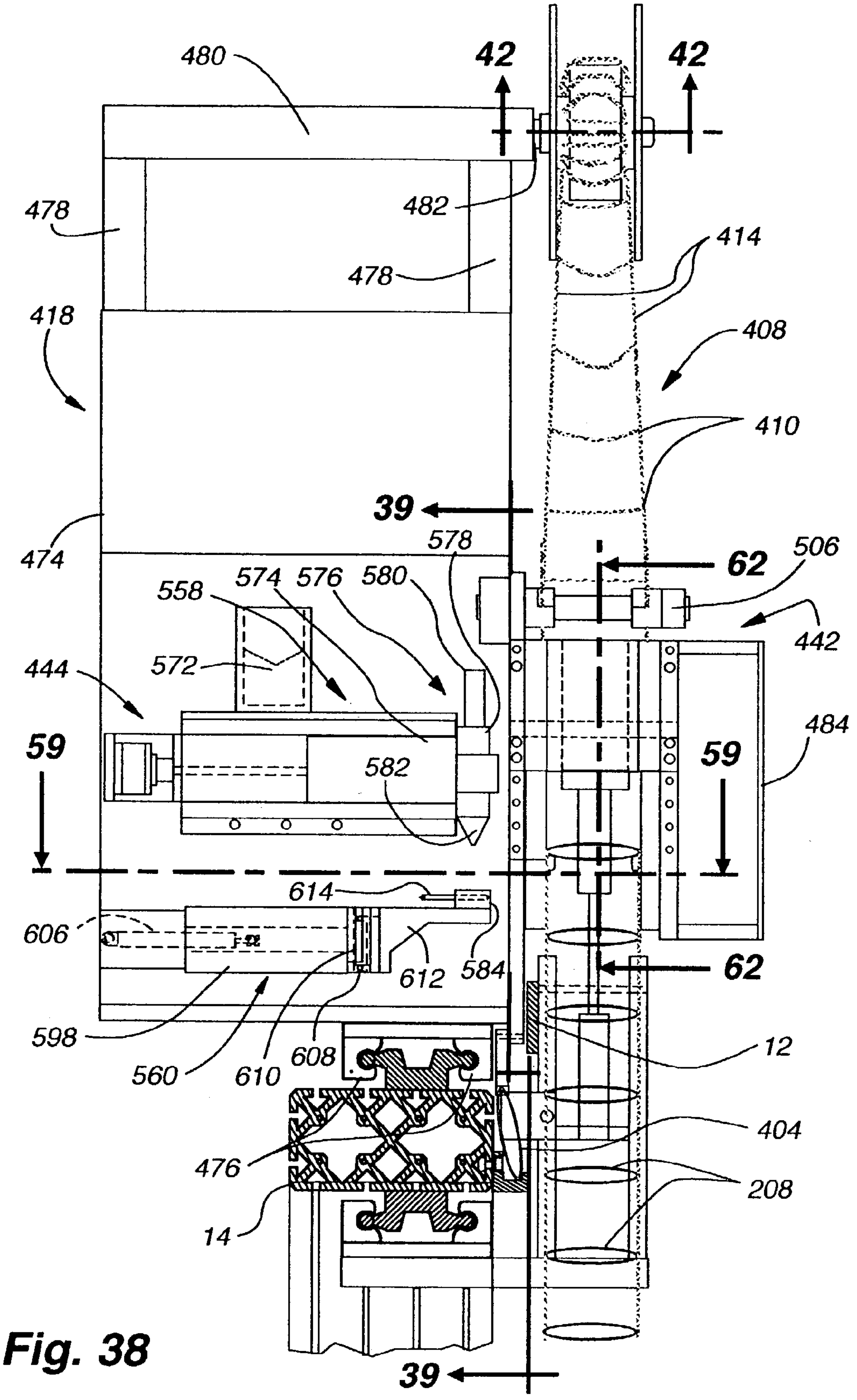
FIG. 38 is a cross sectional view of a ladder tape supply station as taken along line 38—38 of FIG. 40.

As shown in FIG. 33, the catch mechanism assembly 402 is slidably mounted to the bottom pair of rails 424, and as shown in FIG. 38 the ladder tape supply stations 418 are slidably affixed to the top pair of rails 422. An elongated bar 12 is secured to and extends leftwardly from the catch mechanism assembly 402 terminating at and fixed to the sensor array support plate 226 in the forming and sizing section 100. Accordingly, sliding the catch mechanism assembly 402 along the lower pair of rails also moves the sensor array support plate the same amount. An air cylinder 430 having a rubber stopper 432 affixed to the end of its shaft is attached to the catch mechanism assembly 402 and is actuatable between (i) an extended position wherein the rubber stopper 432 is driven and held against the framework beam 426 of the apparatus effectively frictionally locking the catch mechanism assembly 402 and the sensor array 102 in place; and (ii) a retracted position wherein the catch mechanism assembly is free to slide along the bottom rails 424.

Figures 35, 36, 37:
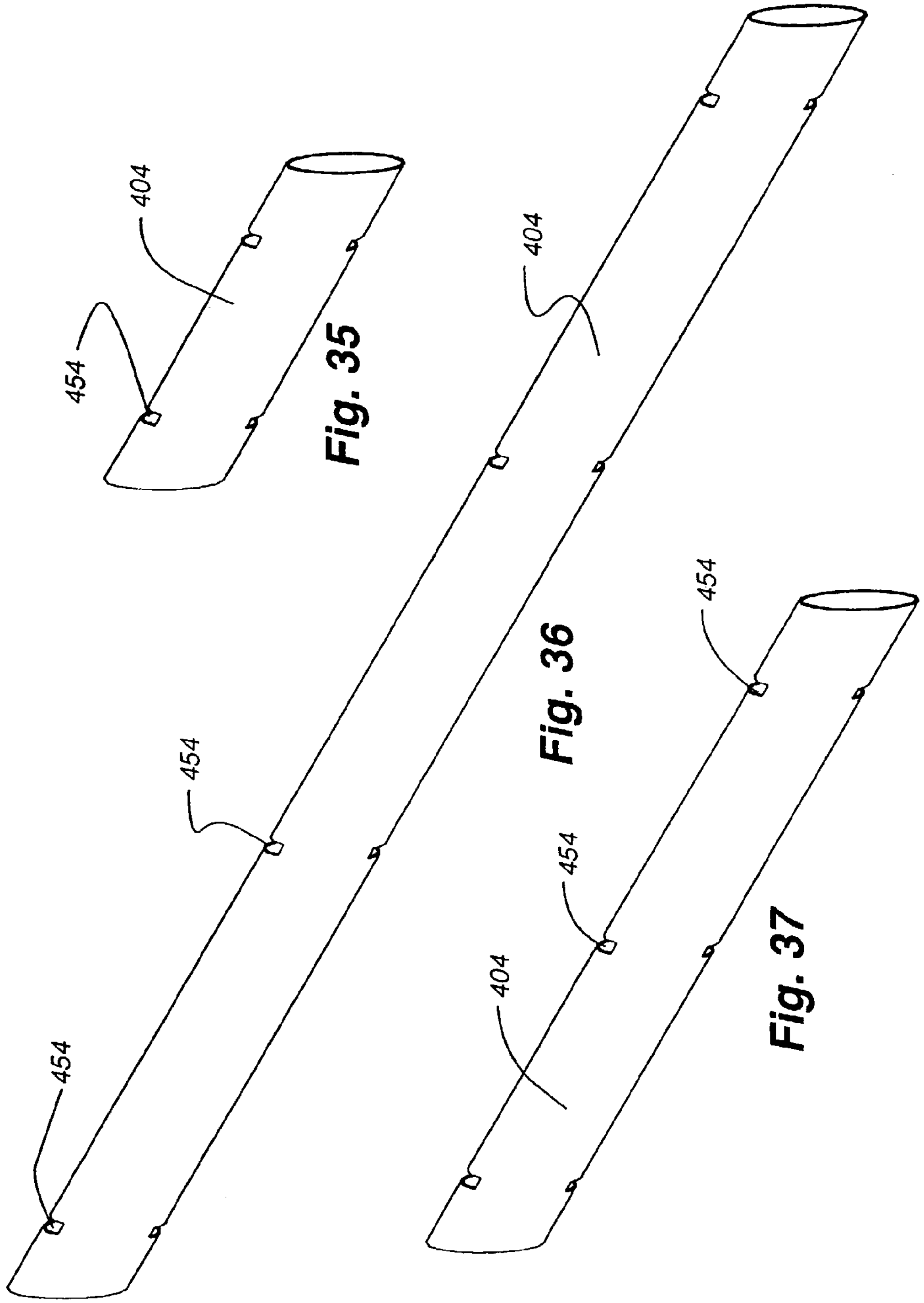
FIGS. 35–37 are isometric views of three headrails of differing lengths that can be utilized as guides in setting up the vane fabrication apparatus to fabricate vane subassemblies compatible with the headrails.

To set the width of the vanes and subassemblies that are fabricated from the apparatus, a vane headrail 404, such as illustrated in FIGS. 35–37, is placed upon the elongated shelf 428 with its left edge resting up against a right face of a fixed vertical plate 406, which is mounted to the apparatus framework 14. The catch mechanism assembly 402 is then slid to the left until a vertical plate 438 attached to the left side of the catch mechanism assembly butts against the right edge of the headrail. The catch mechanism is locked in place by activating the air cylinder 430 thereby pushing the rubber stopper 432 into the beam 426. Accordingly, the distance between the guillotine 104 and the sensor array 102 in the forming and sizing section 100 is set to a length substantially equivalent to the length of the headrail 404. Further, the subassembly fabrication section 400 is set to receive and align vanes 208 of the same length as the headrail.

As mentioned above and as illustrated in FIG. 40, each ladder tape supply station 418 is slidably attached to the top pair of rails 422. As will be described in detail below, each ladder tape supply station 418 includes a cartridge reel 440 of ladder tape 408; a ladder tape supply and tensioning assembly 442 for advancing the ladder tape and holding it taunt for receipt of a vane 208 between the tape's vertical cords 414; and a resin dispenser and bonding assembly. Further, each ladder tape supply station 418 also includes a lock mechanism 446 for securing the ladder tape supply station in the proper position along the length of the headrail for properly positioning the plurality of ladder tapes 408 to ensure that a subassembly with balanced, horizontally disposed vanes 208 result.

Figure 39:
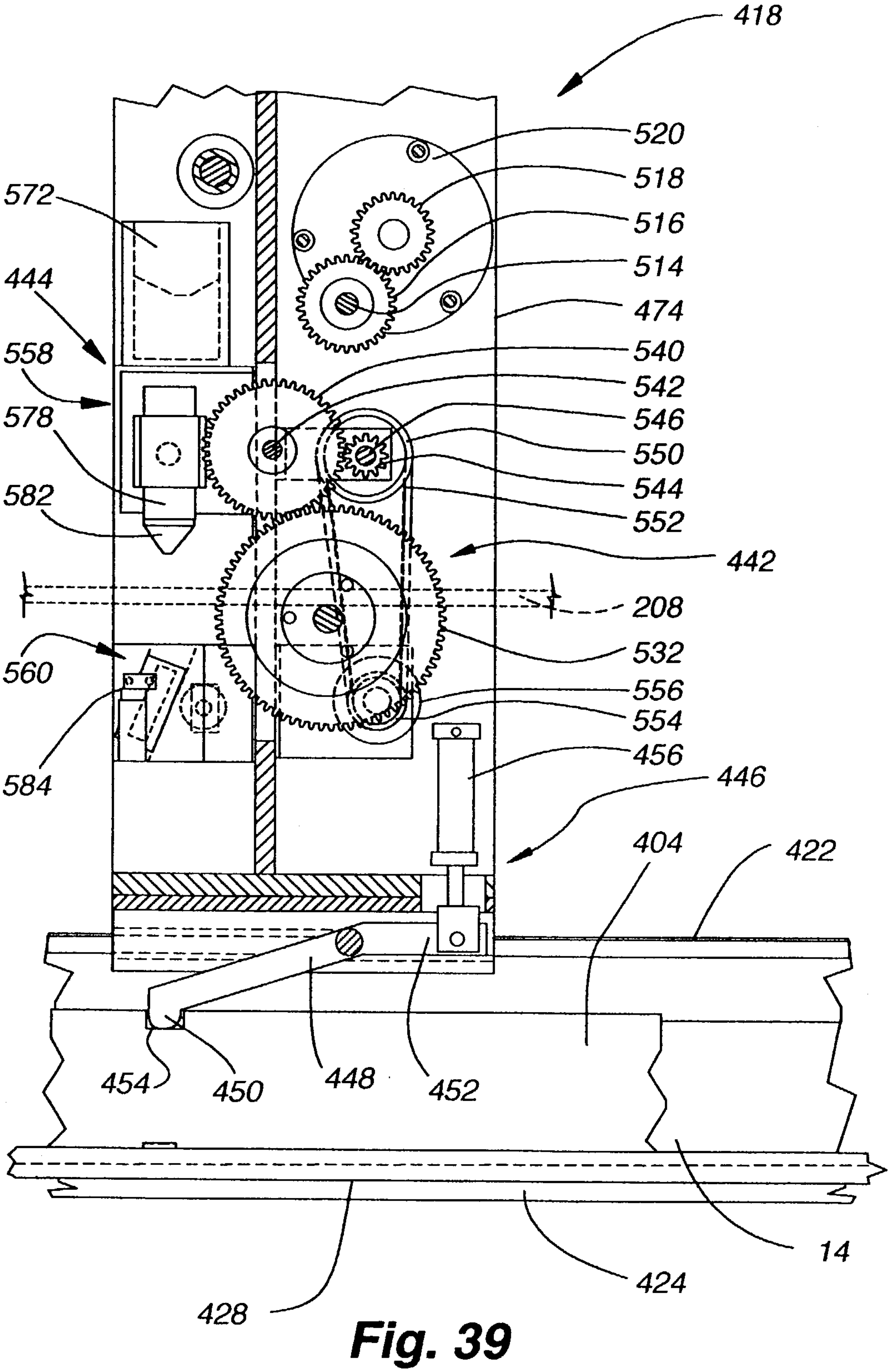
FIG. 39 is a cross sectional front view of a ladder tape supply section viewed along line 39—39 of FIG. 38.

Referring to FIG. 39, the lock mechanism 446 comprises a cantilevered catch lever 448 that is pivotally attached to the ladder tape supply station between first and second ends 450 and 452. The first end 450 is sized to be received in a notch 454 along the top edge of the headrail 404. The second end 452 is pivotally attached to a shaft of a vertically orientated air cylinder 456, wherein the air cylinder is operational to bias the first end 450 downwardly into the notch 454 or to retract the first end away from the notch.

Figure 40:
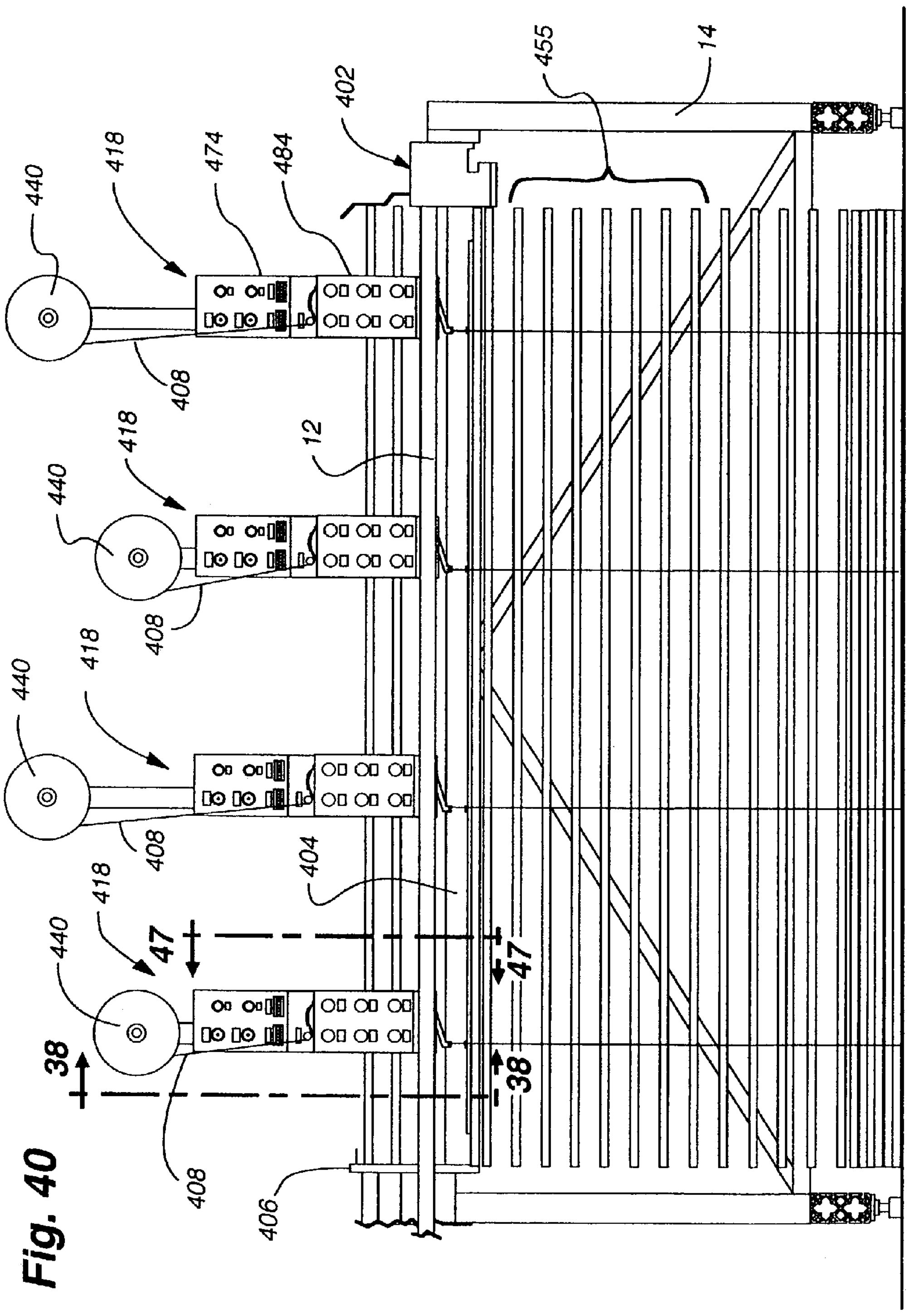
FIG. 40 is a front elevational view of the subassembly fabrication section with the section configured to produce long vane subassemblies utilizing four ladder tape supply stations.

The notches 454 provided along the top and bottom edges of the headrails 404 as viewed in FIG. 40 are openings that upon assembly as part of a finished blind assembly will receive guides or pulley components used to route associated ladder tapes and lift cords through the openings to the inside of the headrail. Accordingly, each notch represents the general horizontal position of the ladder tapes 408 on the vanes 208. As can be appreciated, the ladder tapes that extend downwardly from the ladder tape supply station are substantially vertically aligned with the notches in the headrails. In alternative embodiments, other types of templates may be used to set the length of the vanes and subassemblies as well as control the proper placement of the ladder tapes along the length of the vanes. Further it is contemplated that placement of the ladder tape supply sections can be controlled electronically where, for instance, a user enters the size blind to be fabricated and the ladder tape stations propelled by associated motors move into their proper placement.

Operationally, to finish preparing the subassembly section for use after the headrail has been placed on the elongated shelf 428 and the catch mechanism 402 has been adjusted and locked in place, the leftmost ladder tape supply station is slid towards the leftmost notch 454 in the headrail, wherein the first end 450 of the catch lever 448 is aligned with the notch and the air cylinder 456 is activated to lock the station 418 in place. Next, a second ladder tape supply station 418 is slid along the top rails 422 to the next open notch in the headrail and locked in place. In the preferred embodiment, four ladder tape supply stations are provided for producing subassemblies as long as 8 feet.

Figure 68:
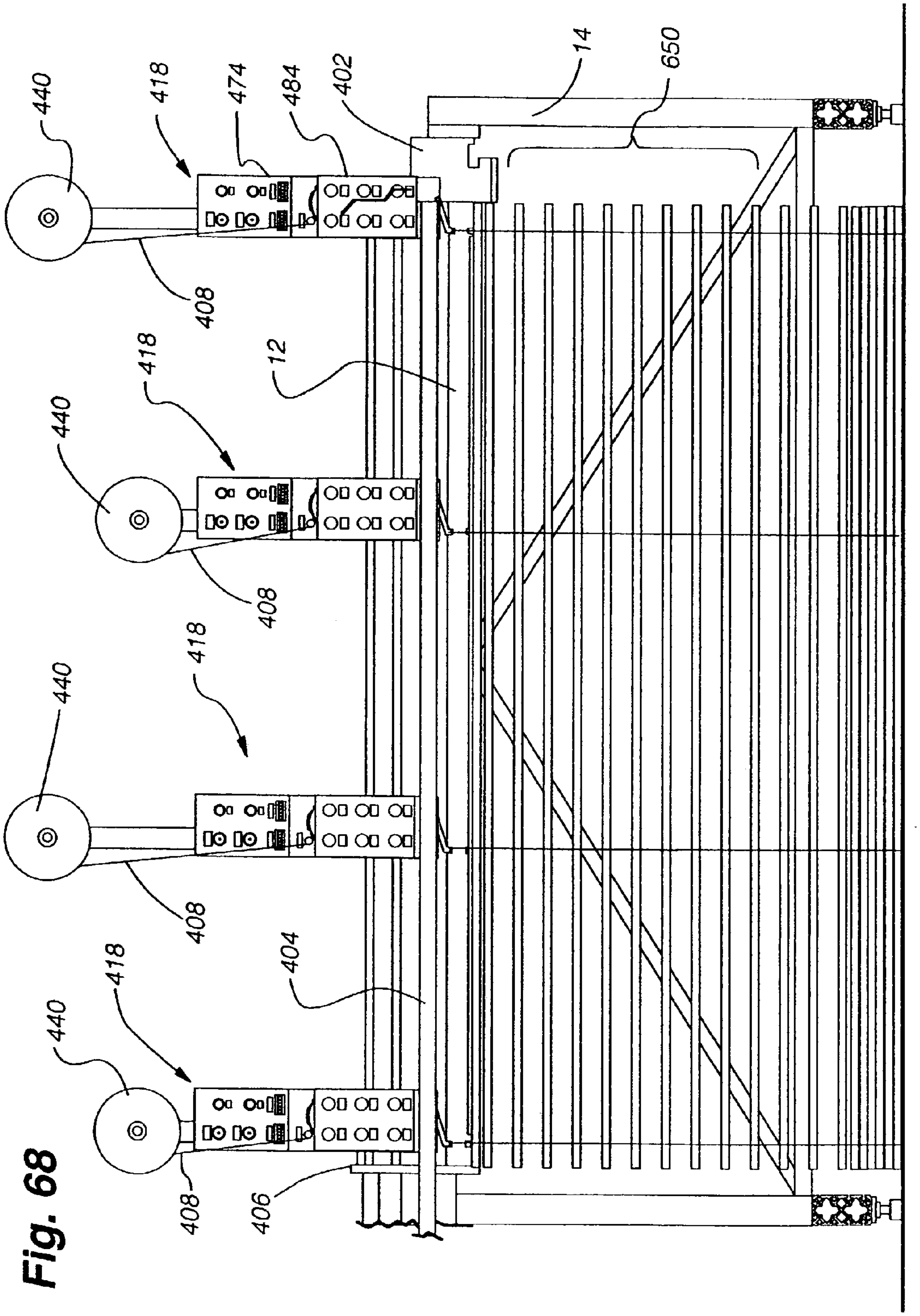
FIG. 68 is a front elevational view of the subassembly fabrication section with the section configured to produce long vane subassemblies utilizing four ladder tape supply stations with the two end ladder tape supply stations placed proximate the ends of the vanes.

FIG. 40 is an illustration of the subassembly section 400 configured for producing long subassemblies of a first type utilizing 4 ladder tape supply stations with a subassembly 455 hanging downwardly therefrom. FIG. 68 illustrates the subassembly section configured to produce a second type of subassembly 650, wherein the ladder tape supply sections are located close to the ends of the vanes of the respective subassembly 650. By locating the ladder cords near the ends of the vanes, the end ladder cords are at least partially hidden by the tilt rods of the type of completed blind assembly described in the incorporated by reference U.S. application Ser. No. 10/195,822 (U.S. provisional patent 60/305,947) and U.S. Pat. No. 6,901,988 (U.S. provisional patent application 60/306,049).

Figure 41:
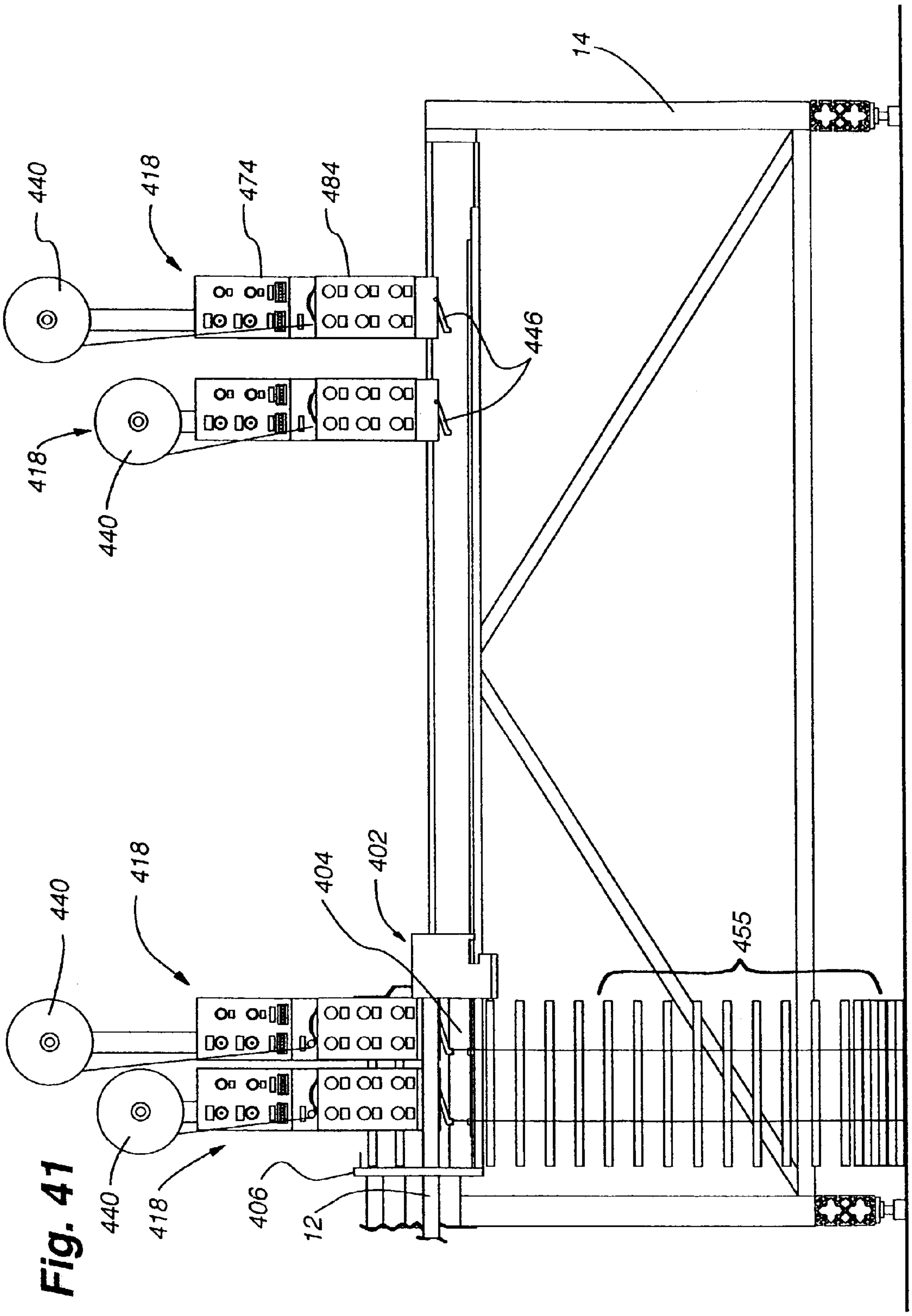
FIG. 41 is a front elevational view of the subassembly fabrication section with the section configured to produce short vane subassemblies utilizing two ladder tape supply stations.

FIG. 41 illustrates a subassembly section 400 configured for the production of short subassemblies with a subassembly 455 hanging downwardly therefrom. As shown, only two ladder tape supply stations are being utilized. As can be seen the ladder tape supply stations can be nested very close to one another permitting the fabrication of short blind subassemblies with minimal distance between ladder tapes. Note that the height of the relatively large diameter cartridge reels 440 situated above the ladder tape supply stations vary between adjacent ladder tape supply stations such that the ladder tape supply stations can be nested close together and operate without interference from a reel of an adjacent ladder tape supply station.

Referring back to FIG. 1B, two feeder motor assemblies 196 similar to the one illustrated in FIGS. 11 and 12 are located in the subassembly fabrication section 400 just to the right of the right end of the bonding section 300. After the flap 132 has been bonded to the bottom side 142 of the vane 208, the feeder motor assemblies 196 within the bonding section 300 and the two feeder motor assemblies 196 in the subassembly fabrication section activate to accelerate the vane to the right, shooting the vane through a slot 420 in the vertical plate 406 that is secured to the apparatus framework (as best seen in FIG. 30) and between the vertical cords 414 of two or more ladder tapes 408 and up against a generally vertically orientated portion of a catch arm 460 of the catch arm assembly 402.

Figure 32:
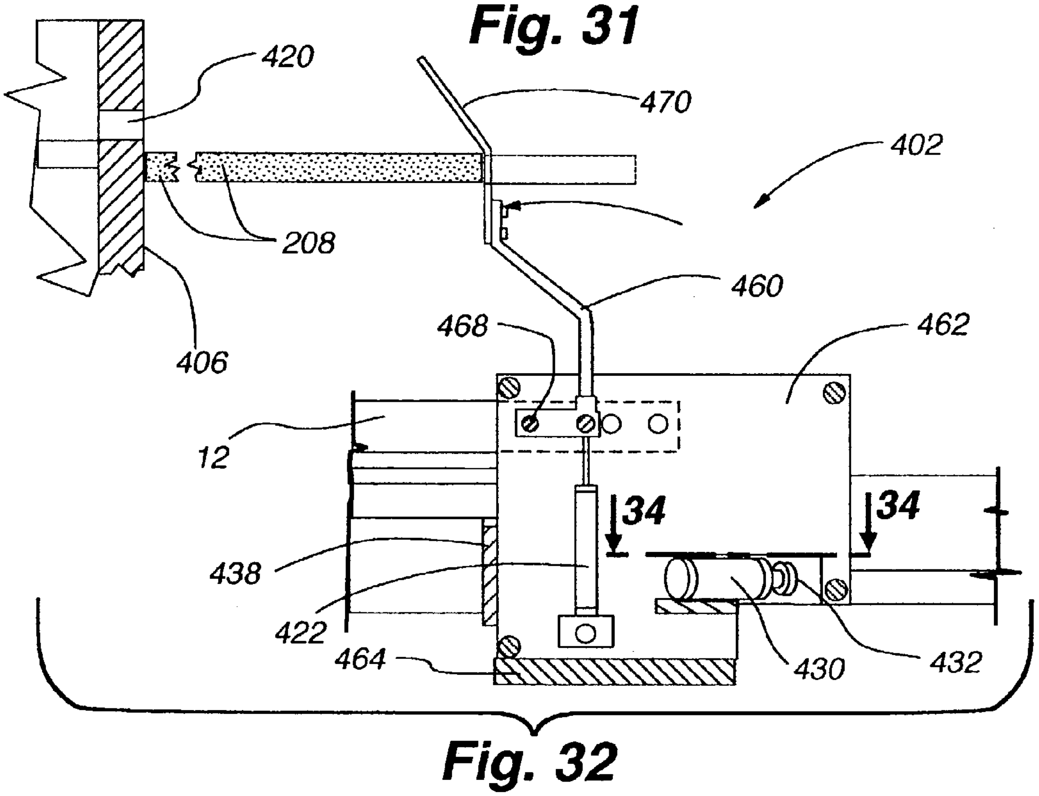

Referring back to FIGS. 31–33, the catch arm assembly 402 comprises two vertical plates 462 that are spaced apart from each other to form an interior area between the plates. A horizontal plate 464 is bolted to the bottom edges of the vertical plates 462 as can best be seen in FIG. 33. The horizontal plate 464 extends rearwardly (to the left in FIG. 33) beyond the rearmost vertical plate. A pair of spaced rail guides 466 are secured to the top surface of the horizontal plate and are received in the bottom rails 424 to facilitate slidable movement relative to the beam 426 of the apparatus framework as 14 has been previously described. The catch arm assembly 402 also includes the previously described air cylinder operated lock 456. A pivot pin 468 spans the space between the two vertical plates 462 and has one end of a horizontal portion of a catch arm 460 pivotally attached thereto. As best shown in FIG. 32, the horizontal portion of the catch arm extends to the right, wherein it intersects with a generally upwardly extending portion. The upwardly extending portion terminates at a paddle member 470 orientated to receive the impact of a vane's right end. Proximate the intersection of the horizontal portion and the upwardly extending portion of the catch arm 460, a shaft end of a vertically disposed air cylinder 472 is pivotally connected to the catch arm 460. The base of the air cylinder 472 is pivotally connected to at least one of the spaced vertical plates 462.

Operationally, as illustrated in FIGS. 31 and 32, the right end of a vane impacts the paddle 470 of the catch arm 460, driving the paddle to the right in a clockwise direction about pivot pin 468. The weight of the catch arm as well as the friction associated with the movement of the shaft in the air cylinder 472 yieldingly resists movement of the vane and causes the vane 208 to gently decelerate. The pivoting catch arm 460 prevents the ends of the vanes from being damaged due to instantaneous deceleration of the vane as would be experienced if a fixed catch arm were utilized. It can be appreciated that the layers of thin fabric material that comprise the tubular vanes might delaminate or buckle if the vane impacts a stationary object at a high enough speed.

Once the vane 208 has been brought to a stop, the air cylinder 472 is activated and the catch arm 460 is pushed back into its upright position, which in turn pushes the vane to the left until the left edge of the vane is butted up against the fixed vertical plate 406 just below the slot 420 (see FIG. 30). As shown in FIG. 30, the sensor pair 416 is attached to the rightwardly facing face of the vertical plate 406. The one sensor of the pair shoots a beam of light that is received by the second sensor. The beam is broken by the vane as the vane is pushed to the left by the catch arm and is butted up against the vertical plate 406. Subsequently, a signal is sent from the sensor pair 416 to the control system indicating the vane is properly positioned for the cross rung bonding operations to begin.

Several variations of ladder tape supply stations and portions thereof are shown in FIGS. 3, 39, and 42–76. Generally, each ladder tape supply station comprises: (i) a framework of plates and support members upon which the operational mechanisms and assemblies are secured; (ii) a support mechanism for holding the vane in place prior to the attachment of the ladder tape cross rungs and releasing the vane once it is secured to the cross rungs; (iii) a ladder tape supply and tensioning assembly 442 for unspooling the ladder tape, configuring a section of the ladder tape for receipt of a vane and advancing the ladder tape an amount equal to the distance between cross rungs to prepare the next section to receive the next vane; and (iv) a resin dispenser and bonding assembly 444 for applying the resin to the cross rung 410 and the bottom side 142 of the vane 208 and rapidly solidifying a resin bead 412. Additionally, in some embodiments a vane guide mechanism 630 is also specified to help guide the vane over the corresponding ladder tape cross rung as the vane is propelled from the bonding section into the subassembly section 400.

Figure 43:
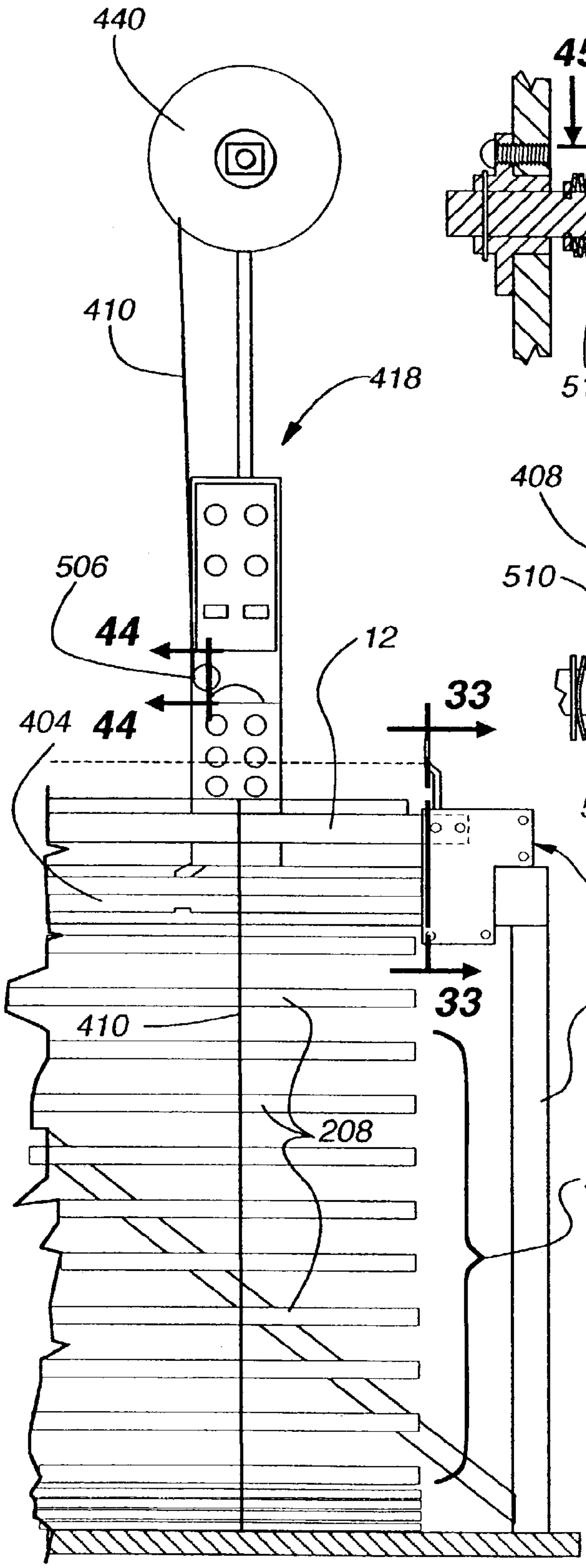
FIG. 43 is a fragmentary front elevational view of the bonding section illustrating a single ladder tape supply station and the catch mechanism assembly.

Referring to FIGS. 38, 39 and 43, the ladder tape supply station's framework is comprised of a generally vertically elongated rectangular box-like primary enclosure 474 having a front face including a variety of gauges and buttons for monitoring and controlling the setup and operation of the ladder tape supply station. A pair of downwardly facing spaced rail guides 476 are fixedly mounted to the bottom surface of the enclosure and are received onto the top pair of rails 422 that are mounted to the apparatus framework 14 for slidable movement therealong. As described above, a locking mechanism 446 is also mounted to the enclosure 474 for securing the placement of the ladder tape supply station along the rails 422. Various switches and relays, the resin application and bonding assembly 444, and various motors and gears of the ladder tape supply and tensioning assembly 442 are secured to the primary enclosure 474 as can best be seen in FIGS. 38 and 39. Further, various switches, solenoids, and electrical and pneumatic cabling (none shown) are also contained within the primary enclosure. Two vertical beams 478 extend upwardly from the primary enclosure intersecting with a horizontal cross beam 480 to which a forwardly extending spindle is mounted. The spindle is configured to rotatably receive a cartridge reel 440 of ladder tape 408.

Figure 47:
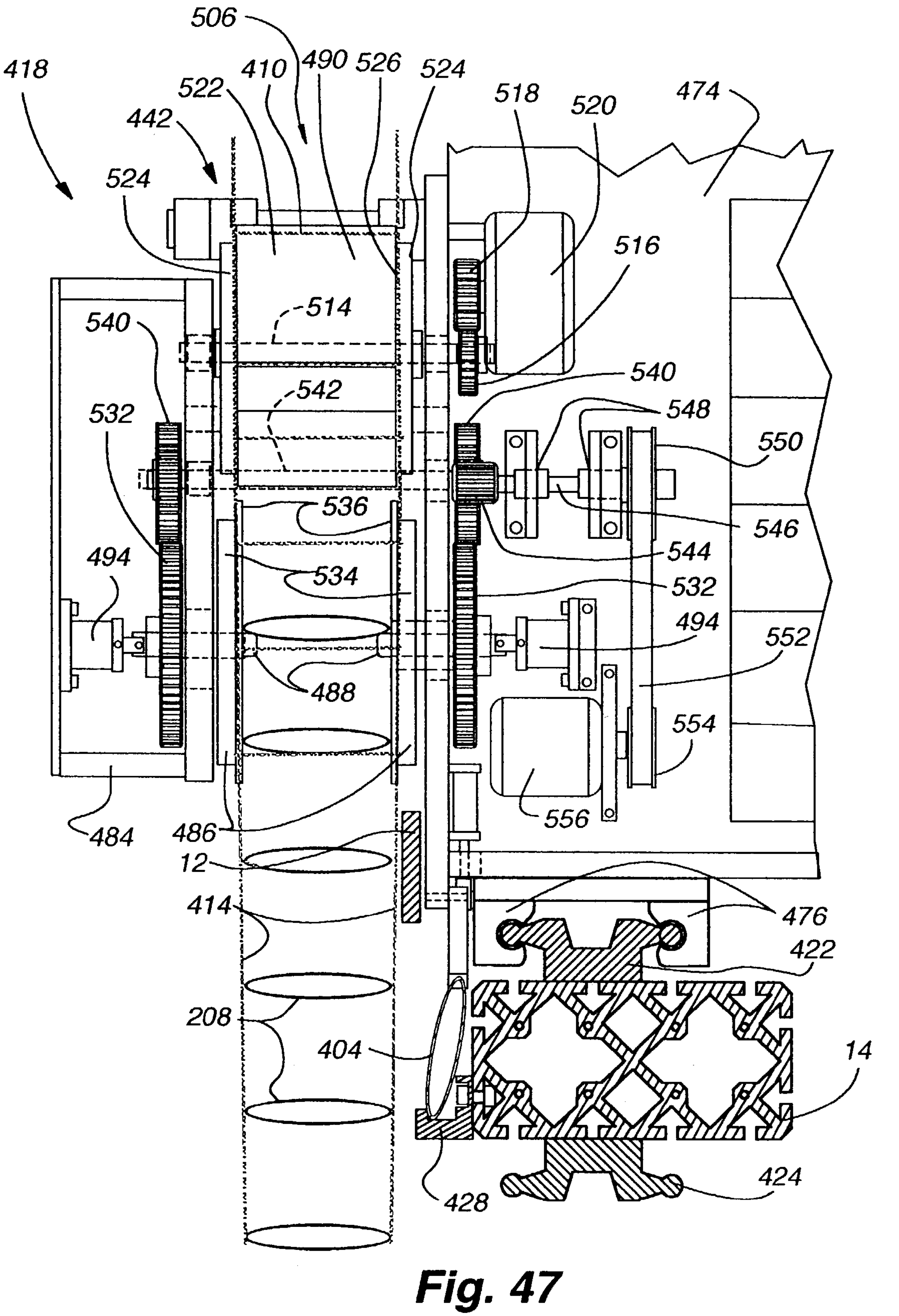
FIG. 47 is a cross sectional view of the ladder tape supply station taken along line 47—47 of FIG. 40.

A second smaller enclosure 484 is horizontally spaced from the front face of the primary enclosure 474. The secondary enclosure houses various operational buttons and switches that can be utilized to operate the ladder tape supply station, as well as, several gears and shafts associated with the ladder tape supply and tensioning assembly 442. Referring to FIG. 47, contained in the space between the front face of the primary enclosure 474 and the rear face of the secondary enclosure 484 are two opposed spreader wheels 486, each of which holds one of the vertical cords 414 of an associated ladder tape 408 such that a vane 208 can be shot between the wheels 486 and the ladder tape, wherein the ladder tape is held taunt as the vanes 208 are passed therebetween. Two opposing retractable shafts 488 extend from the center of the spreader wheels that when in the extended position serve as a shelf to support a vane 208 as will be described in greater detail below. Also located in the space between the two enclosures vertically above the spreader wheels is a tensioning drum 490, which acts to maintain the separation between the vertical cords of a ladder tape, as well as, provide resistance to free downward movement of the ladder tape upon rotation of the spreader wheels 486.

Figure 48:
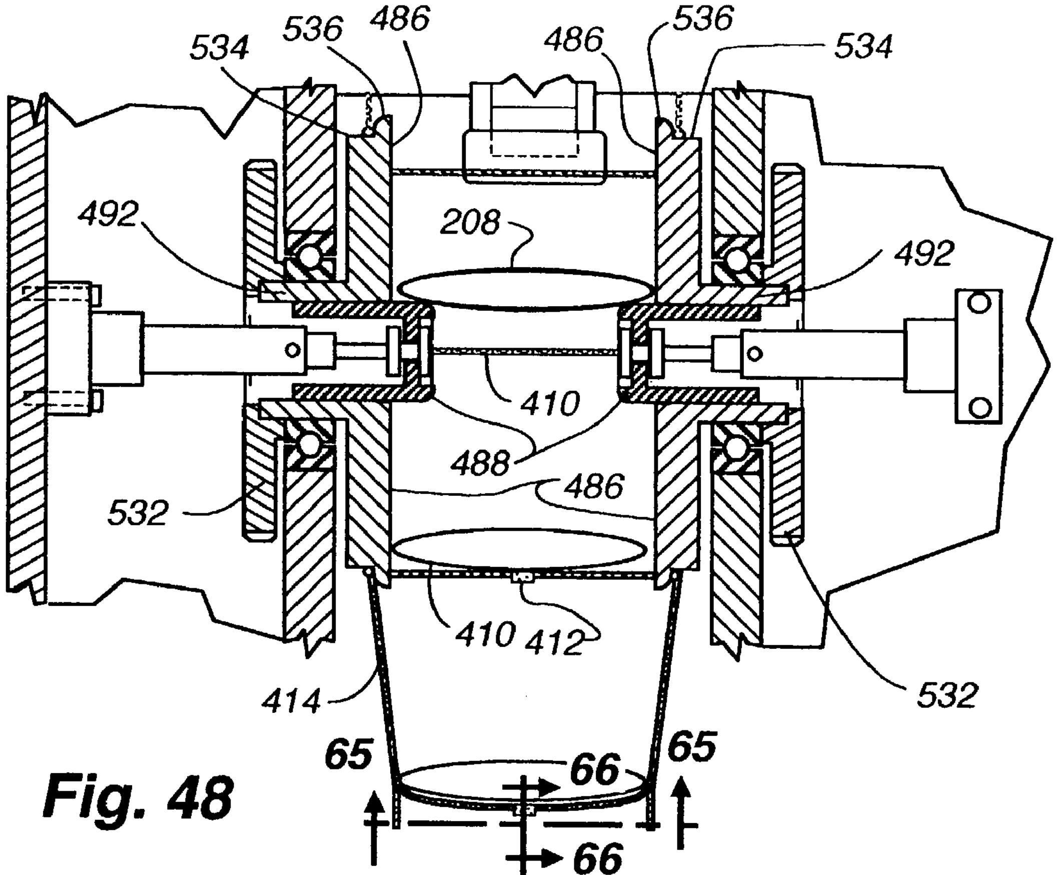
FIGS. 48 and 49 are enlarged fragmentary cross sectional views of the ladder tape supply station taken along line 48—48 of FIG. 62.
Figure 49:
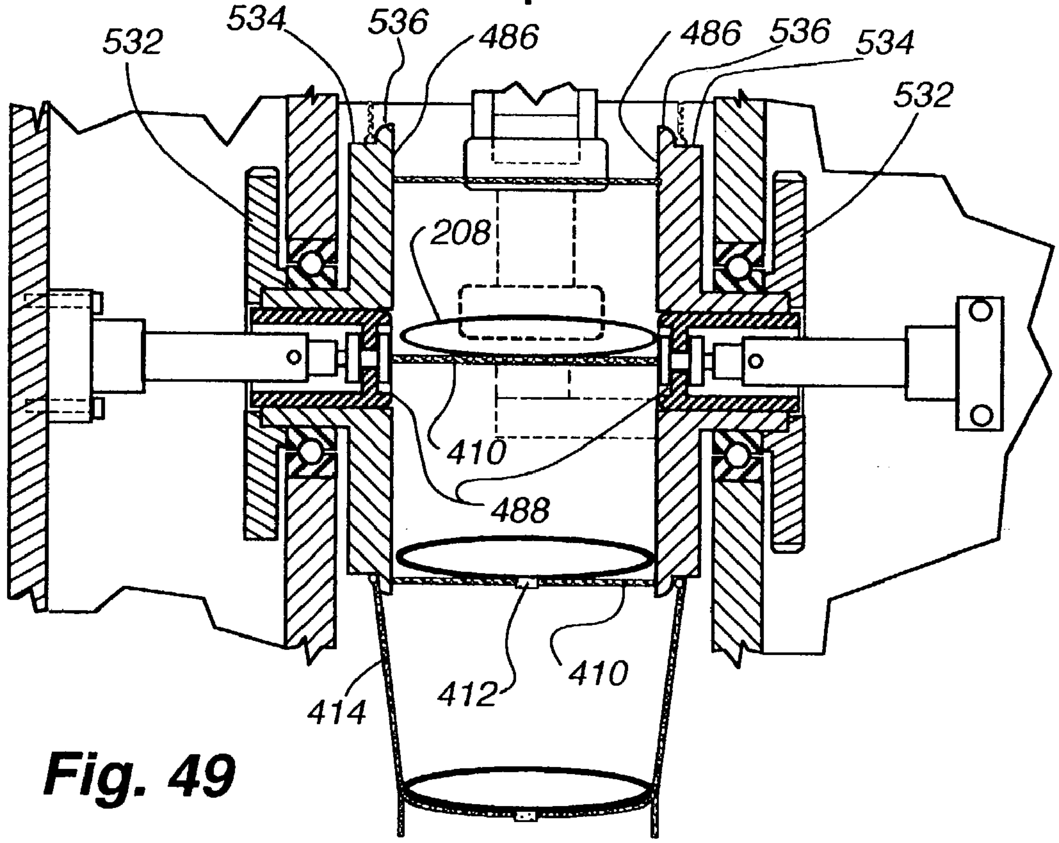

As described above, a vane is shot from the bonding section 300 through the slot 420 in the fixed vertical plate 406, wherein it is decelerated and pushed back into place within the subassembly section 400 to be adhesively joined to the ladder tape cross rungs 410. Referring to the topmost vane in FIG. 48, a vane 208 is supported along its length at each ladder tape supply station 418 by the two opposing retractable shafts 488. The shafts 488 extend through a hollow axle 492 at the center of each spreader wheel 486. Each retractable shaft is mounted to an air cylinder 494 and is retractable to allow the vane to be lowered once it is secured to the ladder tapes as shown in FIG. 49. The air cylinders 494 are configured to retract during the cross-rung bonding operation when the vane is supported from below by a portion of the bonding assembly 444 as is described below.

In certain circumstances as the vane is shot from the bonding section into the subassembly section, the vane may submarine or lift upwardly causing the front edge of the vane to impact a ladder tape supply station above or below the opening through which the vane is intended to pass. Accordingly, a retractable vane guide mechanism 630 can be specified on certain variations of the ladder tape supply station. One configuration of a vane guide mechanism is illustrated in FIGS. 69–72. A vertically-orientated pneumatic rotary actuator 632 is mounted on the side of the second enclosure 484 with a rotationally actuatable shaft 636 extending downwardly therefrom. A forked guide 634 is affixed with the actuator shaft such that actuation of the actuator selectively moves the forked guide from a first position facing the front end of a vane as it is propelled towards the associated ladder tape supply station and a second position wherein the fork is positioned away from the vane. The fork is shown in the first position in FIG. 69 and in the second position in FIG. 71.

Figure 70:
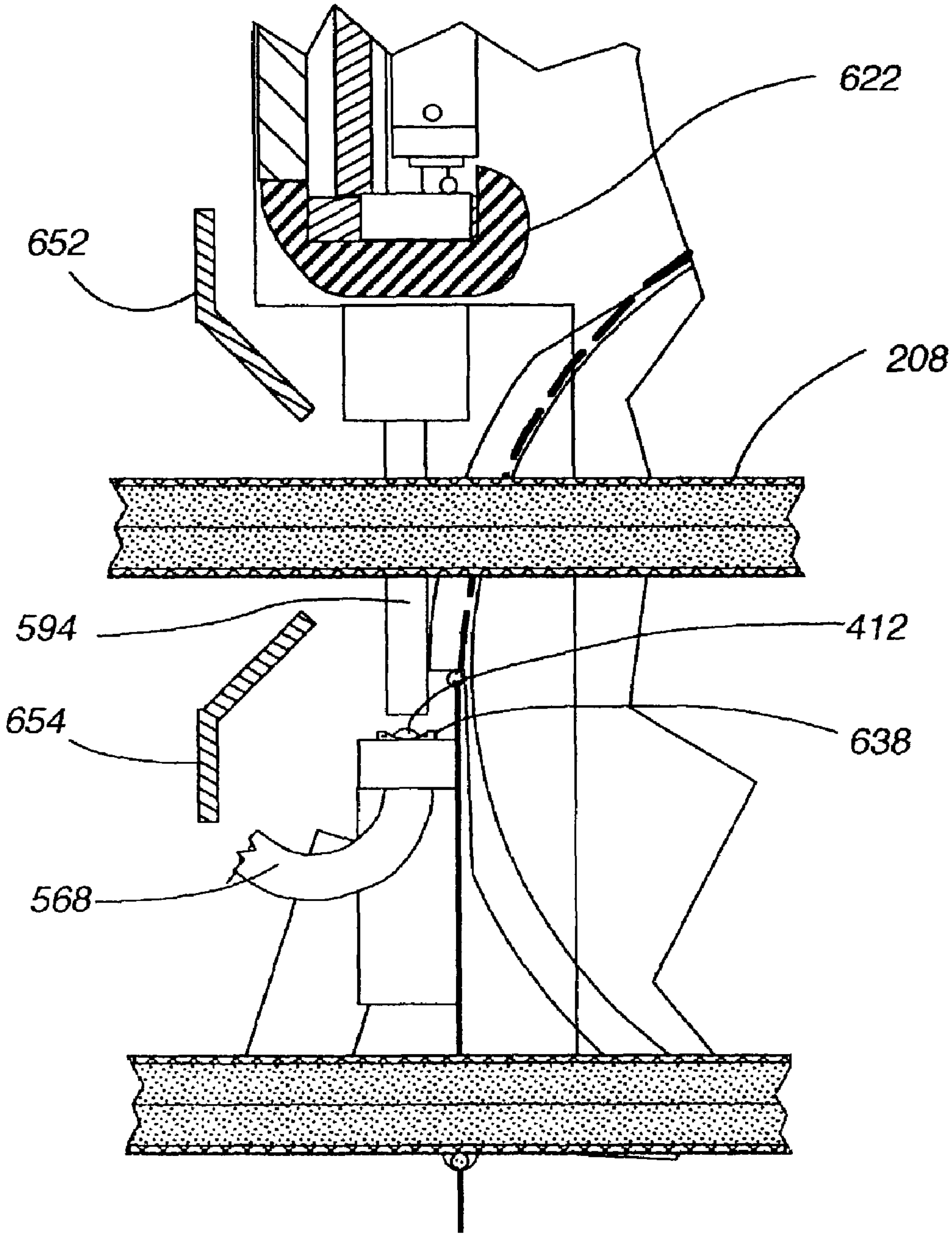
FIG. 70 is a partial cross sectional view of the ladder tape supply station taken along line 70—70 of FIG. 69.
Figure 71:
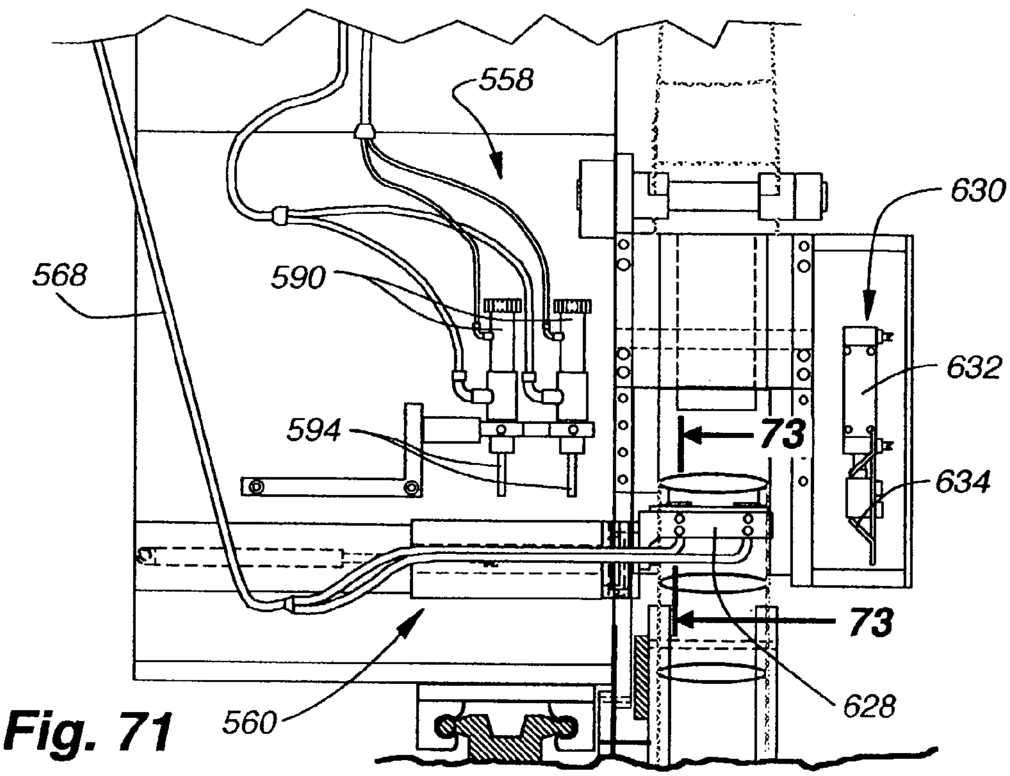
FIGS. 71 and 72 are partial side views of a ladder tape supply station incorporating the third embodiment resin supply and bonding assembly.

Referring to FIG. 70, a cross section of the forked guide is shown. The top fork 652 extends substantially vertically downwardly from a top edge for a distance then cants to the right at an acute angle finally terminating at a bottom edge. The bottom fork 654 is a mirror of the top fork: canting to the left from a top edge for a distance then extending downwardly in a substantially vertical direction until terminating at a bottom edge. If the front end of vane either lifts or submarines as it is propelled towards the ladder tape supply sections, the respective vane guide mechanism acts to reposition the vane vertically into its proper location in the ladder tape supply station. Once a vane has been received into the subassembly section 400 and is resting on the cross rungs of the ladder tapes, the forked guide is rotated into the seconded retracted position. accordingly, once the vane is secured to the cross rungs the vane can be lowered to make way for the receipt of the next vane of the subassembly.

Figure 42:
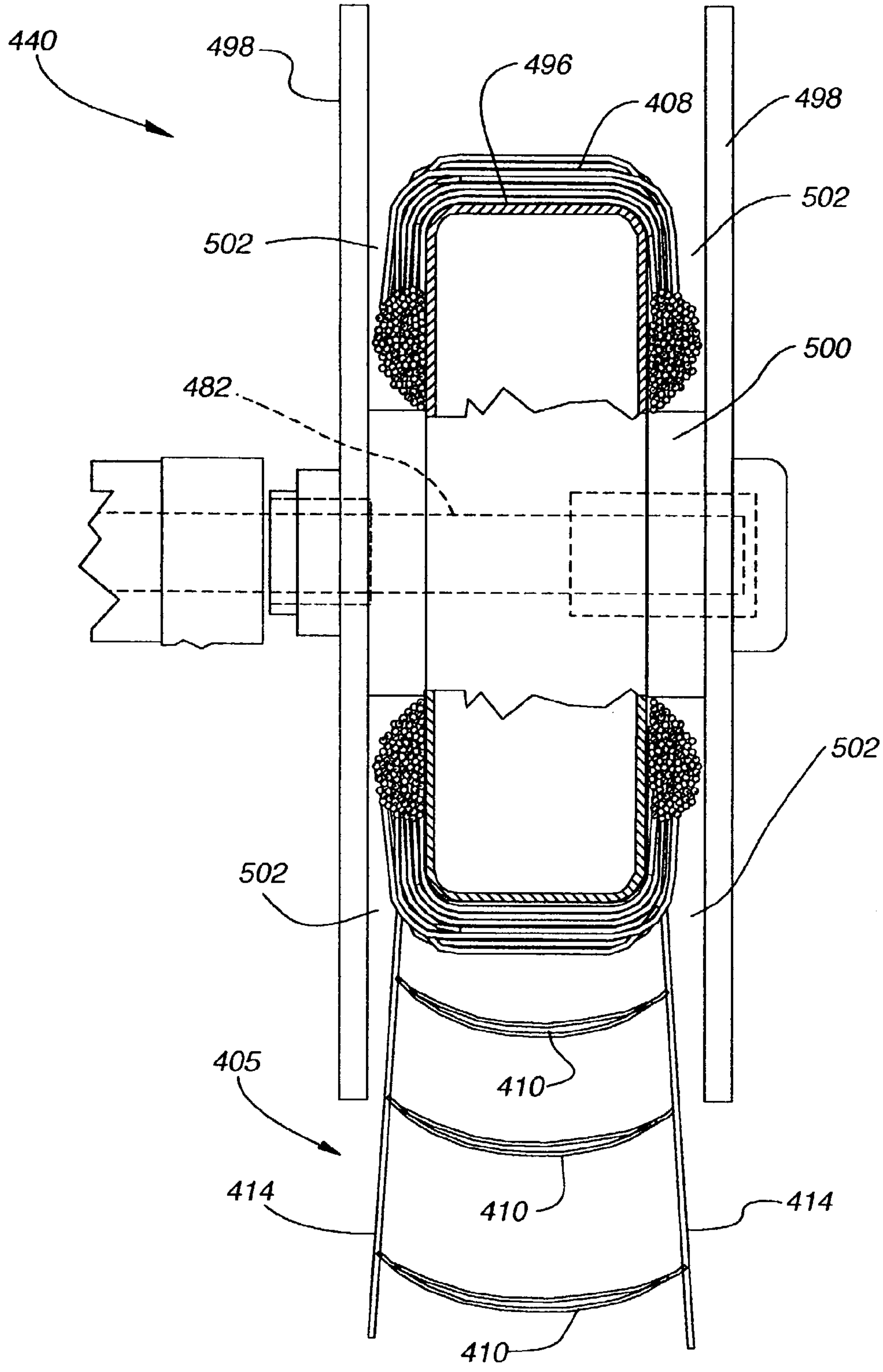
FIG. 42 is a cross sectional view of the ladder tape reel cassette as viewed along line 42—42 of FIG. 38.

A substantial portion of the mechanical workings of the ladder tape supply station 418 comprise the ladder tape supply and tensioning assembly 442 as is illustrated in detail in FIGS. 39, 42, 43–49, and 62–64. Starting at the top of the ladder tape supply station, the tape supply and tensioning assembly includes a cartridge reel 440 on which a continuous supply of ladder tape 408 is wound. A cartridge reel having ladder tape wound thereon is illustrated in FIG. 42. As described above the reel is rotatably attached to a spindle 482 that is disposed above the primary enclosure 474 of the ladder tape supply station 418. The reel is designed to hold the ladder tape thereon with the front and rear vertical cords 414 of the ladder tape 408 separated by a raised hub section 496 with the cross rungs 410 traversing over the raised hub 496 between the vertical cords 414. The reel comprises left and right circular plates 498 spaced apart from one another and joined about their center axis by a tubular hub 500. The hub 500 is configured to receive the aforementioned spindle 482 to rotatably secure the reel to the ladder tape supply station 418. The raised hub portion 496 extends radially from the hub 500 and is centered in between the plates 498. The raised hub 496 comprises left and right surfaces that extend radially from the outside circumferential surface of the hub forming right angles therewith. The radial surfaces intersect and terminate at a circumferential surface. Accordingly, radial slots 502 are formed between the inside surfaces of the circular plates 498 and the radial surfaces of the raised hub portion 496. As illustrated, the left vertical cord is deposited in the left slot and the right vertical cord is deposited in the right slot with the cross rungs 410 extending over the raised hub portion 496. This configuration minimizes the risk of entangled ladder tapes 408, as well as, facilitating the ladder tape to roll off the reel with the two vertical cords spaced apart in general alignment for receiving a vane 208.

Figure 44:
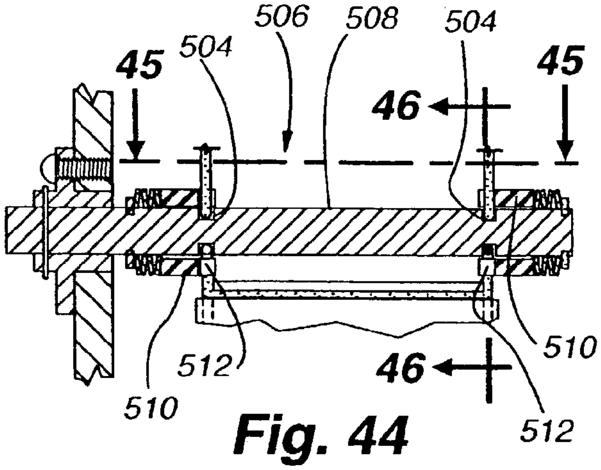
FIG. 44 is a cross sectional view of the cylindrical guide bar taken along line 44—44 of FIG. 43.
Figure 45:
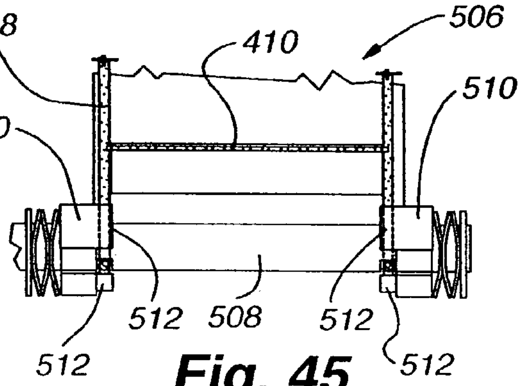
FIG. 45 is a cross sectional view of the cylindrical guide bar taken along line 45—45 of FIG. 44.
Figure 46:
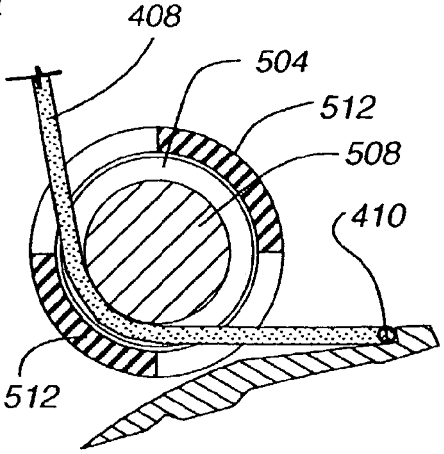
FIG. 46 is cross sectional view of the cylindrical guide bar taken along line 46—46 of FIG. 44.

As shown in FIG. 43, the ladder tape 408 extends vertically downwardly from the reel 440, wherein each of the vertical cords 414 is received in a slot 504 of a cylindrical guide bar 506 that extends outwardly from the front plate of the primary enclosure 474 to ensure the cords are spaced a sufficient distance to allow a vane 208 to pass therebetween. The cylindrical guide bar 506 is illustrated in FIGS. 44–46. The cylindrical guide bar comprises an elongated cylindrical rod 508 with two circumferential slots 504 disposed therein. The slots 504 are spaced a distance generally equal to the length of a cross rung 410 and are aligned with grooves on the tensioning drum 490 disposed directly below and to the right of the guide 506 (as shown in FIG. 43 and FIG. 46). The cross rungs 410 of the ladder tapes 408 extend across the surface of the rod 508 between the slots 504. To keep the vertical cords 414 in their respective slots 504 on the cylindrical guide 506, spring loaded collars 510 are disposed adjacent to each slot. Each collar has curvilinear flanges 512 that are biased over an associated slot to hold the vertical cords in place as illustrated in FIGS. 44 and 46. It is appreciated that the collar 510 and its flanges 512 can be pulled away from the slot to facilitate threading of the ladder tape through the ladder tape supply and tensioning assembly 442 during setup.

Figure 62:
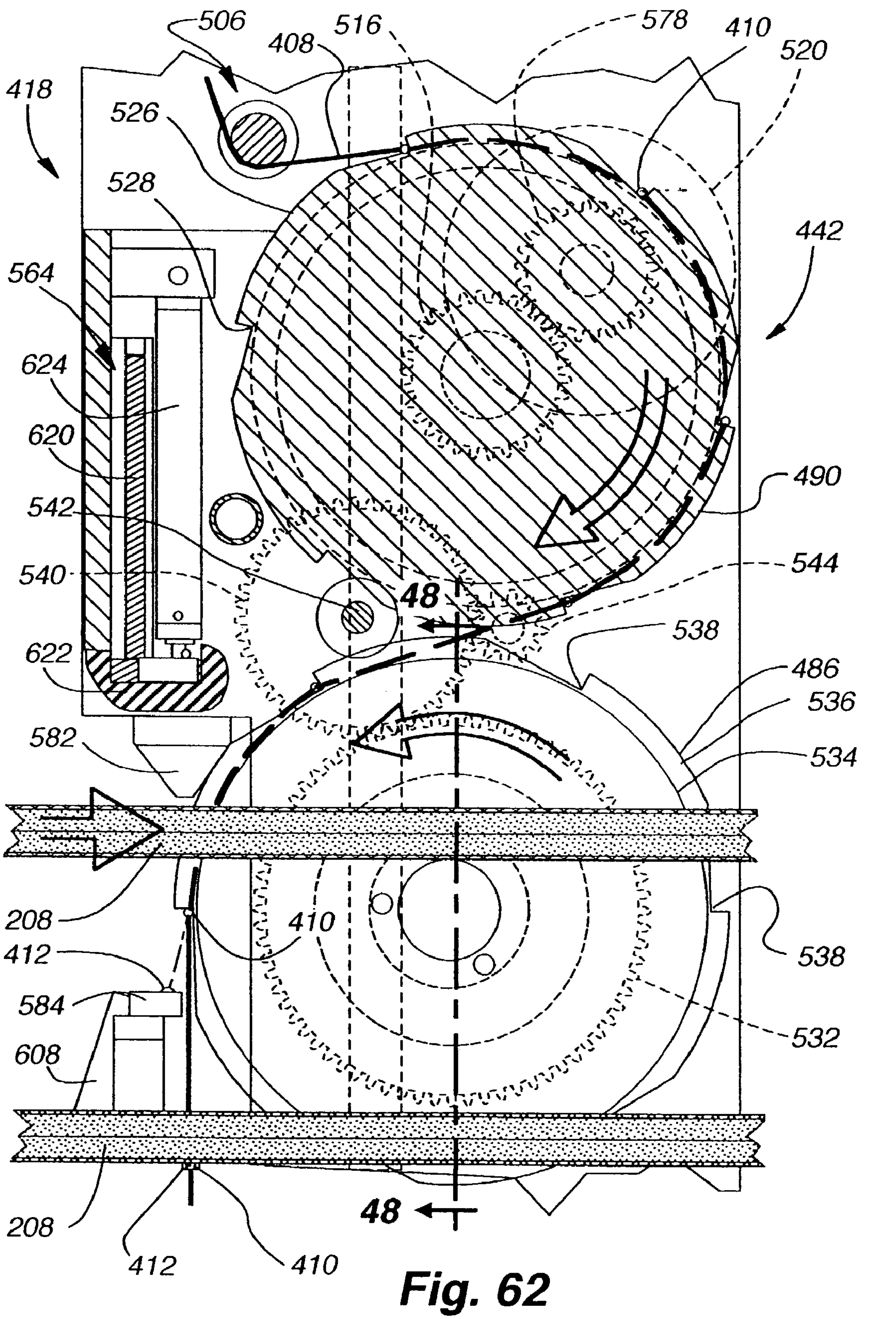
FIGS. 62–64 are cross sectional views of the ladder tape supply station taken along line 62—62 of FIG. 38 and line 64—64 of FIG. 50 illustrating the movement of the station's components during operation.

From the cylindrical guide bar 506, the ladder tape 408 passes over and around the tensioning drum 490 as best illustrated in FIGS. 47 and 62. The drum 490 is located in the space between the primary and secondary enclosures 474 and 484 and has a center axle 514 that passes through a hole in each for rotational movement thereabout. As shown in FIG. 47, the right end of the axle has a gear 516 affixed to it. This gear 516 is meshed with another gear 518 that is coupled to the an adjustable tensioning mechanism 520 that sets the level of resistance applied to rotation of the tensioning drum 490.

The tensioning drum 490 has a center section 522 with a diameter greater than two shelf sections 524 located proximate the left and right ends of the drum as illustrated in FIG. 47. The circumferential surfaces of the shelf and center sections 524 and 522 are joined by vertically orientated radial surfaces 526. The width of the center section 522 (or the distance between the opposing radial surfaces) is substantially equal to the length of the ladder tape's cross rungs 410. Axially extending grooves 528 are spaced along the circumferential surface of the center section 522 at intervals generally equal to the distance between adjacent cross rungs on the ladder tape 408. The tensioning drum 490 has a diameter at the nadir of each groove 528 that is substantially the same as its diameter at the shelf sections 524. Accordingly, in operation as the ladder tape 408 is pulled onto the tensioning drum 490 from the cylindrical guide bar 506 as shown in FIG. 46, the cross rungs 410 are held taut in a horizontally extended position in the grooves 528 while the vertical cords 414 are held on the shelf sections 524 up against the radial surfaces 526 of the span between the center section surface and the shelf surfaces.

The tensioning drum 490 in general and the shelf sections 524 in particular are located directly above the pair of opposing spreader wheels 486 that are spaced from each other a distance at least as great as the width of a tubular vane 208. The spreader wheels 456 act to hold the cross rungs 410 of the ladder tape 408 taut and to pull the ladder tape through the ladder tape supply and tensioning assembly 442. As shown in FIGS. 48 and 49, each spreader wheel includes a hollow center axle 492. Each center axle 492 passes through either the front face of the primary enclosure 474 or the rear face of the secondary enclosure 484, wherein it is supported by a sealed bearing 530. Attached to the outside surface at the end of each hollow axle is a toothed gear 532. As described above, the retractable support shafts 488 are contained within the hollow axles 492 for horizontally linear movement therein.

As best shown in FIGS. 47–49, each spreader wheel 486 comprises a circumferential surface 534 of a first diameter upon which the vertical cord portions 414 of the ladder tape 408 rest, and flanges 536 of a greater diameter along the edges of the wheels 486. Axially orientated grooves 538 are spaced along the circumference of each flange and extend through the flanges allowing the cross rung 410 to pass therethrough and extend across the space between the wheels to matched grooves 538 in the other spreader wheel.

As mentioned above, the spreader wheels 486 are driven such that they pull the ladder cord from the cartridge reel 440 through the cylindrical guide bar 506 and the tensioning drum 490. In particular, the toothed gears 532 of the spreader wheel axles 492 are each meshed against a corresponding idler gear 540 as shown in FIG. 47. The two idler gears 542 are each fixedly attached to ends of a common idler shaft 544. As best shown in FIG. 62, the idler gears are located generally above and to the left of the toothed axle gears 532. The idler shaft 542 passes through openings in the rear face of the secondary enclosure 484 and the front face of the primary enclosure 474 for free rotational movement therein. As shown in FIG. 47, the right idler gear 540 that is located within the primary enclosure is also meshed with a drive gear 544. The drive gear 544 is affixed to one end of a drive shaft 546, which is supported along its length by two bearing mounts 548. A drive pulley 550 is connected to the other end. A drive belt 552 is looped about the drive pulley 550 and a motor pulley 554. The motor pulley 554 is attached to the shaft of an electric motor 556 that is secured to the primary enclosure 474. Accordingly, by actuating the motor 556 the motor pulley 554 turns the drive belt 552; the drive belt turns the drive shaft 546; the drive gear 544 turns the idler shaft 542 through its connection with the right idler gear 540; and the left and right idler gear simultaneously turn the spreader wheels 486 through their connection with the toothed axle gears 532 causing the ladder tape to advance.

In a preferred embodiment, the spreader wheels 486 are geared such that they turn at their circumferential surface 534 a distance equal to the separation between adjacent cross rungs 410 of the ladder tape 408 for every complete rotation of the electric motor 556. Further, a mechanical switch is provided (not shown) which interfaces with the shaft of the motor 556 to automatically turn off the motor after it has completed a single revolution. Accordingly, to advance the ladder tape prior to receiving the next vane, the control system need only turn on the electric motor, which will turn itself off via the mechanical switch once it has advanced the ladder tape the required amount.

Once a tubular vane 208 has been received and is centered in the space between the primary and secondary enclosures 474 and 484 resting on the retractable shafts 488, the resin application and bonding assembly 444 that is mounted in the primary enclosure is activated by the control system to secure the cross rung 410 to the bottom side of the tubular vane 208. Three embodiments of resin application and bonding assemblies are described herein: the first embodiment utilizes a thermoplastic resin; whereas, the second and third embodiments utilize a photo-initiated curing thermoset resin that begins curing when exposed to one or both of ultraviolet and visible light. The first embodiment resin application and bonding assembly is illustrated primarily in FIGS. 38, 39, 50–52, and 59–64. The second embodiment resin application and bonding assembly is illustrated in FIGS. 53–58. The third embodiment resin application and bonding assembly, which is configured to deposit two resin beads to a corresponding vane and cross rung is illustrated in FIGS. 69–76.

Figure 50:
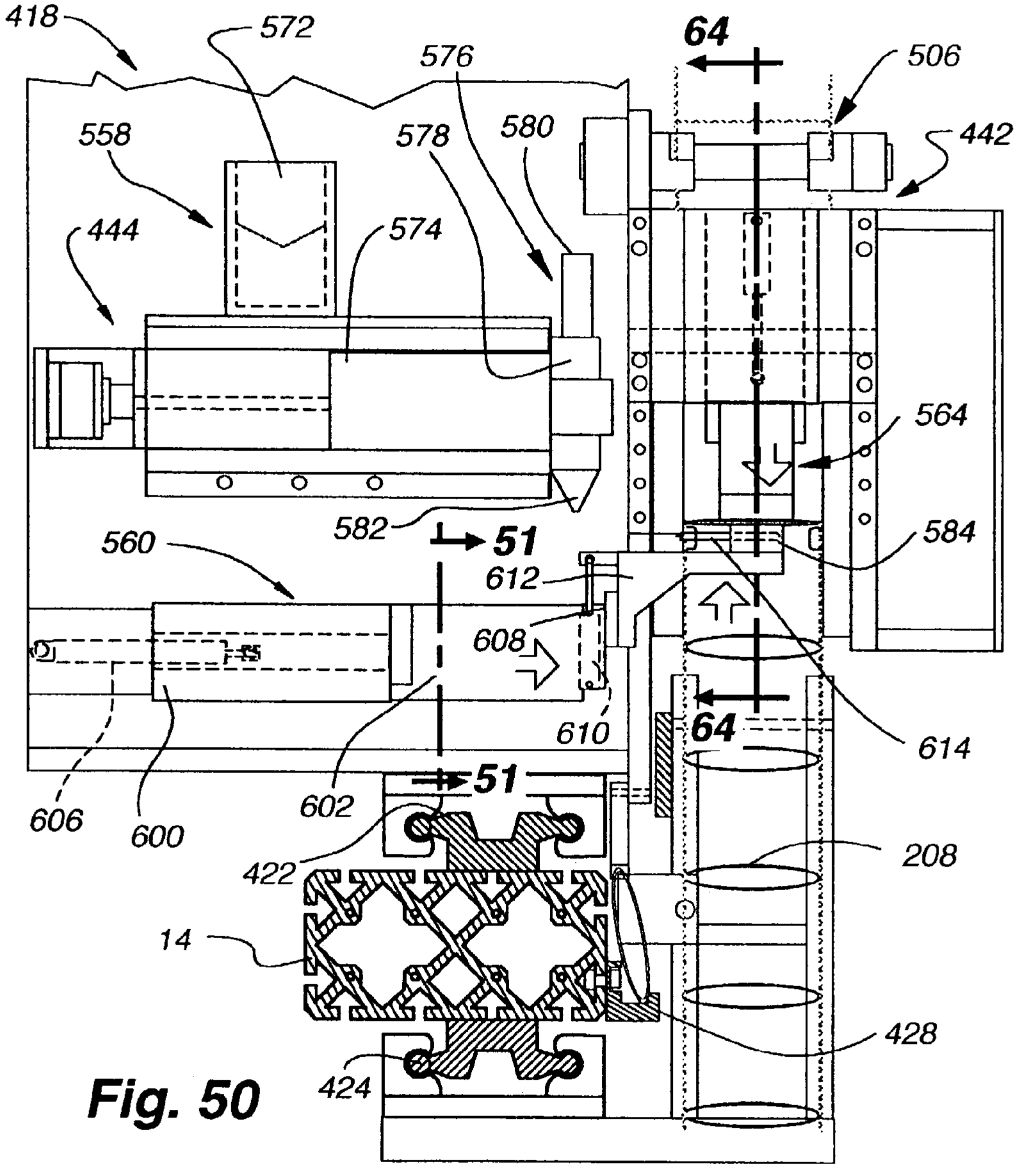
FIG. 50 is a fragmentary enlarged cross sectional view of the ladder tape supply station taken along line 38—38 of FIG. 40 illustrating the thermoplastic resin bead dispenser and bonding assembly and the movement of the components associated therewith.
Figure 53:
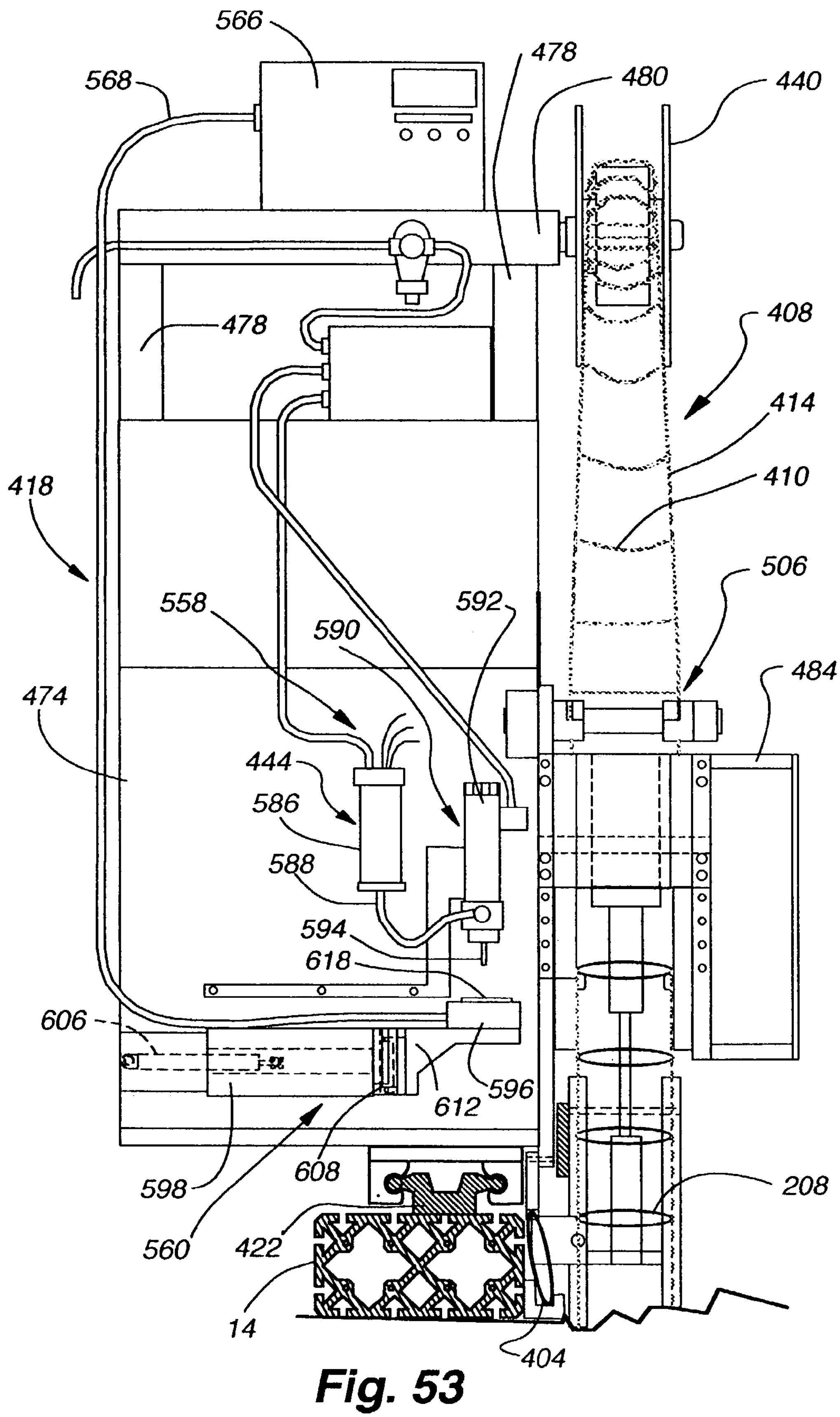
FIG. 53 is a cross sectional view of a ladder tape supply station as taken along line 38—38 of FIG. 40 illustrating the ultrasonic curing thermoset resin dispenser and bonding assembly.
Figure 57:
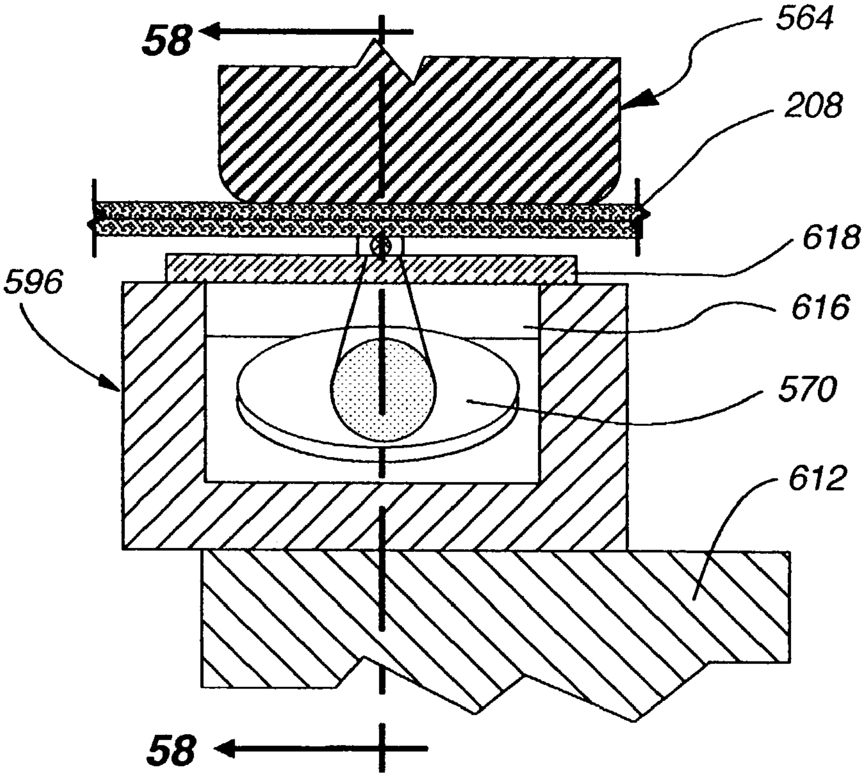
FIG. 57 is a cross sectional view of the bonding platen and clamp mechanism for the ultrasonic thermoset resin bonding assembly as taken along line 57—57 of FIG. 54.
Figure 58:
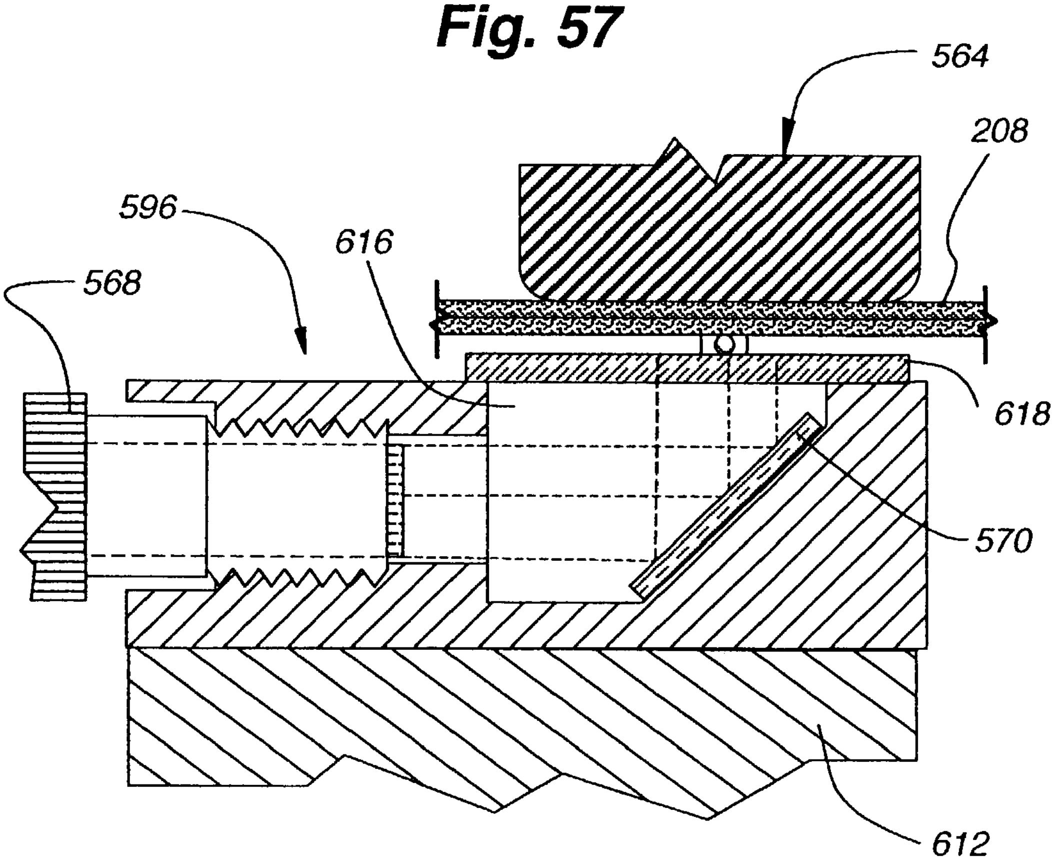
FIG. 58 is a cross sectional view of the bonding platen and clamp mechanism for the ultrasonic thermoset resin bonding assembly as taken along line 58—58 of FIG. 57.
Figure 69:
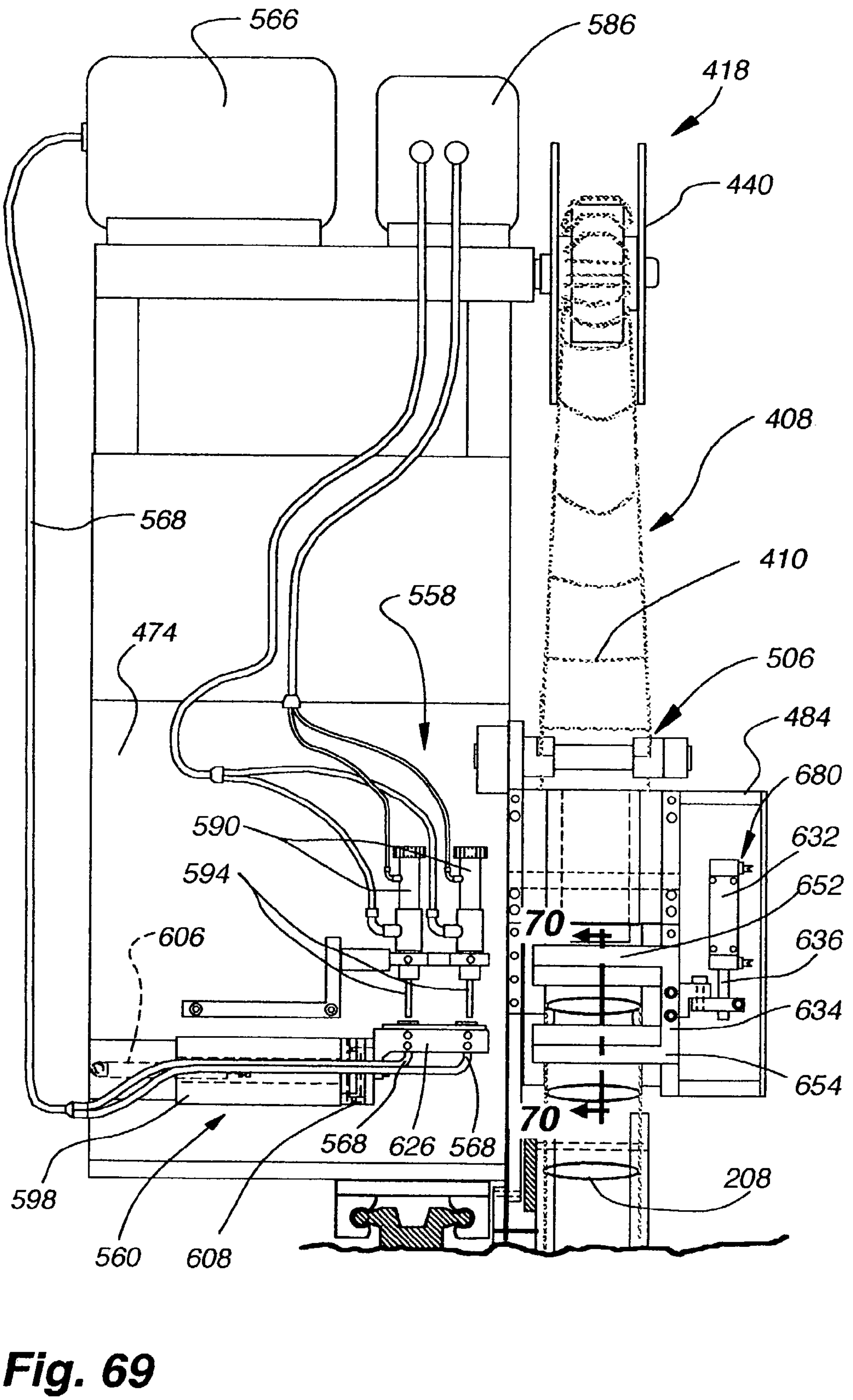
FIG. 69 is a cross sectional view of a ladder tape supply station as taken along line 38—38 of FIG. 40 illustrating the third embodiment resin dispenser and bonding assembly.
Figure 75:
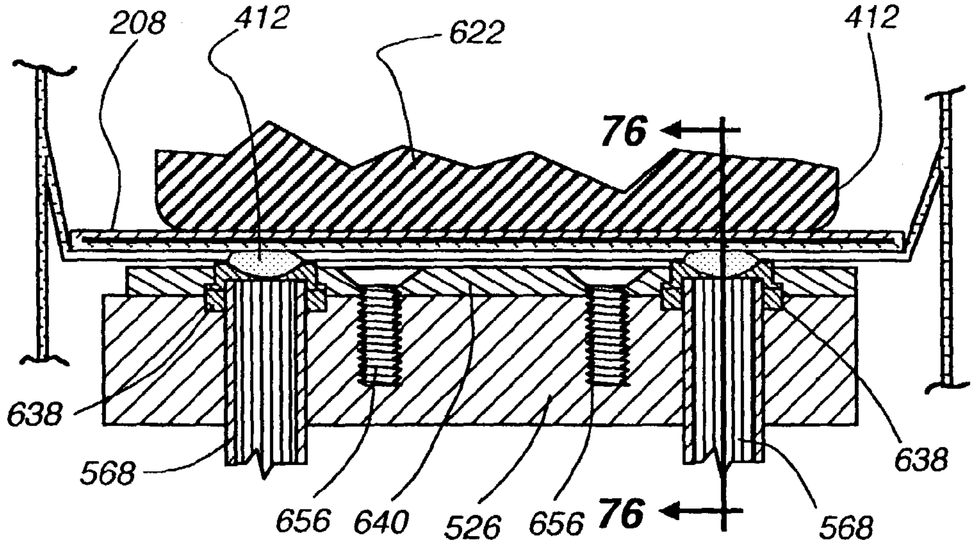
FIG. 75 is a partial view of the third embodiment resin supply and bonding assembly taken along line 75—75 of FIG. 74.
Figure 76:
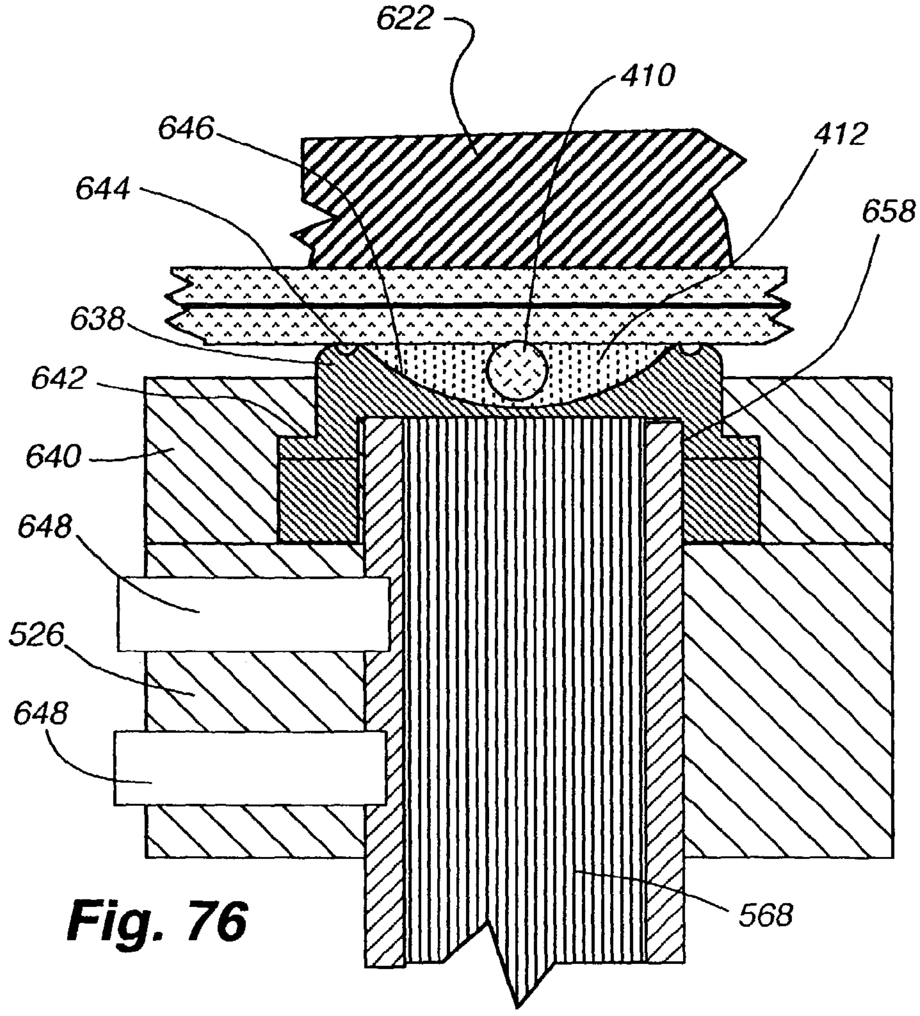
FIG. 76 is an enlarged partial view of the third embodiment resin supply and bonding assembly taken along line 75—75 of FIG. 74.

Referring primarily to FIG. 50, FIG. 53 and FIG. 69, all three resin application and bonding assembly embodiments include at least one resin dispenser 558; a resin shuttle 560 for moving a bead of resin 412 into position underneath the bottom side 142 of a vane 208; and a clamping mechanism 564 (as best shown in FIGS. 62 and 70) for pressing the cross rung 410 and the bottom side of the vane together as the resin bead solidifies or cures. The second and third embodiment resin application and bonding assemblies further includes a light source 566 that is routed by way of fiber optic cabling 568 (or another type of light guide) to a location underneath the resin bead 412 on the resin shuttle 560. In the second embodiment a mirror 570 is utilized (as shown in FIGS. 57 and 58) to direct the light emanating from the fiber optic cable through a transparent platen 618 on which the resin bead is deposited. In the third embodiment, each of the two the fiber optic cables terminate at a transparent resin cup 638 in which a resin bead is deposited as best illustrated in FIGS. 75 and 76.

The resin dispenser 558 for the thermoplastic resin is best illustrated in FIG. 50. It includes a hopper 572 in which pellets of the thermoplastic resin are placed to supply the melt chamber 574 below. The melt chamber 574 includes a heater (not detailed in figures) for melting the resin pellets and a piston (not detailed in figures) disposed in the chamber that is coupled with an air cylinder (not detailed in figures) for pushing the liquid resin into a dispenser section 576. The dispenser section 576 includes a vertically oriented chamber 578 that is coupled with a small air cylinder 580 for dispensing a predetermined amount of resin through a nozzle 582 at the base of the chamber onto a platen 584 of the resin shuttle 560.

Figures 54, 55, 56:
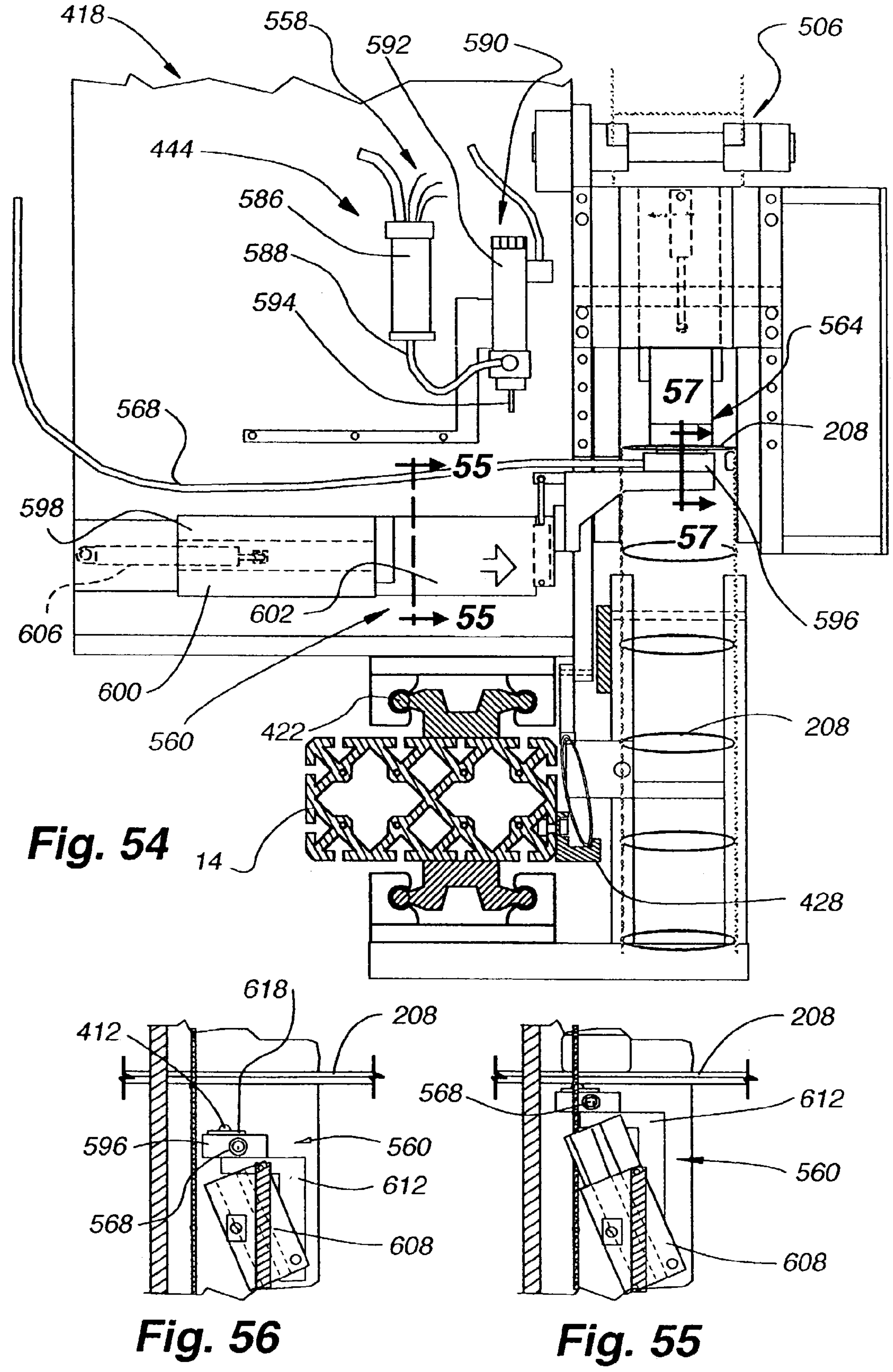
FIG. 54 is a fragmentary cross sectional view of the ladder tape supply station taken along line 38—38 of FIG. 40 illustrating the thermoplastic resin bonding assembly and the movement of the components associated therewith.
FIGS. 55 and 56 are cross sectional views of the resin shuttle mechanism illustrating the upwardly and leftwardly movement of the bonding platen as taken along line 55—55 of FIG. 54.

The resin dispenser 558 for the photo-initiated curing thermoset resin of the second embodiment is best illustrated in FIG. 54. It includes a resin reservoir 586, which is kept under pressure to supply the resin to a metered dispenser 590 via an opaque feeder tube 588. The dispenser 590 includes a pressurized chamber 592 and a nozzle 594 for selectively releasing a predetermined amount of resin onto a platen 596 of the resin shuttle 560.

The resin dispenser 558 of the third embodiment as illustrated in FIG. 69 is generally similar to the dispenser of the second embodiment except that it includes two metered dispensers 590 that each selectively release a predetermined amount of resin into the aforementioned resin cups. Additionally, the resin reservoir 586 is located on a top surface of the ladder tape supply assembly and is larger than the reservoir provided in the second embodiment.

Figure 59:
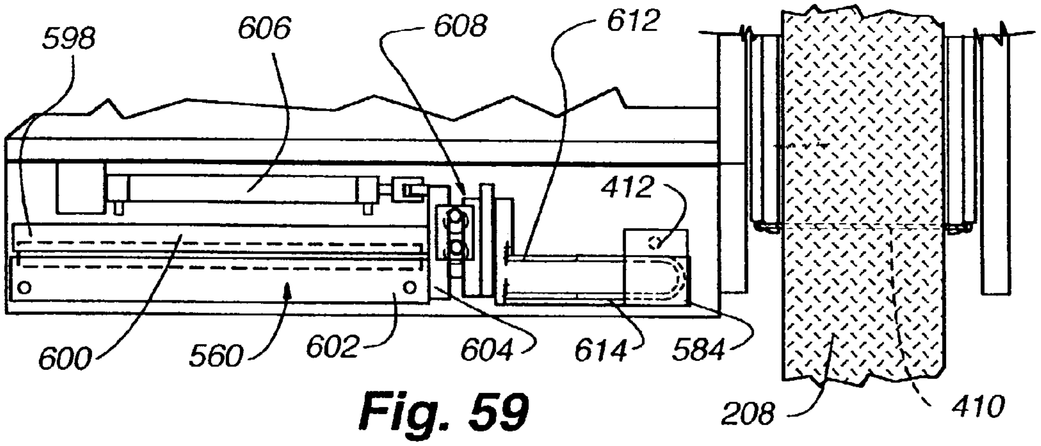
FIGS. 59–61 are cross sectional views of the resin shuttle taken along line 59—59 of FIG. 38 illustrating the movement of the resin shuttle during a vane to cross rung bonding operation.
Figure 60:
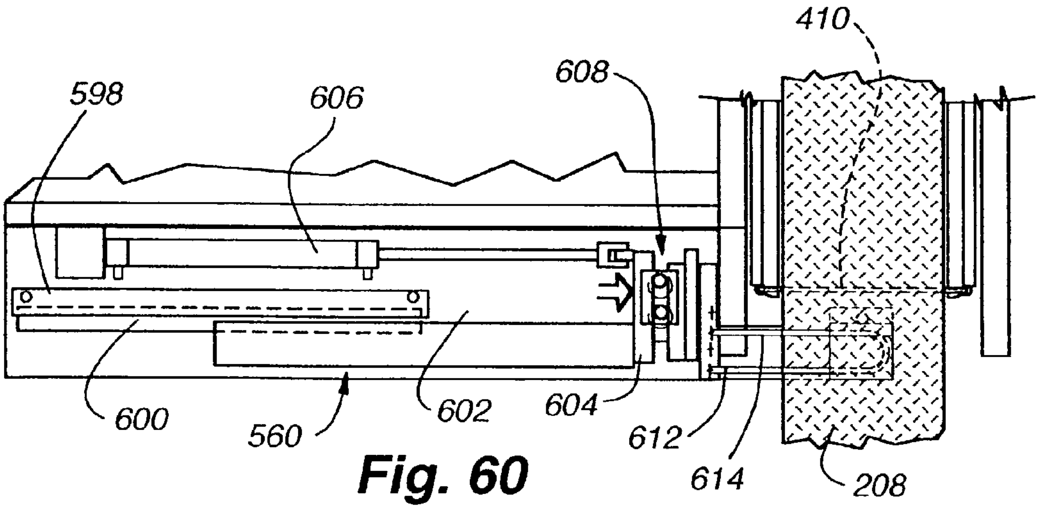
Figure 61:
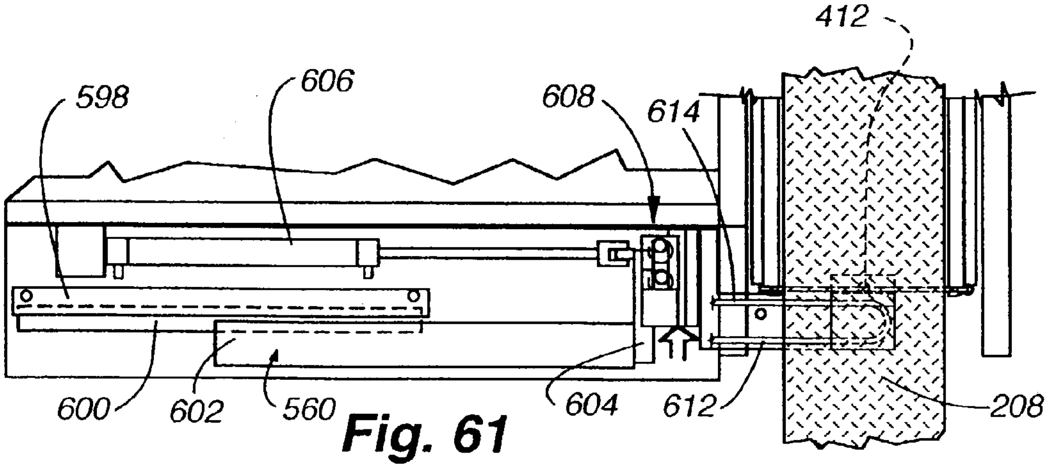

The resin shuttle 560 for the first embodiment application and bonding assembly is best illustrated in FIGS. 50–52 and 59–61. Except for the platen 596 on which the resin bead 412 is received from the dispenser 558, the resin shuttle 560 for the second embodiment assembly is nearly identical to that of the first embodiment assembly. Further except for the arrangement of resin cups 638, the resin shuttle in the third embodiment is nearly identical to the first and second embodiment resin shuttles. The shuttle includes a slide mechanism 598 having a first piece 600 that is fixedly attached to the left side of the primary enclosure 474 (as viewed in FIG. 39) and a second piece 602 that is slidably connected to the first for longitudinal movement relative to the first piece as is best illustrated in FIGS. 59–61. A small vertically orientated plate 604 is mounted to the distal end of the second piece. The plate 604 has the end of the shaft of an air cylinder 606 mounted to it, wherein the other end of the cylinder is mounted to the primary enclosure 474. The air cylinder 606 is orientated parallel to the direction of the second piece's slidable movement and is actuatable to move the second piece 602 back and forth along the first piece 600.

Figure 52:
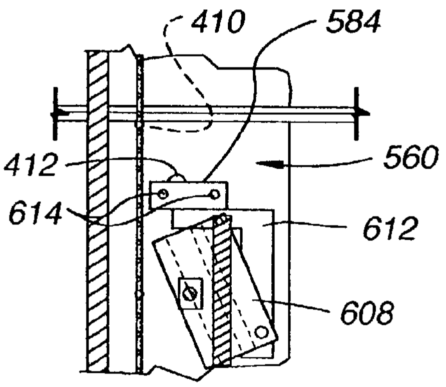
FIGS. 51 and 52 are a cross sectional views of the resin shuttle mechanism illustrating the upwardly and leftwardly movement of the bonding platen as taken along line 51—51 of FIG. 50.
Figure 51:
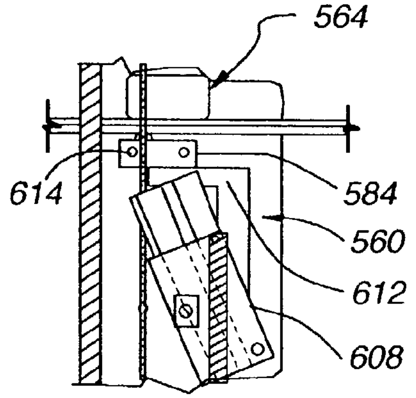

Referring to FIGS. 51 and 52, a small slide actuator 608 is connected to the front face of the vertical plate 604 and is canted off vertical such that the sliding portion of the slide actuator moves simultaneously upwardly and to the left when a small air cylinder 610 (as shown in FIG. 50) contained therein is actuated. A gusseted L-bracket 612 is fixed to the slide actuator for upward and leftward movement in conjunction with the slide actuator. Referring to FIG. 50, the platen 584 is affixed to the top horizontal surface of one arm of the L-bracket proximate the bracket's right end. A pipe 614 passes through the platen to circulate water to keep the platen at a temperature significantly lower than the melting point of the thermoplastic resin.

The platen 596 for use with the second embodiment application and bonding assembly is shown generally in FIGS. 54–56 and more specifically in FIGS. 57 and 58. The platen 596 comprises a chamber 616 into which the fiber optic cable 568 (or light guide) is received for transmitting light. The mirror 570 is located opposite the cable's point of termination and is orientated at a 45 degree angle to both direct the light emanating from the cable 568 upwardly and focus the light at the bead of photo-initiated curing thermoset resin. It is appreciated that at least a portion of the top horizontal face 618 of the platen 596 comprises a translucent material such as glass through which the light can pass unimpeded.

Referring to FIG. 75, two upwardly facing translucent resin cups 638 that are secured on the top of the platen 526 of third embodiment resin application and bonding assembly to receive and hold the thermoset resin prior to and during the curing operation. The resin cups are typically fabricated from either a translucent plastic material with good release characteristics or from a clear glass material. As shown in FIG. 76 the resin cup includes an upwardly facing shaped resin cavity 646 which effectively controls the resulting shape of the resin bead 412 securing the cross rung 410 to the bead. Preferably, the volume of the resin cavity corresponds to the volume of resin deposited therein. The illustrated resin cavity is circular and is configured to form a smooth and rounded resin bead, although cavities of any suitable and desirable shape and configuration can be utilized. A ringed depression 644 encircling the resin cavity is also provided into which any excess resin can flow during the bonding operation. It is appreciated that the resulting cured resin beads are much more uniform than the beads produced using the first or second embodiment resin application and bonding assemblies. Further, by providing a ringed depression any excess resin is confined to a small area surrounding the cross rung bonding location on the vane and the resulting cured resin ring provides a more uniform and atheistically pleasing finished bead.

A circumferential shoulder 642 is provided around the outside of a typical resin cup at a transition from a small upper outside diameter to a larger lower outside diameter. The outside diameters of the resin cups correspond to the inside diameters of bores in an affixing plate 640 that is utilized to secure the resin cups to the platen 526 of the third embodiment. As best shown in FIG. 75, the affixing plate which is typically fabricated from a rigid plastic or metal is attached to the platen through one or more countersunk screws 656. A downwardly facing circumferential shoulder of each bore in the affixing plate mates with the corresponding upwardly facing shoulder of the resin cup to secure the resin cup in place.

The platen of the third embodiment resin application and bonding assembly has two vertical bores extending through it from the bottom surface to the top surface thereof at locations substantially coincidental with the location of the bottoms of the resin cups on the platen. The bores are sized to receive a fiber optic cable 568 therein. Further, each of the each of the resin cups 638 has a upwardly extending cylindrical bore 658 formed therein that terminates below the resin cavity such that the ceiling of the cylindrical bore is the floor of the resin cavity. The fiber optic cables are secured in the cylindrical cavities and the vertical bores of the platen by way of one or more set screws that extend horizontally through associated bores 648 in the platen. The end of the fiber optic cables are butted directly against the ceiling of the cylindrical bore so that any light transmitted through the cables is released through the resin cup and any resin contained therein.

A forth embodiment resin application and bonding assembly is also contemplated but not shown wherein the general components of the third embodiment are present but only a single resin dispenser and corresponding resin cup is utilized in place of the two dispensers and resin cups. Further, other alternative resin application and bonding assemblies are contemplated wherein there are more than two resin cups and resin dispensers. In yet other alternative embodiments, resin cups may be incorporated with the thermoplastic resin application and bonding assembly wherein the resulting resin beads on the corresponding vanes have the dimensions of the resin cavity. It is appreciated that in such a thermoplastic bonding assembly that the resin cups need not be translucent and could be fabricated from any number of opaque materials including metals and ceramics.

Figure 63:
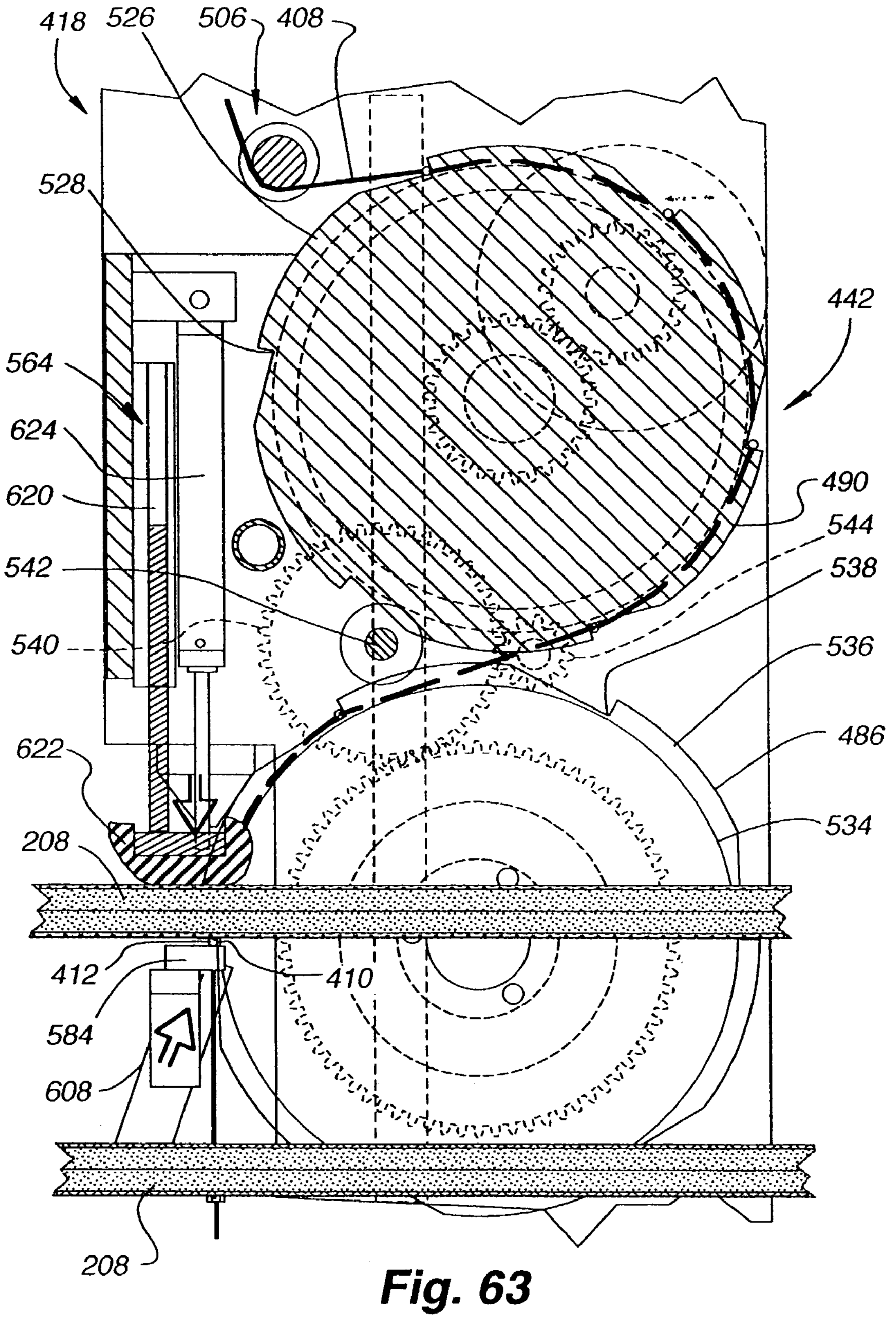

The final component of the resin application and bonding assembly 444 is the clamping mechanism 564 which acts to apply pressure to the resin bead 412, the cross rung 410 and the tubular vane 208 such that they are joined together as the resin bead either cools or cures. The clamp mechanism 564 is substantially identical in all three resin application and bonding assemblies. Referring primarily to FIGS. 50 and 63, a vertically orientated slide 620 is located in the space between the primary and secondary enclosures 474 and 484 just to the left of the tensioning drum 490. The bottom end of the sliding portion of the slide 620 has a clamp foot with a horizontal bottom surface attached thereto. The foot 622 is generally centered relative to the longitudinal axis of a tubular vane 208 held within the ladder tape supply station, directly above a cross rung 410 when the cross rung is horizontally aligned with the center axis of the spreader wheels 486. A vertically oriented air cylinder 624 is secured at its shaft to the clamp foot 622 and at its other end with the primary enclosure such that actuation of the cylinder moves the foot and slide upwardly and downwardly.

Figure 64:
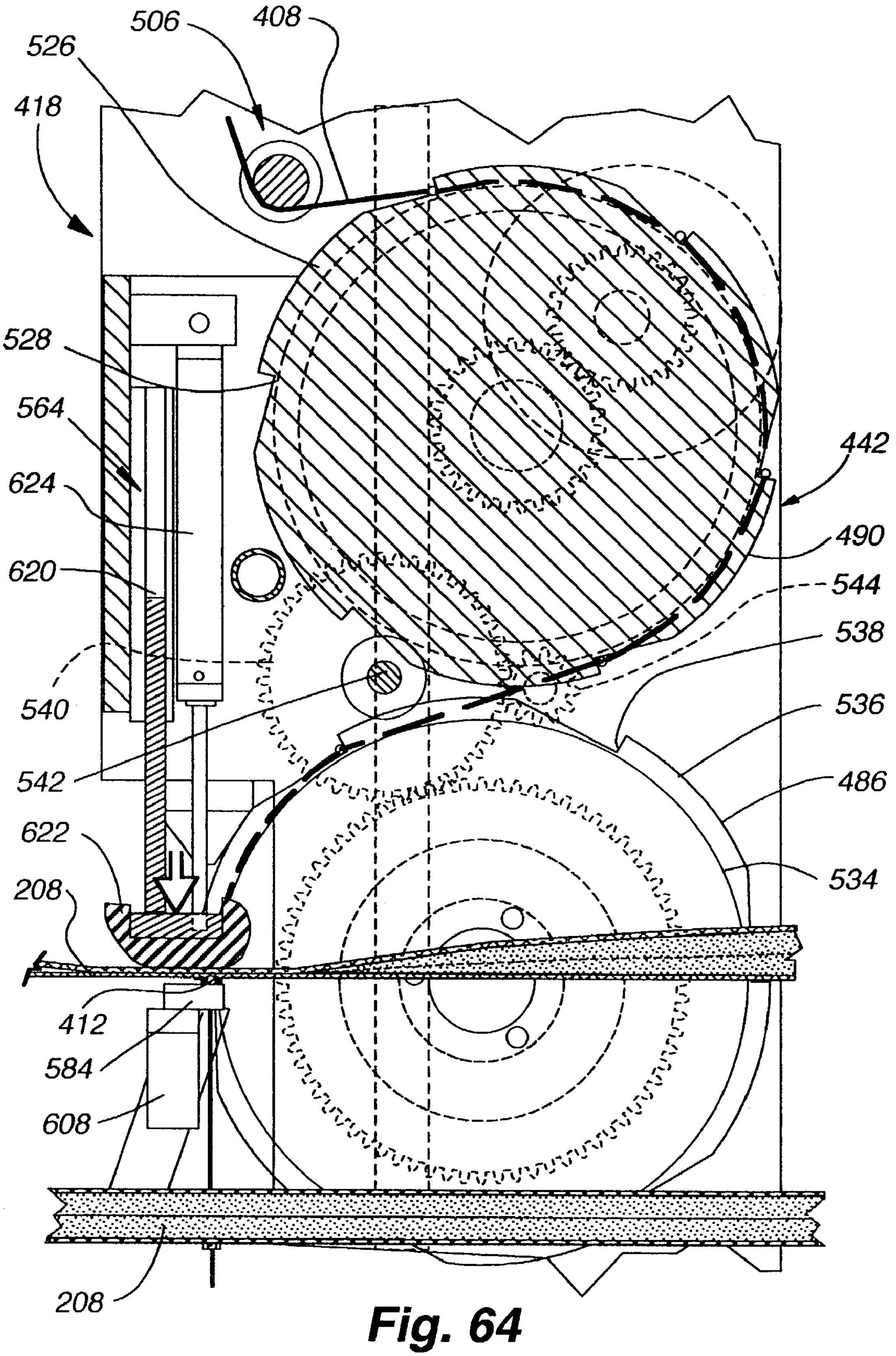
Figure 72:
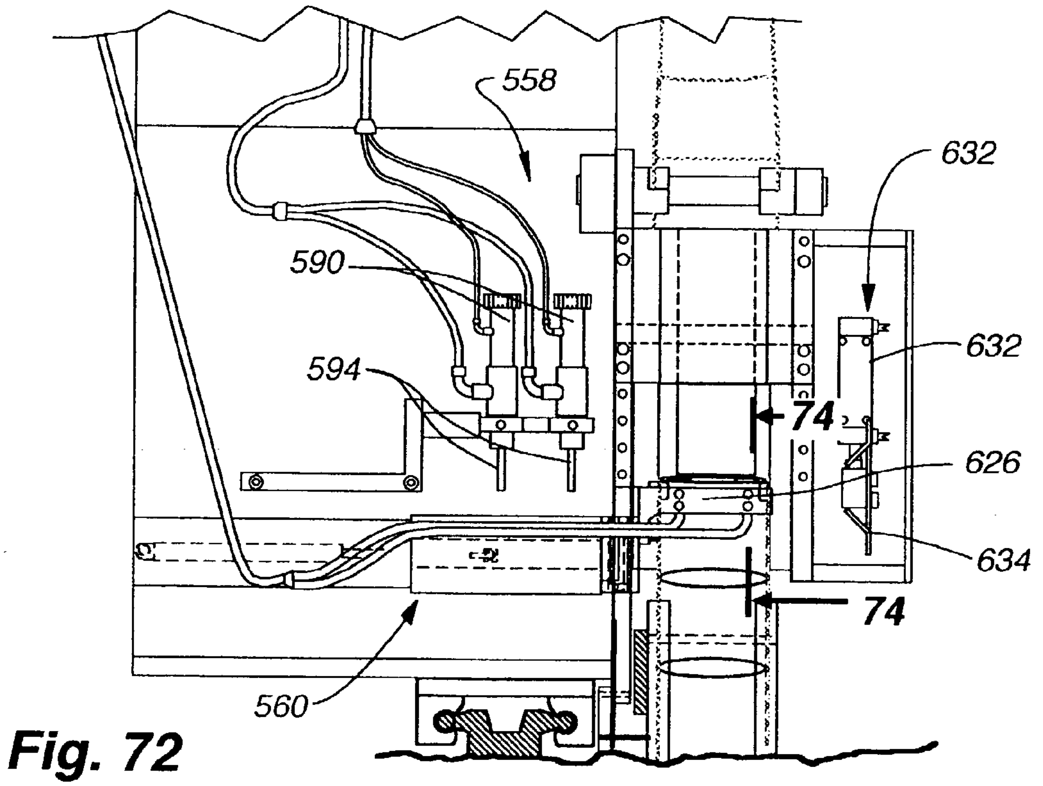
Figure 74:
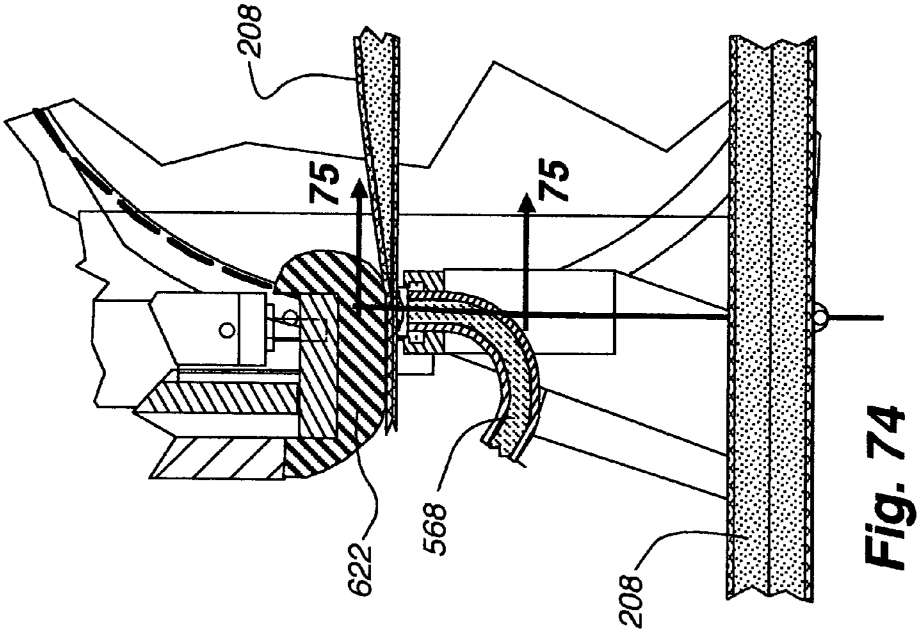
FIG. 74 is partial view of the third embodiment resin supply and bonding assembly taken along line 74—74 of FIG. 72.
Figure 73:
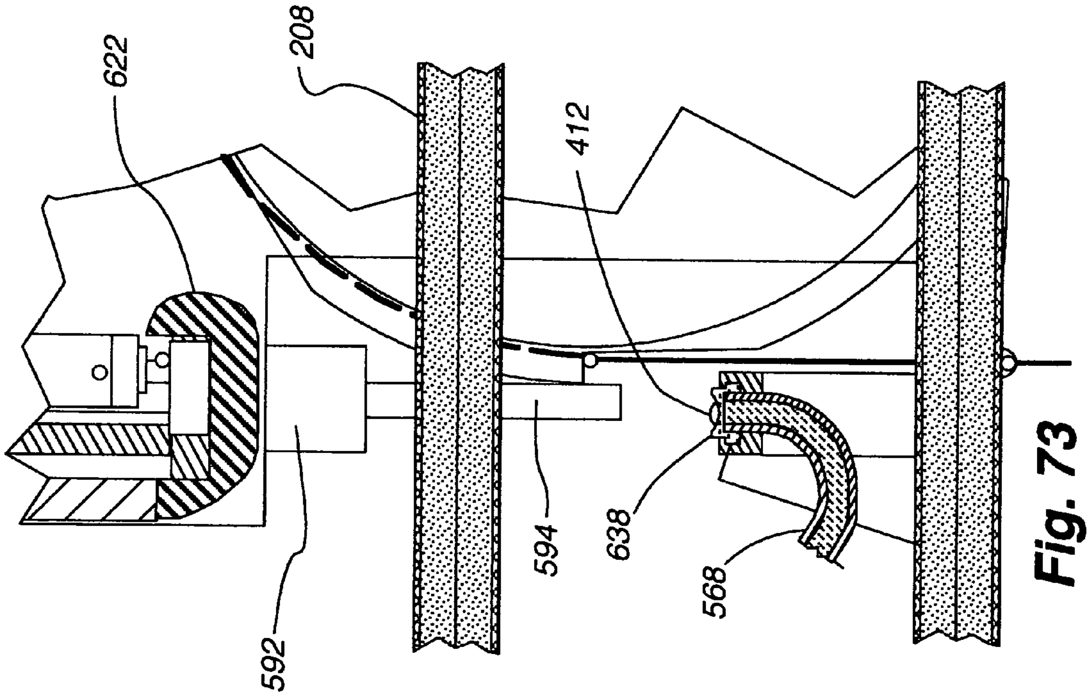
FIG. 73 is partial view of the third embodiment resin supply and bonding assembly taken along line 73—73 of FIG. 71.

In operation, once the ladder cord 408 has been advanced such that a cross rung 410 is located horizontally with the axis of the spreader wheels 486 and a tubular vane 208 has been received between the vertical cords 414 of the ladder tape and is supported by the retractable shafts 488, the air cylinder 610 of the canted slide actuator 608 lifts the platen 584 or 596 upwardly and to the left to a position under the resin dispenser's nozzle 582 or 594. A drop containing a predetermined amount of resin is deposited onto the platen or in the one or more resin cups. Next, the slide actuator 608 retracts downwardly and to the right. The horizontal slide mechanism 598 is extended through the activation of the parallel air cylinder 606 to move the platen with the resin bead 412 to the right as shown in FIG. 60. Once the slide 598 is fully extended and the platen is located beneath the vane, the canted slide actuator 608 is reactivated to raise the platen or resin cups to a position underneath and in contact with both the cross rung 410 and the bottom side 142 of the vane 208. Simultaneously, the vertical air cylinder 624 is activated driving the backup clamp foot 622 downwardly and biasing it against the platen or resin cups of the resin shuttle 560, thereby applying pressure to the bond line as shown in FIGS. 64 and 72. The retractable shafts 488 that support the vane just after it is shot in between the ladder tape supply stations 418 are retracted as the vane is clamped between the platen and the clamp foot. When using a thermoplastic resin, the bond line is held in compression for sufficient time to permit the resin bead to solidify around the cross rung and to the vane's bottom side. When the photo-initiated curing thermoset resin is utilized, light is piped through the fiber optic cable 568 (or other type of light guide) to the resin to cure it within a few seconds. Once the resin bead has hardened, the platen and/or resin cups are retracted downwardly and to the left (as seen in FIG. 64) out from under the vane 208.

Figure 65:
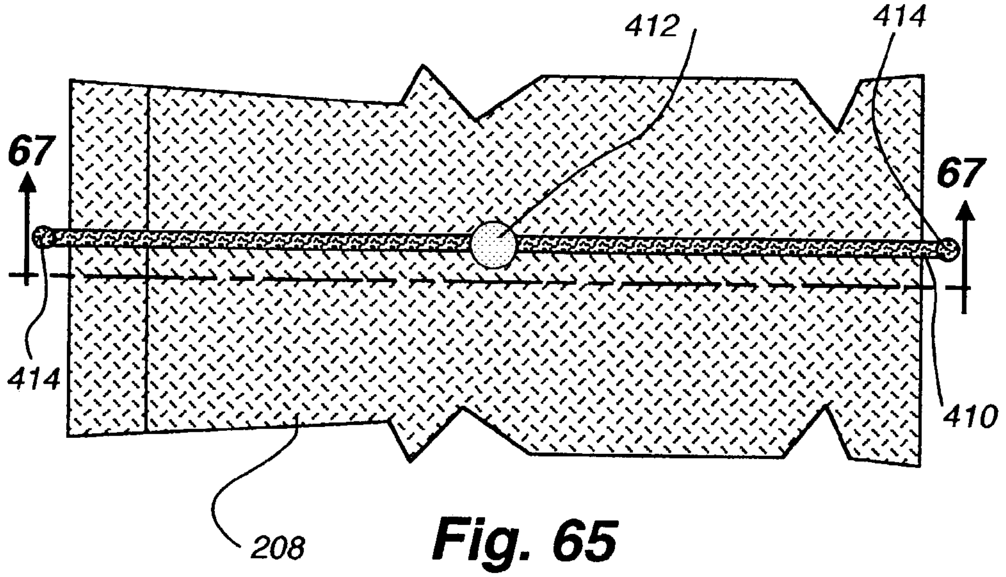
FIG. 65 is a cross sectional view of a vane taken along line 65—65 of FIG. 48 showing the cross rung adhesively joined to the vane by way of an resin bead.
Figure 66:
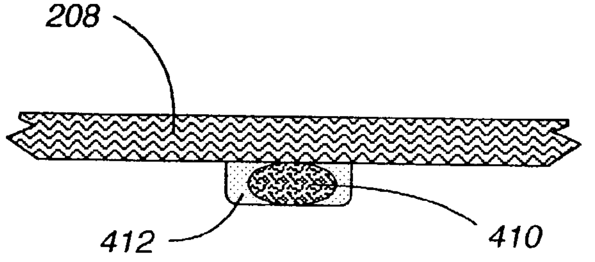
FIG. 66 is an enlarged fragmentary cross sectional view of a vane taken along line 66—66 of FIG. 48.
Figure 67:
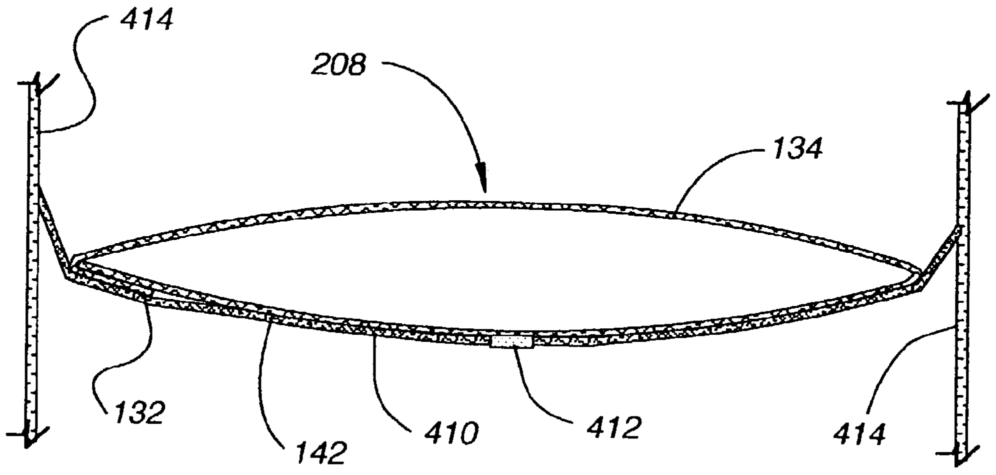
FIG. 67 is a cross sectional view of a vane that is attached to a cross rung by way of an resin bead taken along line 67—67 of FIG. 65.
Figure 77:
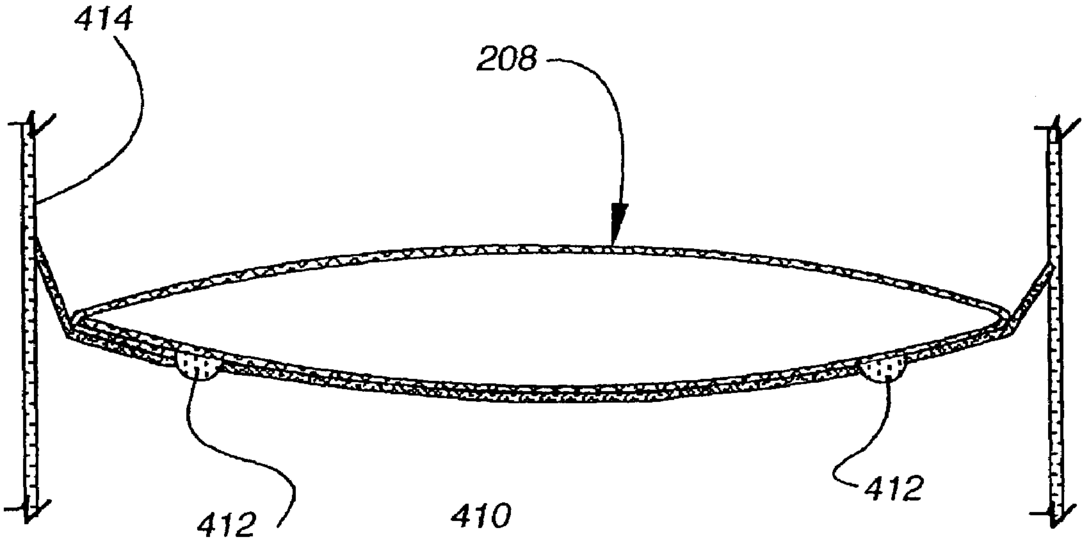
FIG. 77 is a cross sectional view of a vane attached to a cross rung in two locations by resin beads.

FIGS. 65–67 and 77 provide several views of a completed bond between the bottom side 142 of a vane 208 and a cross rung 410. As shown in FIGS. 65 and 66 the resin bead 412 is formed into a cylindrical nubbin through which the cross rung passes. A cylindrical shape or other finished shapes can be formed based on the shape of a cavity or depression provided in the surface of the platen 584 or 596 at the location that the resin bead is applied thereto or through the use of a resin cup. As illustrated in FIG. 67, it is often preferable to adhesively join the vane to the cross rung proximate the center of the vane's bottom side. FIG. 77 shows the typical placement of the resin beads when two beads are utilized to join a single cross rung to a vane. It is to be appreciated that two resin beads are useful in blind assemblies wherein the ladder tapes are located close to the edges of the vanes of the assembly such as the assemblies produced when the apparatus is set up as shown in FIG. 68. By securing the cross rung to the vane in two places the cross rung can not slip off the end of the vane. It is to be appreciated that the inner cross rungs in a blind assembly produced using the ladder tape supply station setup of FIG. 68 are typically secured to the vane with only a single resin bead since there is no likelihood of the cross rung slipping off the end of the vane.

For clarity, the operational sequence of the subassembly fabrication section will be described. Once a vane 208 has been adhesively joined in the bonding section of the vane fabrication apparatus, the feeder motor assemblies are turned on by the control system and the vane is transported into the subassembly fabrication section 400. As the vane exits the bonding section 300 it is fed through the two feeder motor assemblies along the left side of the subassembly section (referring to FIG. 1B). These two feeder motors shoot the vane through the space between the primary and secondary enclosures 474 and 484 of the ladder tape supply stations 418, as well as, through the vertical cords 414 of the ladder tape 408 of each station above an associated cross rung of each ladder tape. In certain embodiments, the fork guides described above are rotated into place to help guide the vane through the ladder tape supply sections.

Once the vane has passed through each of the ladder tape supply stations 418 being utilized, the vane is gently decelerated by the catch arm assembly 402 as the right end of the vane impacts the catch arm 448 and the catch arm swings to the right. Once the movement of the vane has been stopped, the air cylinder 472 attached to the catch arm, rotates the catch arm back to its generally vertically orientated position, thereby pushing the vane to the left until the left end of the vane is butted up against the fixed vertical plate 406. As the left end of the vane is moved up against the vertical plate, a sensor pair 416 mounted up against the surface of the plate 406 is triggered to indicate to the control system that the vane is longitudinally positioned for the cross rung bonding operation to begin. Once the vane is properly positioned in the subassembly fabrication section the forked guide is rotationally retracted so that it does not interfere with subsequent subassembly fabrication operations such as the lower of the bonded vane to make way for a new vane Next, a bead of resin 412 is deposited by the resin dispenser 558 on the bond platen 584 or 596. The resin shuttle 560 moves the resin laden platen to a position beneath the bottom side 142 of the vane 208. In a nearly simultaneous sequence, the shuttle moves the platen upwardly and to the side until the resin bead contacts both an associated cross rung and the bottom side of the vane, the clamping foot 622 of the clamping mechanism 564 extends downwardly directly above the platen to clamp the vane and cross rung in place until the resin has solidified, and the retractable shafts 488 of each ladder tape supply station 418, which support the vane in the ladder tape supply station, are retracted. Once the resin bead has solidified, either through cooling, if a thermoplastic resin is utilized or through photo-initiated curing if a photo-initiated thermoset resin is utilized, the platen and resin shuttle are retracted.

Finally, the vane is lowered as the ladder tapes 408 are advanced by the ladder tape supply and tensioning mechanism 442. Additionally, the clamp mechanism 564 is moved downwardly a short distance to help push the vane out from between the ladder tape supply stations before retracting upwardly. The portion of the ladder tapes immediately adjacent the portion to which the vane was bonded is prepared to receive the next vane, and the retractable shafts 488 are re-extended to prepare to receive and support the next vane 208. The process is then repeated until a subassembly 455 comprising a predetermined number of vanes has been fabricated. A headrail, footrail and lift and tilt mechanism are then added to the subassembly to fabricate a completed blind assembly.

The Subassembly Fabrication Section described above utilizes thermoplastic or thermoset resins to couple the ladder tape cross rungs to the vanes. It is appreciated that in alternative Subassembly Fabrication Sections that other mechanisms and methods of attaching the ladder tapes to the vanes can be utilized as would be obvious to one of ordinary skill in the art. For example, a mechanism can be specified that mechanically fastens the cross rungs to the vane using a fastener such as a rivet. In another example, a mechanism can be specified that sews the cross rung to the vane. In yet another example, a mechanism could be specified that sonically fuses a cross rung cord made of a thermoplastic material to the vane.

Although the present invention has been described with a certain degree of particularity, it is understood that the present disclosure has been made by way if example, and changes in detail or structure may be made without departing from the spirit of the invention as defined in the appended claims.

What is claimed is:

1. An apparatus for fabricating blind subassemblies, the apparatus comprising in combination:

a vane forming section where vanes of a predetermined length are formed;

a fabrication section where vanes are positioned within ladder tapes having a pair of vertical cords interconnected by spaced cross rungs; and a system for fixedly attaching each vane to an associated cross rung including a mechanism for positioning a securement medium in engagement with a vane and an associated cross rung.

2. The apparatus of claim 1 wherein said vane-forming section includes a system for folding an elongated strip of material into a substantially tubular form and securing the strip in the tubular form.

3. The apparatus of claim 2 wherein said vane-forming section further includes a cutter for cutting said strip of material into a predetermined length.

4. The apparatus of claim 3 wherein said cutter is positioned for cutting said strip of material after the strip of material is folded into a substantially tubular form.

5. The apparatus of claim 3 wherein said cutter is movable within said apparatus between predetermined fixed positions.

6. The apparatus of claim 5 wherein the means for positioning the vane within a ladder tape is coordinated with the position of said cutter.

7. The apparatus of claim 2 wherein said system for folding pulls the strip longitudinally along a blade that forms a fold along the length of the strip.

8. The apparatus of claim 7 wherein said fold is formed approximately along a longitudinal centerline of the strip.

9. The apparatus of claim 2 or 7 wherein said strip has a line of adhesive along one longitudinal edge and wherein said strip is secured in said tubular form by compressing said line of adhesive against the other longitudinal edge of the strip.

10. The apparatus of claim 2 or 7 wherein said strip is a foldable semi-rigid material.

11. The apparatus of claim 10 wherein said strip is a resin impregnated non-woven fabric tape.

12. The apparatus of claim 1 wherein said fabrication section includes a system for positioning the vane within the ladder tape and a system for supporting the vertical cords in a predetermined spaced relationship and with a preselected rung being positioned within a space contiguous thereto, a system for advancing said vane longitudinally into said space, and a system for yieldingly resisting the longitudinal movement of said vane to stop the longitudinal movement to position said vane in said space adjacent to said rung.

13. The apparatus of claim 12 wherein said system for yieldingly resisting movement further functions to move said vane in an opposite longitudinal direction after the initial movement has stopped to positively position said vane in a predetermined position relative to said rung.

14. The apparatus of claim 1 further including a system for coordinating said predetermined length of said vane with the positioning of said vane within said ladder tape.

15. The apparatus of claim 1 wherein said fabrication section includes a system for supporting the vertical cords in a predetermined spaced relationship and with a rung being positioned within a space contiguous thereto, a system for advancing said vane longitudinally into said space and positively positioning the vane in the space adjacent to a rung, and where said mechanism for positioning is a system for confining a bonding medium in engagement with said vane and said adjacent rung to secure said vane to said rung.

16. The apparatus of claim 15 wherein said bonding medium is an adhesive.

17. The apparatus of claim 16 wherein said attachment means is a mechanical fastener.

18. The apparatus of claim 16 wherein said adhesive is a thermoplastic resin.

19. The apparatus of claim 16 further including a reservoir for said adhesive, a system for dispensing adhesive from said reservoir onto a movable support and a system for moving the movable support adjacent to said vane and adjacent rung to secure the vane to the adjacent rung.

20. The apparatus of claim 19 further including a backup positioned on the opposite side of said vane and adjacent rung from said support so that the adhesive can be compressively forced against said vane and adjacent rung.

* * * * *

UNITED STATES PATENT AND TRADEMARK OFFICE

CERTIFICATE OF CORRECTION

PATENT NO. : 7,146,694 B2 Page 1 of 1
APPLICATION NO. : 10/402223
DATED : December 12, 2006
INVENTOR(S) : Wendell B. Colson et al.

It is certified that error appears in the above-identified patent and that said Letters Patent is hereby corrected as shown below:

Column 20, line 3, delete "10/195,822" and insert --10/479,893--.

Signed and Sealed this

Eighteenth Day of September, 2007

JON W. DUDAS
*Director of the United States Patent and Trademark Office*